(12) United States Patent
Ruddy et al.

(10) Patent No.: US 10,392,567 B2
(45) Date of Patent: Aug. 27, 2019

(54) CATALYSTS AND METHODS FOR CONVERTING BIOMASS TO LIQUID FUELS

(71) Applicant: Alliance for Sustainable Energy, LLC, Golden, CO (US)

(72) Inventors: Daniel Ruddy, Arvada, CO (US); Joshua A. Schaidle, Arvada, CO (US); Calvin Mukarakate, Arvada, CO (US); Abhijit Dutta, Littleton, CO (US); Frederick G. Baddour, Denver, CO (US); Susan E. Habas, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 15/794,235

(22) Filed: Oct. 26, 2017

(65) Prior Publication Data
US 2018/0119022 A1    May 3, 2018

Related U.S. Application Data

(60) Provisional application No. 62/414,496, filed on Oct. 28, 2016.

(51) Int. Cl.
*B01J 23/652* (2006.01)
*B01J 23/883* (2006.01)
(Continued)

(52) U.S. Cl.
CPC .............. *C10G 3/44* (2013.01); *B01J 27/22* (2013.01); *B01J 35/006* (2013.01);
(Continued)

(58) Field of Classification Search
CPC ........ B01J 27/22; B01J 23/652; B01J 23/866; B01J 23/883; B01J 23/888; B01J 35/023;
(Continued)

(56) References Cited

U.S. PATENT DOCUMENTS 2,539,414 A * 1/1951 Frankenburg ............ B01J 27/22
502/177
4,155,928 A * 5/1979 Finch ........................ B01J 27/22
502/177
(Continued)

FOREIGN PATENT DOCUMENTS

EP    1 300 364 A2    4/2003
EP    2 495 781 A1    9/2012

OTHER PUBLICATIONS

Adjaye et al., "Production of Hydrocarbons by Catalytic Upgrading of a Fast Pyrolysis Bio-oil. Part I: Conversion Over Various Catalysts", Fuel Processing Technology, 1995, vol. 45, pp. 161-183.
(Continued)

*Primary Examiner* — Patricia L. Hailey
(74) *Attorney, Agent, or Firm* — Michael A. McIntyre

(57) ABSTRACT

An aspect of the present disclosure is a method that includes contacting an oxygenated compound and hydrogen ($H_2$) with a solid catalyst, where the solid catalyst includes a metal carbide that includes a first transition metal, and the contacting converts at least a portion of the oxygenated compound to a deoxygenated compound. In some embodiments of the present disclosure, the metal carbide may include at least one of $Mo_2C$ and/or $W_2C$.

23 Claims, 37 Drawing Sheets

(51) Int. Cl.

| | |
|---|---|
| *B01J 23/888* | (2006.01) |
| *C10G 3/00* | (2006.01) |
| *C10G 50/00* | (2006.01) |
| *B01J 27/22* | (2006.01) |
| *B01J 37/08* | (2006.01) |
| *B01J 35/02* | (2006.01) |
| *B01J 35/00* | (2006.01) |

(52) U.S. Cl.
CPC ......... *B01J 35/0013* (2013.01); *B01J 35/023* (2013.01); *B01J 37/08* (2013.01); *B01J 37/084* (2013.01); *C10G 3/50* (2013.01); *C10G 50/00* (2013.01); *C10G 2300/1014* (2013.01); *C10G 2300/202* (2013.01); *C10G 2400/20* (2013.01); *C10G 2400/30* (2013.01); *Y02P 30/20* (2015.11)

(58) Field of Classification Search
CPC ................ B01J 2523/67; B01J 2523/68; B01J 2523/69; B01J 2523/17; B01J 2523/821; B01J 2523/824; B01J 2523/828; B01J 2523/847; C10G 3/44; C10G 3/50; C10G 50/00; C10G 2300/1014; C10G 2300/202; C10G 2400/20; C10G 2400/30
USPC ........ 502/177, 313, 315, 318, 321; 423/440; 977/773
See application file for complete search history.

(56) References Cited

U.S. PATENT DOCUMENTS

| | | | |
|---|---|---|---|
| 5,200,060 | A | 4/1993 | Sajkowski et al. |
| 5,451,557 | A * | 9/1995 | Sherif ...................... B01J 27/22 423/352 |
| 6,120,840 | A | 9/2000 | Paul et al. |
| 6,461,539 | B1 * | 10/2002 | Gaffney ................... B01J 23/24 252/373 |
| 8,790,754 | B1 | 7/2014 | Rangan et al. |
| 8,962,513 | B2 | 2/2015 | Liu et al. |
| 2009/0130502 | A1 | 5/2009 | Liu et al. |
| 2012/0178974 | A1 * | 7/2012 | Zhang ...................... B01J 21/18 568/861 |
| 2012/0253085 | A1 * | 10/2012 | Johnston ............... C07C 29/149 568/885 |
| 2013/0324775 | A1 | 12/2013 | Quignard et al. |
| 2015/0105241 | A1 * | 4/2015 | Roman-Leshkov ..... B01J 27/24 502/177 |

OTHER PUBLICATIONS

Adjaye et al., "Production of Hydrocarbons by Catalytic Upgrading of a Fast Pyrolysis Bio-oil. Part II: Comparative Catalyst Performance and Reaction Pathways", Fuel Processing Technology, 1995, vol. 45, pp. 185-202.
Arun et al., "Green Diesel Synthesis by Hydrodeoxygenation of Bio-based Feedstocks: Strategies for Catalyst Design and Development", Renewable and Sustainable Energy Reviews, 2015, vol. 48, pp. 240-255.
Baddour et al., "Synthesis of α-$MoC_{1-x}$ Nanoparticles with a Surface-Modified SBA-15 Hard Template: Determination of Structure—Function Relationships in Acetic Acid Deoxygenation", Angewandte Chemie International Edition, Jul. 25, 2016, vol. 55, No. 31, pp. 9026-9029.
Boullosa-Eiras et al., "Potential for Metal-carbide, -nitride, and -phosphide as Future Hyrdrotreating (HT) Catalysts for Processing of Bio-oils", Catalysis, 2014, vol. 26, pp. 29-71.
Chen et al., "$Mo_2C$ Catalyzed Vapor Phase Hydrodeoxygenation of Lignin-derived Phenolic Compound Mixtures to Aromatics Under Ambient Pressure", Applied Catalysis A: General, Jan. 2016, vol. 510, pp. 42-48.
Corma et al., "Processing Biomass-Derived Oxygenates in the Oil Refinery: Catalytic Cracking (FCC) Reaction Pathways and Role of Catalyst", Journal of Catalysis, 2007, vol. 247, pp. 307-327.
Dutta et al., "Process Design and Economics for the Conversion of Lignocellulosic Biomass to Hydrocarbon Fuels—Thermochemical Research Pathways with in Situ and Ex Situ Upgrading of Fast Pyrolysis Vapors", NREL Technical Report, NREL/TP-5100-62455, Mar. 2015, pp. 1-275.
Dutta et al., "Conceptual Process Design and Techno-Economic Assessment of Ex Situ Catalytic Fast Pyrolysis of Biomass: A Fixed Bed Reactor Implementation Scenario for Future Feasibility", Topics in Catalysis, Jan. 2016, vol. 59, No. 1, pp. 2-18.
Elkasabi et al., "Hydrodeoxygenation of Fast-pyrolysis Bio-oils from Various Feedstocks Using Carbon-supported Catalysts", Fuel Processing Technology, 2014, vol. 123, pp. 11-18.
Elliott, "Historical Developments in Hydroprocessing Bio-oils", Energy & Fuels, 2007, vol. 21, pp. 1792-1815.
Elliott et al., "Hydrocarbon Liquid Production from Biomass via Hot-Vapor-Filtered Fast Pyrolysis and Catalytic Hydroprocessing of the Bio-oil", Energy Fuels, 2014, vol. 28, pp. 5909-5917.
Furimsky, "Metal Carbides and Nitrides as Potential Catalysts for Hydroprocessing", Applied Catalysis A: General, 2003, vol. 240, pp. 1-28.
Giordano et al., "Synthesis of Mo and W Carbide and Nitride Nanoparticles via a Simple "Urea Glass" Route", Nano Letters, 2008, vol. 8, No. 12, pp. 4659-4663.
Giordano et al., "Metal Nitride and Metal Carbide Nanoparticles by a Soft Urea Pathway", Chemistry of Materials, 2009, vol. 21, pp. 5136-5144.
Griffin et al., "Role of the Support and Reaction Conditions on the Vapor-Phase Deoxygenation of m-Cresol Over Pt/C and Pt/$TiO_2$ Catalysts", ACS Catalysis, 2016, vol. 6, pp. 2715-2727.
Hyeon et al., "Nanostructured Molybdenum Carbide: Sonochemical Synthesis and Catalytic Properties", Journal of the American Chemical Society, 1996, vol. 118, pp. 5492-5493.
Lee et al., "Selective Vapor-phase Hydrodeoxygenation of Anisole to Benzene on Molybdenum Carbide Catalysts", Journal of Catalysis, 2014, vol. 319, pp. 44-53.
Lee et al., "Chemical Titration and Transient Kinetic Studies of Site Requirements in $Mo_2C$-Catalyzed Vapor Phase Anisole Hydrodeoxygenation", ACS Catalysis, 2015, vol. 5, No. 7, pp. 4104-4114.
Márquez-Alvarez et al., "Benzene Hydrogenation Over Transition Metal Carbides", Studies in Surface Science and Catalysis, Hydrotreatment and Hydrocracking of Oil Fractions, 1997, vol. 106, pp. 485-490.
McEnaney et al., "Amorphous Molybdenum Phosphide Nanoparticles for Electrocatalytic Hydrogen Evolution", Chemistry of Materials, 2014, vol. 26, No. 16, pp. 4826-4831.
Mortensen et al., "A Review of Catalytic Upgrading of Bio-oil to Engine Fuels", Applied Catalysis A: General, 2011, vol. 407, pp. 1-19.
Muetterties et al., "Catalytic Properties of Metal Phosphides. Qualitative assay of Catalytic Properties", Journal of the American Chemical Society, May 1974, vol. 96, No. 11, pp. 3410-3415.
Murugappan et al., "Supported Molybdenum Oxides as Effective Catalysts for the Catalytic Fast Pyrolysis of Lignocellulosic Biomass", Green Chemistry, Jul. 2016, vol. 18, No. 20, pp. 5548-5557.
Nolte et al., "A Perspective on Catalytic Strategies for Deoxygenation in Biomass Pyrolysis", Energy Technology, 2017, vol. 5, pp. 7-18.
Prins et al., "Metal Phosphides: Preparation, Characterization and Catalytic Reactivity", Catalysis Letters, 2012, vol. 142, pp. 1413-1436.
Ren et al., "Selective Hydrodeoxygenation of Biomass-Derived Oxygenates to Unsaturated Hydrocarbons using Molybdenum Carbide Catalysts", ChemSusChem Communications, Apr. 2013, vol. 6, No. 5, pp. 798-801.
Ruddy et al., "Recent Advances in Heterogeneous Catalysts for Bio-oil Upgrading via "ex situ Catalytic Fast Pyrolysis": Catalyst Development Through the Study of Model Compounds", Green Chemistry, 2014, vol. 16, pp. 454-490.

(56) References Cited

OTHER PUBLICATIONS

Ruddy et al., "Development of Metal Carbide Nano-catalysts for Bio-oil Upgrading", Pacifichem Conference, Honolulu, Hawaii, Dec. 19, 2015, pp. 1-19.

Schaidle et al., "Effects of sulfur on $Mo_2C$ and $Pt/Mo_2C$ catalysts: Water gas shift reaction", Journal of Catalysis, Jun. 2010, vol. 272, No. 2, pp. 235-245.

Schaidle et al., "Experimental and Computational Investigation of Acetic Acid Deoxygenation over Oxophilic Molybdenum Carbide: Surface Chemistry and Active Site Identity", ACS Catalysis, Jan. 21, 2016, vol. 6, No. 2, pp. 1181-1197.

Schaidle et al., "Vapor-phase Upgrading Over Oxophilic Molybdenum Carbide Catalysts: From Model Compounds to Biomass Pyrolysis Vapors", CATL: Fundamental Surface Chemistry of Non-oxide Transition Metal Ceramic Catalysts: Carbides, Nitrides, Sulfides, Phosphides, Selenides Presentation, Mar. 13, 2016, accessed at https://ep70.eventpilotadmin.com/web/page.php?page=IntHtml&project=ACS16spring&id=2415051 on Dec. 5, 2017, p. 1.

Sullivan et al., "Acetone Hydrodeoxygenation over Bifunctional Metallic—Acidic Molybdenum Carbide Catalysts", ACS Catalysis, Jan. 2016, vol. 6, No. 2, pp. 1145-1152.

Sullivan et al., "Catalytic Deoxygenation on Transition Metal Carbide Catalysts", Catalysis Science & Technology, Jan. 2016, vol. 6, pp. 602-616.

Talmadge et al., "A Perspective on Oxygenated Species in the Refinery Integration of Pyrolysis Oil", Green Chemistry, 2014, vol. 16, pp. 407-453.

Wan et al., "Crystal Structure and Morphology Control of Molybdenum Carbide Nanomaterials Synthesized from an Amine-metal Oxide Composite", Chemical Communications, 2013, vol. 49, pp. 10409-10411.

Wan et al., "Supporting Information for Crystal Structure and Morphology Control of Molybdenum Carbide Nanomaterials Synthesized from an Amine-metal Oxide Composite", Electronic Supplementary Material (ESI) for Chemical Communications, The Royal Society of Chemistry, 2013, pp. S1-S8.

Wan et al., "Multiple Phases of Molybdenum Carbide as Electrocatalysts for the Hydrogen Evolution Reaction", Angewandte chemie—International Edition, 2014, vol. 53, pp. 6407-6410.

Wan et al., "Iron-Doped Molybdenum Carbide Catalyst with High Activity and Stability for the Hydrogen Evolution Reaction", Chemistry of Materials, 2015, vol. 27, pp. 4281-4288.

Wildschut et al., "Catalyst Studies on the Hydrotreatment of Fast Pyrolysis Oil", Applied Catalysis B: Environmental, 2010, vol. 99, pp. 298-306.

Xiong et al., "Molybdenum Carbide as a Highly Selective Deoxygenation Catalyst for Converting Furfural to 2-Methylfuran", ChemSusChem, Apr. 2014, vol. 7, No. 8, pp. 2146-2149.

Yadav et al., "Selectivity Engineering of Cation-Exchange Resins over Inorganic Solid Acids in C-Alkylation of Guaiacol with Cyclohexene", Industrial & Engineering Chemistry Research, 2007, vol. 46, No. 10, pp. 3119-3127.

\* cited by examiner

CATALYSTS AND METHODS FOR CONVERTING BIOMASS TO LIQUID FUELS

CROSS-REFERENCE TO RELATED APPLICATIONS

This application claims the benefit of U.S. Provisional Application No. 62/414,496 filed Oct. 28, 2016, the contents of which is incorporated herein by reference in its entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

SUMMARY

An aspect of the present disclosure is a method that includes contacting an oxygenated compound and hydrogen ($H_2$) with a solid catalyst, where the solid catalyst includes a metal carbide that includes a first transition metal, and the contacting converts at least a portion of the oxygenated compound to a deoxygenated compound. In some embodiments of the present disclosure, the metal carbide may include at least one of $Mo_2C$ and/or $W_2C$. In some embodiments of the present disclosure, the metal carbide may be in the form of a nanoparticle having a length dimension between about 1 nm and about 50 nm.

In some embodiments of the present disclosure, the metal carbide may be substantially in a face centered cubic crystalline phase. In some embodiments of the present disclosure, the contacting may be conducted at a pressure between about 0 psig and about 150 psig. In some embodiments of the present disclosure, the contacting may be performed in a first fixed-bed reactor. In some embodiments of the present disclosure, the contacting may be conducted at a first temperature between about 250° C. and about 500° C. In some embodiments of the present disclosure, the oxygenated compound may include a pyrolysis decomposition product. In some embodiments of the present disclosure, the oxygenated compound may be directed to the first fixed-bed reactor while in a first vapor phase. In some embodiments of the present disclosure, during the contacting, the $H_2$ may be present at a partial pressure between about 0.1 bar and about 10 bar. In some embodiments of the present disclosure, the deoxygenated compound may have a carbon number between 2 carbon atoms and 20 carbon atoms inclusively. In some embodiments of the present disclosure, the deoxygenated compound may include at least one of propane, butane, pentane, hexane, heptane, octane, cyclopentane, cyclohexane, cyclohexene, benzene, toluene, xylene, a trimethylbenzene, a tetramethylbenzene, naphthalene, and/or a methylnaphthalene. In some embodiments of the present disclosure, the deoxygenated compound may be in a second vapor phase.

In some embodiments of the present disclosure, the method may further include, after the contacting, alkylating a first portion of the deoxygenated compound by reacting the first portion of the deoxygenated compound with a second portion of the deoxygenated compound to form an alkylated compound. In some embodiments of the present disclosure, the alkylating may be performed in a second fixed-bed reactor.

An aspect of the present disclosure is a composition that includes a solid metal carbide that includes a first transition metal. In some embodiments of the present disclosure, the first transition metal may include at least one of chromium, molybdenum, or tungsten. In some embodiments of the present disclosure, the composition may further include a solid support, where the solid metal carbide is positioned on the solid support. In some embodiments of the present disclosure, the solid support may include an oxide. In some embodiments of the present disclosure, the composition may further include a second transition metal, where the second transition metal is positioned on the solid metal carbide. In some embodiments of the present disclosure, the second transition metal may include at least one of nickel, palladium, platinum, copper, and/or ruthenium.

An aspect of the present disclosure is a method that includes heating a first mixture that includes a solvent and a metal carbonyl compound, where the heating is performed at a first temperature up to about 400° C., the first mixture is substantially in a liquid phase while at the first temperature, and the heating produces a second mixture comprising metal carbide nanoparticles. In some embodiments of the present disclosure, the method may further include, after the heating, cooling the second mixture to a second temperature that is between 20° C. and less than the first temperature to form a cooled second mixture. In some embodiments of the present disclosure, the method may further include, after the cooling, separating the metal carbide nanoparticles from the cooled second mixture to produce the metal carbide nanoparticles substantially free of at least the solvent.

BRIEF DESCRIPTION OF THE DRAWINGS

Exemplary embodiments are illustrated in referenced figures of the drawings. It is intended that the embodiments and figures disclosed herein are to be considered illustrative rather than limiting.

(FIG. 5A) acetic acid and $H_2$ conversion, with product selectivities for deoxygenation products at 350° C. (FIG. 5B) and 400° C. (FIG. 5C) as a function of time on stream (TOS) for acetic acid deoxygenation over $Mo_2C$.

(FIG. 6A) and 400° C. (FIG. 6B). 'Other' is the sum of propane, propylene, n-butane, and butenes.

(FIG. 7A) guaiacol conversion (filled markers) and $H_2$ conversion (open markers) as a function of TOS, and phenol and benzene organic phase selectivities at 10 $h^{-1}$ and 350° C. (FIG. 7B) and 60 $h^{-1}$ and 350/400° C. (FIG. 7C). The organic phase refers to reaction products with a carbon number ≥6.

(FIGS. 8A, 8B, and 8C) by-product and (FIGS. 8D, 8E, and 8F) organic phase selectivities during guaiacol deoxygenation experiments over $Mo_2C$ at 350° C. and 10 $h^{-1}$ (FIGS. 8A/8D), 350° C. and 60 $h^{-1}$ (FIGS. 8B/8E), and 400° C. and 60 $h^{-1}$ (FIGS. 8C/8F). Selectivity is plotted as a function of TOS (lower axis) and the reactant carbon-to-catalyst ratio (upper axis). Molecules with a carbon number <6 are considered by-products.

(FIG. 15A) acetic acid and $H_2$ conversion, with product selectivities for deoxygenation products over Ni/$Mo_2C$ (FIG. 15B) and over Pt/$W_2C$ (FIG. 15C) illustrates the product selectivity as a function of time on stream (TOS) for acetic acid deoxygenation.

(FIG. 16A) acetic acid and $H_2$ conversion, with (FIG. 16B) carbon selectivities for hydrodeoxygenation (HDO) products (ethane, ethylene, ethanol, acetaldehyde), (FIG. 16C) ketonization (KET) carbon selectivities (acetone) and (FIG. 16D) decarbonylation/decarboxylation (DCO) carbon selectivities (CO, $CO_2$, $CH_4$).

REFERENCE NUMBERS

Figure 1:
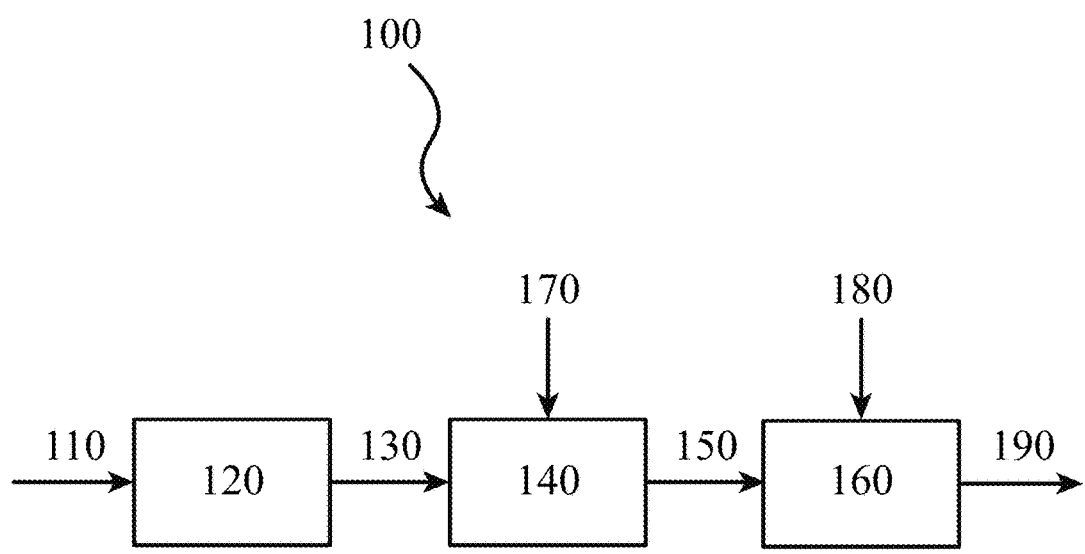
FIG. 1 illustrates a hydrocarbon production process, according to some embodiments of the present disclosure.

100 . . . hydrocarbon production process
110 . . . biomass and/or carbon-rich solid waste
120 . . . thermal decomposition unit
130 . . . oxygenated compounds
140 . . . upgrading unit
150 . . . deoxygenated compounds
160 . . . alkylation unit
170 . . . hydrogen ($H_2$)
180 . . . supplemental compounds
190 . . . alkylated compounds
200 . . . method 210 . . . thermally decomposing
220 . . . contacting
230 . . . alkylating
300 . . . metal carbide production process
340 . . . metal carbonyl compounds
350 . . . solvent
360 . . . phosphine-containing and/or alkylamine compound
310 . . . thermal decomposition reactor
370 . . . first mixture
380 . . . second mixture
385 . . . cooled second mixture
320 . . . cooling unit
330 . . . separating unit
390 . . . metal carbide nanoparticles
400 . . . method
410 . . . heating
420 . . . cooling
430 . . . separating

DETAILED DESCRIPTION

The present disclosure relates to systems, methods, and compositions for converting pyrolysis vapors to drop-in hydrocarbon transportation fuels. The embodiments described herein should not necessarily be construed as limited to addressing any of the particular problems or deficiencies discussed herein.

One promising route for the conversion of biomass to liquid hydrocarbon fuels is ex-situ catalytic fast pyrolysis (CFP). In this process, pyrolysis vapors are sent to a secondary reactor where they are deoxygenated prior to condensation, resulting in a stabilized liquid product with improved fuel properties. To effectively enable deoxygenation, catalysts that activate $H_2$ at low to moderate pressures and relatively high temperatures (between about 350° C. and about 450° C.) and preferentially break C—O bonds over C—C bonds are desirable. Thus, some embodiments of the present disclosure relate to systems and methods that convert oxygenated biomass decomposition products, for example acetic acid and guaiacol, and/or oxygenated pine pyrolysis compounds by contacting these oxygenated compounds with a metal carbide catalyst such as $Mo_2C$, under ex-situ CFP conditions in the presence of co-fed low-pressure hydrogen ($H_2$) at a temperature between about 350° C. and about 400° C. As described herein, acetic acid and guaiacol experimental results suggest that $Mo_2C$ catalysts preferentially cleave C—O bonds over C—C bonds and efficiently utilizes $H_2$ to produce $H_2O$, with minimal hydrogenation of olefinic and aromatic C═C bonds. Also shown herein, experimental results with pine pyrolysis vapors demonstrate an initial conversion of oxygenates to hydrocarbons with high selectivity.

FIG. 1 illustrates a hydrocarbon production process 100 according to some embodiments of the present disclosure. The hydrocarbon production process 100 may include at least three unit operations in series; a thermal decomposition unit 120, an upgrading unit 140, and/or an alkylation unit 160. Biomass 110 may be fed as a feedstock to the thermal decomposition unit 120, where examples of biomass 110 include agricultural waste, wood, grasses, and/or other organic carbon-rich waste material. Examples of agricultural waste include corn stover, wheat straw, and/or bagasse. Examples of wood include hard woods (e.g. maple and/or oak) and soft woods (e.g. poplar and/or pine). Examples of grasses include miscanthus, bamboo, and/or switchgrass. The biomass 110 may be heated to elevated temperatures in the thermal decomposition unit 120 such that the constituent components of the biomass 110 (e.g. cellulose, hemicellulose, and/or lignin) decompose to a variety of oxygenated compounds 130, including at least one of acetic acid, propionic acid, guaiacol, phenol, syringol, an alkylated phenol, cyclobutanone, cyclopentanone, cyclohexanone, acetone, acetaldehyde, a furan, an alkylated furan, stearic acid, furfural, and/or anisole. In some embodiments of the present disclosure, the thermal decomposition unit 120 may be performed at "pyrolysis" conditions, high temperatures in the absence of oxygen ($O_2$). In some embodiments of the present disclosure, the thermal decomposition unit 120 may be performed at "gasification" conditions, at high temperatures in the presence of less than the stoichiometric amounts of $O_2$ needed to fully combust the biomass. In some embodiments of the present disclosure, water may be co-fed with the biomass 110 to the thermal decomposition unit 120, either as a constituent of the biomass 110 and/or as free water in the gas (steam) and/or liquid state. In some embodiments of the present disclosure, recycled process gases, hydrogen enriched gases, or other gases favoring higher yields may be co-fed with the biomass 110 to the thermal decomposition unit 120. In some embodiments of the present disclosure, the thermal decomposition of the biomass 110 in the thermal decomposition unit 120 may be completed at a temperature between about 400° C. and about 1000° C. In some embodiments of the present disclosure, the thermal decomposition of the biomass 110 may be completed at a temperature between about 400° C. and about 600° C. In some embodiments of the present disclosure, the thermal decomposition unit 120 may be a reactor such as a fluidized-bed reactor and/or an entrained-flow reactor.

Referring again to FIG. 1, oxygenated compounds 130 resulting from the thermal decomposition unit 120 may then be directed to an upgrading unit 140, which may convert at least a portion of the oxygenated compounds 130 to deoxygenated compounds 150, with examples of deoxygenated compounds 150 including at least one of propane, butane, pentane, hexane, heptane, octane, cyclopentane, cyclohexane, cyclohexene, benzene, toluene, xylene, a trimethylbenzene, a tetramethylbenzene, naphthalene, and/or a methylnaphthalene. Deoxygenated compounds 150 produced in the upgrading unit 140 may be characterized by a carbon number between about 2 and 20. In some embodiments of the present disclosure, oxygenated compounds 130 may be reacted with hydrogen ($H_2$) 170 by contacting these reactants with a catalyst (not shown) positioned within the upgrading unit 140 to produce the deoxygenated compounds 150. In some embodiments of the present, the hydrogen may be supplied upstream in unit 120. In some embodiments of the present disclosure, contacting oxygenated compounds 130 and hydrogen 170 with a solid catalyst (not shown) to produce deoxygenated compounds 150 may be at a temperature between about 250° C. and about 500° C. In some embodiments of the present disclosure, contacting oxygenated compounds 130 and hydrogen 170 with a solid catalyst (not shown) to produce deoxygenated compounds 150 may be at a temperature between about 250° C. and about 350° C. Contacting oxygenated compounds 130 and hydrogen 170 with a solid catalyst (not shown) to produce deoxygenated compounds 150 may be at a pressure between about 0 psia and about 150 psia. Contacting the oxygenated compounds 130 and hydrogen 170 with a solid catalyst (not shown) to produce the deoxygenated compounds 150 may be at a weight hour space velocity between about 0.01 $h^{-1}$ and about 20 $h^{-1}$. In some embodiments of the present disclosure, up to about 100% on a molar basis of the oxygenated compounds 130 may be converted to deoxygenated compounds 150 in the upgrading unit 140. In some embodiments of the present disclosure, up to about 45%, about 55%, about 65%, about 75%, about 90%, about 99%, or about 100% on a molar basis of the oxygenated compounds 130 may be converted to deoxygenated compounds 150 in the upgrading unit 140. $H_2$ may be supplied to the upgrading unit 140 at a partial pressure between about 0.1 bar and about 10 bar Referring again to FIG. 1, the catalyst (not shown) positioned within the upgrading unit 140 may include at least one solid catalyst such as a metal on a solid support. In some embodiments of the present disclosure, the catalyst (not shown) positioned within the upgrading unit 140 may include at least one solid catalyst such as a metal carbide. Examples of a metal on a solid support include transition metals such as platinum, palladium, ruthenium, copper, and/or nickel. Examples of a solid support include oxides such as $TiO_2$ and/or silica. Examples of a metal carbide include molybdenum carbide and tungsten carbide. In some embodiments of the present disclosure, a solid catalyst for converting oxygenated compounds 130 to deoxygenated compounds 150 may include a first metal on a metal carbide support, where the first metal is different than the metal of the metal carbide. In some embodiments, both the first metal and the metal of the metal carbide may be transition metals. For example, the metal of the metal carbide may be at least one of molybdenum or tungsten, whereas the first metal may include at least one of platinum, palladium, ruthenium, copper, and/or nickel. The upgrading unit 140 may be a fixed bed reactor, a fluidized-bed reactor, and/or any other reactor suitable for heterogeneous catalysis.

The hydrocarbon production process 100 may include an alkylation unit 160 for additional processing of deoxygenated compounds 150 to produce alkylated compounds 190 having physical properties suitable for transportation fuels. As used herein, the term "alkylation" refers to the transfer of an alkyl group from one compound to another. As used herein, the term "alkyl group" refers to an alkane that is missing a hydrogen atom. Thus, examples of alkyl groups include methyl, ethyl, propyl, etc. groups, as well as cycloalkyl groups. Targeted alkylated compounds may include methyl-, ethyl-, propyl-, or butyl-substituted butane, pentane, hexane, heptane, benzene, and cyclohexane. Referring again to FIG. 1, a hydrocarbon production process 100 may combine deoxygenated compounds 150 produced from biomass 110 with supplemental compounds 180 produced from other feedstocks, where the combining is performed in the alkylation unit 160. For example, supplemental compounds 180 may be produced in a petroleum process and/or refinery (not shown). Supplemental compounds 180 may include at least one of butane, 1-butene, cis-2-butene, trans-2-butene, isobutane, and/or isobutene originating from a non-pyrolysis source and non-gasification source. In some embodiments of the present disclosure, the supplemental compounds may be supplied upstream in unit 120. Alkylation reactions may occur in the alkylation unit 160, where the alkylation reactions occur between at least one of oxygenated compounds 130, deoxygenated compounds 180, and/or supplemental compounds 190.

Thus, in some embodiments of the present disclosure, alkylation reactions in an alkylation unit 160 may include the transfer of alkyl groups between deoxygenated compounds 150 produced in an upgrading unit 140 and/or with supplemental compounds 180, for example, in a petroleum process and/or refinery (not shown) to produce alkylated compounds 190 having the physical and/or performance characteristics suitable for liquid fuels. Alkylation in a refinery may be performed using a homogeneous acid catalyst such as sulfuric acid or hydrofluoric acid at mild conditions (less than 50° C.) in a two-phase system. Alkylation (or hydroalkylation) for biomass-derived feedstocks can also be performed over a solid acid or metal-modified solid acid catalyst such as Pd-modified zeolite, such as Pd/BEA, in the condensed phase or vapor phase at temperatures between 100 and 300° C. in a fixed bed or continuous stirred tank reactor. Supplemental $H_2$ can also be fed to the alkylation unit 160. The final alkylated product may consist of hydrocarbons with carbon numbers in the range of 6-20 and an octane number greater than 80. In some embodiments of the present disclosure, the upgrading unit 140 and the alkylation unit 160 may be separate and distinct unit operations; e.g. two separate fixed-bed reactors, where the product from the upgrading unit 140 is directed to the inlet of the alkylation unit 160.

This approach allows each reactor to be optimized and controlled independently while targeting a different chemistry in the second unit 160 based on the products of the first unit 140. In some embodiments of the present disclosure, the upgrading unit 140 and the alkylation unit 160 may be combined into a single unit operation for process intensification. For example, an upgrading catalyst (e.g. a metal carbide) may be mixed with an alkylation catalyst with the resultant catalyst mixture filling substantially all of the internal volume of a single fixed-bed reactor. In other examples, the upgrading catalyst may be placed in a first stage of a fixed-bed reactor, with the alkylation catalyst stacked on top of (or below, depending on the direction of flow through the reactor) the upgrading catalyst, resulting in two reaction zones in the fixed-bed reactor. Alkylation reactions in an alkylation unit 160 may be performed at a temperature between about 250° C. and about 375° C. and/or a pressure between about 1 bar and about 10 bar. For the example where the alkylation unit 160 is a fixed-bed reactor, the alkylation reactions may be completed at a space velocity between about 0.1/hr and about 20 hr or between about 1/hr and 8/hr. As used herein, "alkylation" reactions may include at least one of transalkylation and/or hydroalkylation, with examples of each shown below:

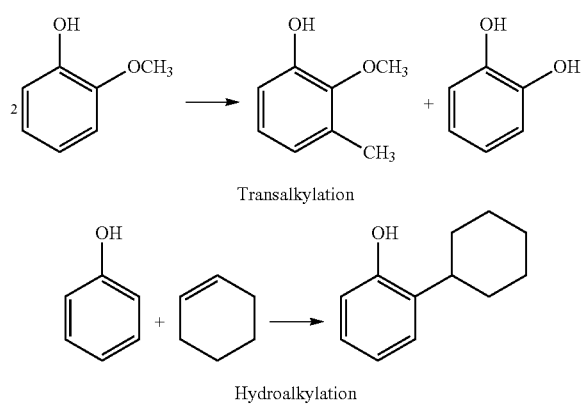

Transalkylation

Hydroalkylation

Thus, in some embodiments of the present disclosure, an alkylated compound 190 may include at least one ringed compound and/or aromatic compound. In some embodiments, an alkylated compound 190 may include at least one of an alkylated phenol compound and/or a methyoxyphenol compound. In some embodiments, an alkylated compound

190 may include at least one of ethylphenol, cyclohexylphenol, and/or methylguaiacol.

Figure 2:
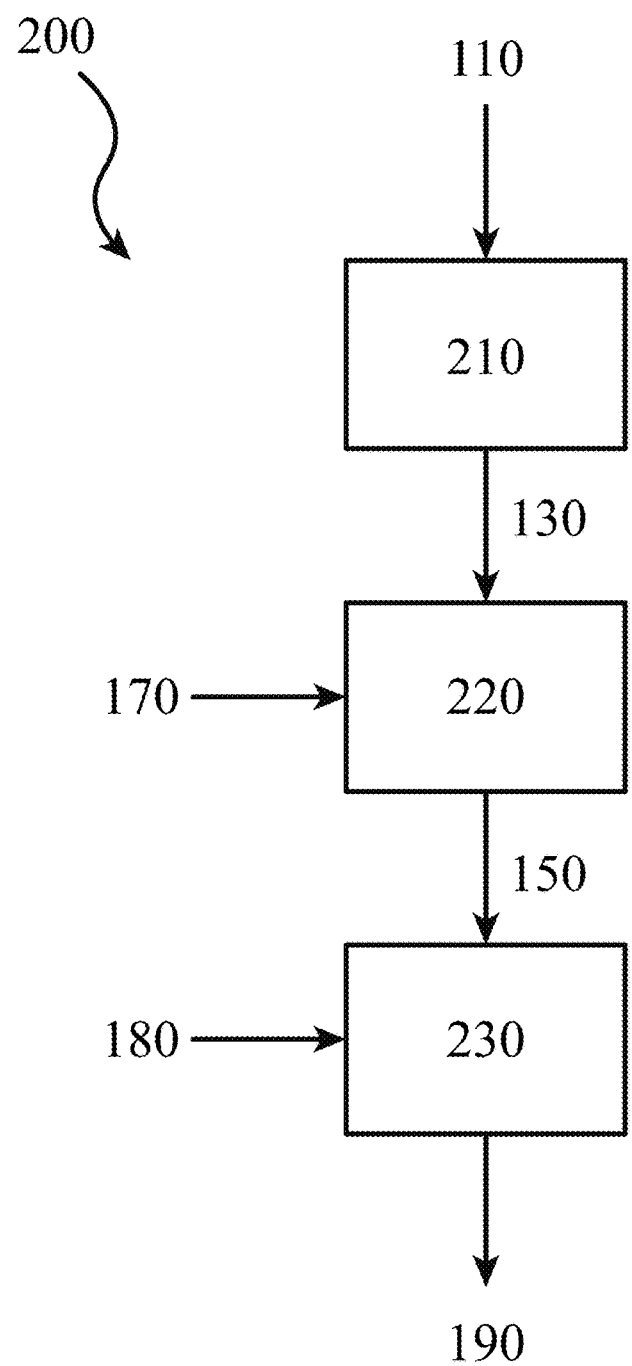
FIG. 2 illustrates a method for producing liquid hydrocarbon fuels, according to some embodiments of the present disclosure.

FIG. 2 illustrates a method 200 for upgrading the products of pyrolysis vapors to deoxygenated or partially deoxygenated compounds suitable for use as liquid fuels. Final products from the process in FIG. 2 could also be partially deoxygenated compounds that are suitable for use as chemical precursors (e.g. phenol, methyl-phenol). In some embodiments of the present disclosure, biomass 110 may be converted to oxygenated compounds 130 by thermally decomposing 210 the biomass. Thermally decomposing 210 the biomass 110 may be accomplished, as previously described, in a thermal decomposition unit 120 (see FIG. 1). Subsequently, the resultant oxygenated compounds 130 may be at least partially converted to deoxygenated compounds 150 by contacting 220 the oxygenated compounds 130 with hydrogen 170 over a catalyst (not shown). Contacting 220 deoxygenated compounds 150 and hydrogen 170 with a catalyst (not shown) may be accomplished, as previously described, in an upgrading unit 140 (see FIG. 1). In some embodiments of the present disclosure, hydrogen and/or other gases, including recycled process gases may be introduced in 210 (not shown). In some embodiments of the present disclosure, a catalyst (not shown) for converting oxygenated compounds 130 to deoxygenated compounds 150 may be a solid catalyst, for example, a metal on a solid support, a metal carbide on a solid support, a metal carbide, and/or a metal supported on a metal carbide. The deoxygenated compounds 150 may be subsequently at least partially converted to alkylated compounds 190 by alkylating 230 the deoxygenated compounds 150. Alkylating 230 deoxygenated compounds 150 to produce alkylated compounds 190 may be accomplished in an alkylating unit 160 as described above (see FIG. 1). As described above for the hydrocarbon production process, the contacting 220 and the alkylating 230 steps of the method 200 shown in FIG. 2 may also be completed sequentially in series (as shown). However, in some embodiments of the present disclosure, the contacting 220 and the alkylating 230 may be completed substantially simultaneously in a single step.

Figure 3:
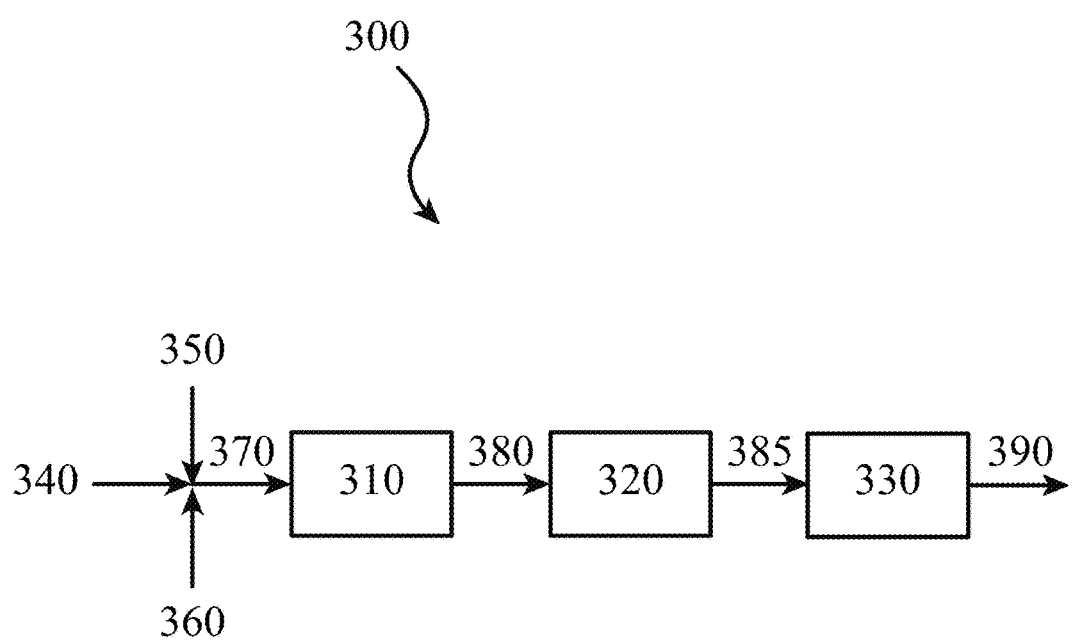
FIG. 3 illustrates a process for producing metal carbides suitable for the deoxygenation of pyrolysis products, according to some embodiments of the present disclosure.

As described above, oxygenated compounds resulting from the pyrolysis of biomass may be converted to more useful liquid fuels by deoxygenating the pyrolysis products. This may be accomplished by contacting the deoxygenated compounds and hydrogen with a solid catalyst such as a metal carbide. FIG. 3 illustrates a process for producing metal carbides 300 suitable for the deoxygenation of pyrolysis products, according to some embodiments of the present disclosure. A metal carbide production process 300 may include at least three unit operations in series including a thermal decomposition reactor 310, a cooling unit 320, and a separating unit 330. In some embodiments, unit operations may be combined to reduce the number of unit operations required. In some embodiments, additional unit operations may be added as required by process design conditions and final product (metal carbide) requirements.

Referring again to FIG. 3, a metal carbide production process 300 may include heating, in a thermal decomposition reactor 310, a first mixture 370 that includes a metal carbonyl compound 340, a solvent 350, a phosphine-containing compound and/or an alkylamine compound 360 such that at least the metal carbonyl compound 340 thermally decomposes to form metal carbide nanoparticles (not shown). Thus, the thermal decomposition in the thermal decomposition reactor 310 of at least the metal carbonyl compound 340 may result in the formation of a second mixture 380 containing the metal carbide nanoparticles (not shown) in the solvent 350 and any remaining unreacted metal carbonyl compound 340 and/or unreacted phosphine-containing compound and/or alkylamine compound 360. In some embodiments of the present disclosure, the first mixture 370 may thermally decompose in the thermal decomposition reactor 310 to form metal carbide nanoparticles (not shown) where the first mixture 370 only includes a phosphine compound and/or alkylamine compound 360 and a metal carbonyl compound 340. In such a case, the phosphine compound and/or alkylamine compound 360 itself may serve the role of a solvent (e.g. no additional solvent 350 needed). In some embodiments of the present disclosure, the first mixture 370 may thermally decompose in a thermal decomposition reactor 310 to form metal carbide nanoparticles (not shown) where the first mixture 370 may only include a solvent 350 and a metal carbonyl compound 340 (e.g. in the absence of a phosphine compound and/or alkylamine compound 360). In some embodiments of the present disclosure, the thermal decomposition of one or more components of the first mixture 260 in a thermal decomposition reactor 240 may be accomplished by heating the first mixture 260 to a temperature up to about 250° C., or up to about 300° C., or up to about 400° C.

Referring again to FIG. 3, the second mixture 380 containing metal carbide nanoparticles (not shown) may be transferred to a cooling unit 320 in which the temperature of the second mixture 380 may be lowered from the reaction temperature of the thermal decomposition reactor 310 (e.g. up to about 400° C.) to a temperature that is less than the thermal decomposition reactor 310, for example, as low as ambient temperature (e.g. room temperature, the environmental temperature, etc.) Thus, in some embodiments of the present disclosure, the temperature of the second mixture 380 may be lowered to a second temperature as low as 20° C. or as low as 0° C. to form a cooled second mixture 385. The cooling unit 320 may be any unit operation suitable for the removal of heat from the second mixture 380 to form the cooled second mixture 385, with examples including a water-cooled jacket, an air-cooled jacket, jacketed stirred tank, a shell-and-tube heat exchanger, a plate-and-frame heat exchanger, etc. In some embodiments of the present disclosure, the metal carbide nanoparticles may remain in substantially the same physical form during cooling in the cooling unit 320; e.g. the metal carbide nanoparticles do not precipitate. In some embodiments of the present disclosure, the metal carbide nanoparticles may change from a soluble phase to an insoluble phase; e.g. the metal carbide nanoparticles may substantially precipitate out of the second mixture. In some embodiments of the present disclosure, a second solvent (not shown) may be directed to a cooling unit 320 to be mixed with the second mixture 380 such that the second solvent (not shown) facilitates cooling of the second mixture 380 and/or helps to precipitate the metal carbide nanoparticles in the cooling unit 320. For example, a second solvent (not shown) may include at least one of acetone, isopropanol, ethanol, and/or methanol.

The cooled second mixture 385 may then be directed to a separating unit 330 to produce metal carbide nanoparticles 390. Thus, in some embodiments of the present invention, the metal carbide nanoparticles 390 may be separated from substantially all of the non-solid components of the cooled second mixture 385 by filtration, centrifugation, gravity settling, and/or any other suitable solid-liquid separation method. The final metal carbide nanoparticles 390 exiting the separating unit 330 may be characterized by X-ray diffraction. Thus, in some embodiments of the present disclosure, metal carbide nanoparticles 390 may include molybdenum carbide nanoparticles having a substantially fcc-MoC phase (face centered cubic phase) with negligible crystalline impurities and an average particle size between about 1 nm and about 50 nm. In some embodiments of the present disclosure, the average particle size of the metal carbide nanoparticles 390 may be between about 2 nm and about 7 nm.

Figure 4:
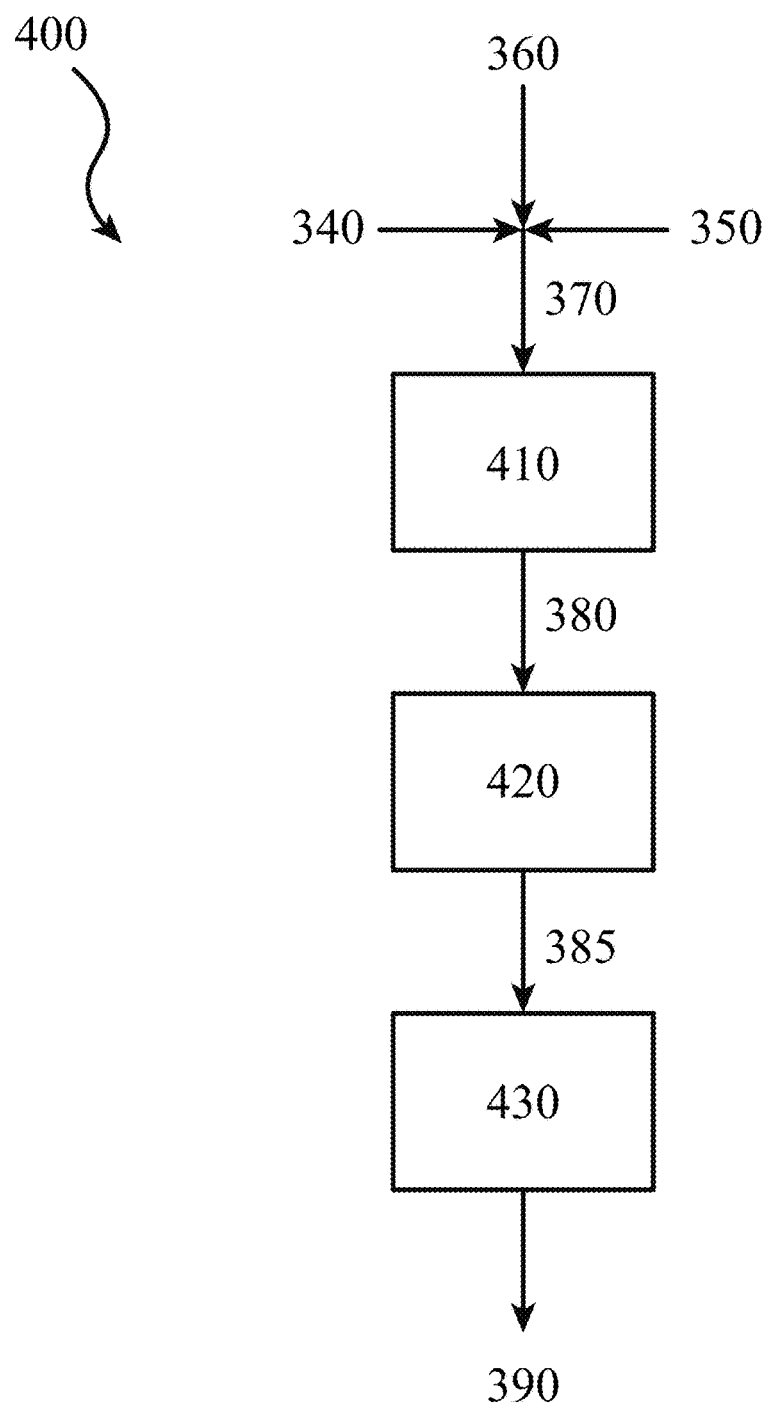
FIG. 4 illustrates a method for producing metal carbide catalysts, according to some embodiments of the present disclosure.

FIG. 4 illustrates a method 400 for producing metal carbide nanoparticles 390. In some embodiments of the present disclosure, a first mixture 370 that may include a metal carbonyl compound 340, a phosphine-containing compound and/or an alkylamine compound 360, and/or a solvent 350 may be combined and reacted by heating 410 the first mixture 370 to produce a second mixture 380 containing a mixture of metal carbide nanoparticles (not shown). The second mixture 380 may then be reduced from a starting temperature (e.g. the reaction temperature of the heating step) to a lower temperature by cooling 420 the second mixture 380, resulting in a cooled second mixture 385 containing the metal carbide nanoparticles (not shown). Finally, in some embodiments of the present disclosure, the cooled second mixture 385 may be processed to produce metal carbide nanoparticles 320 by separating 430 the metal carbide nanoparticles 390 from other constituents of the cooled second mixture 385, as described above for FIG. 3.

Figure 5A:
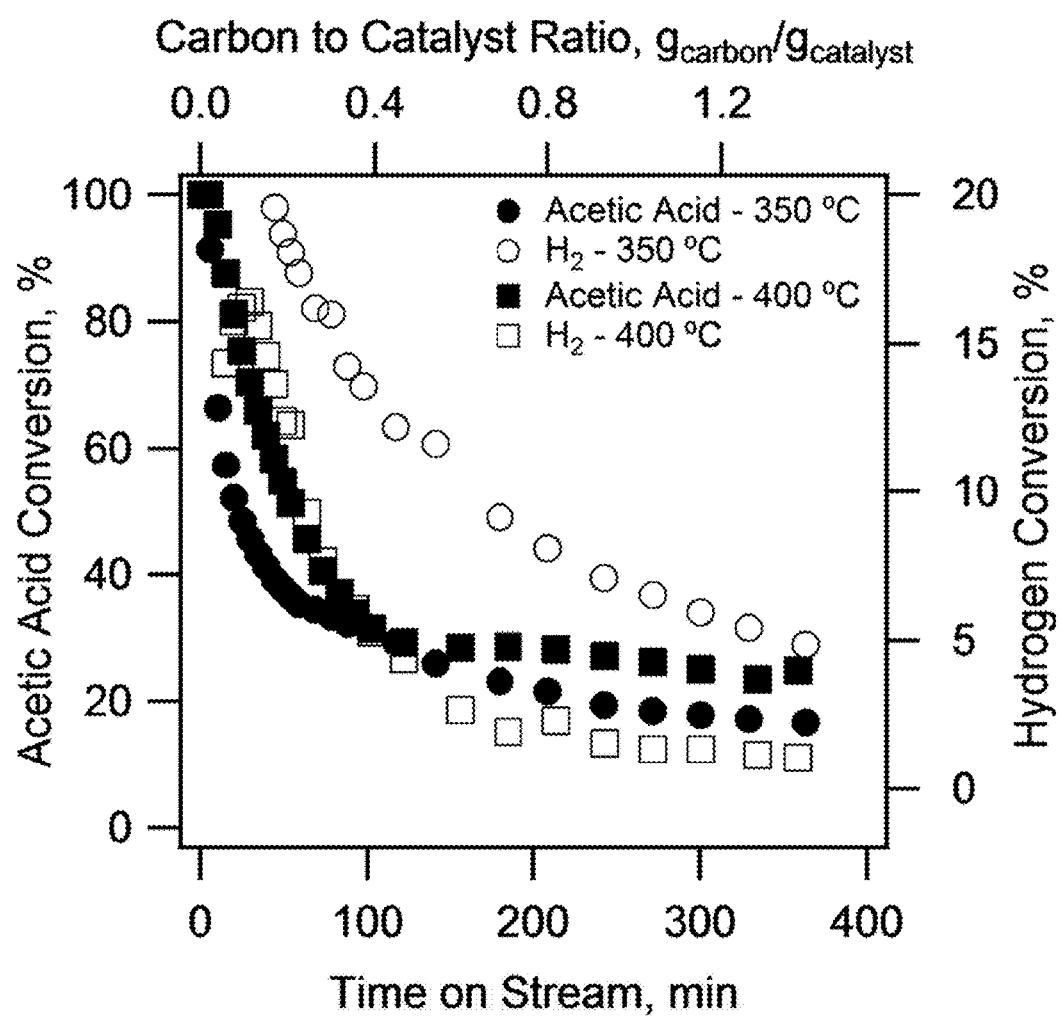
FIGS. 5A, 5B, and 5C illustrate experimental results for the deoxygenation of acetic acid with hydrogen over a fixed-bed of a metal carbide ($Mo_2C$), according to some embodiments of the present disclosure.
Figure 5B:
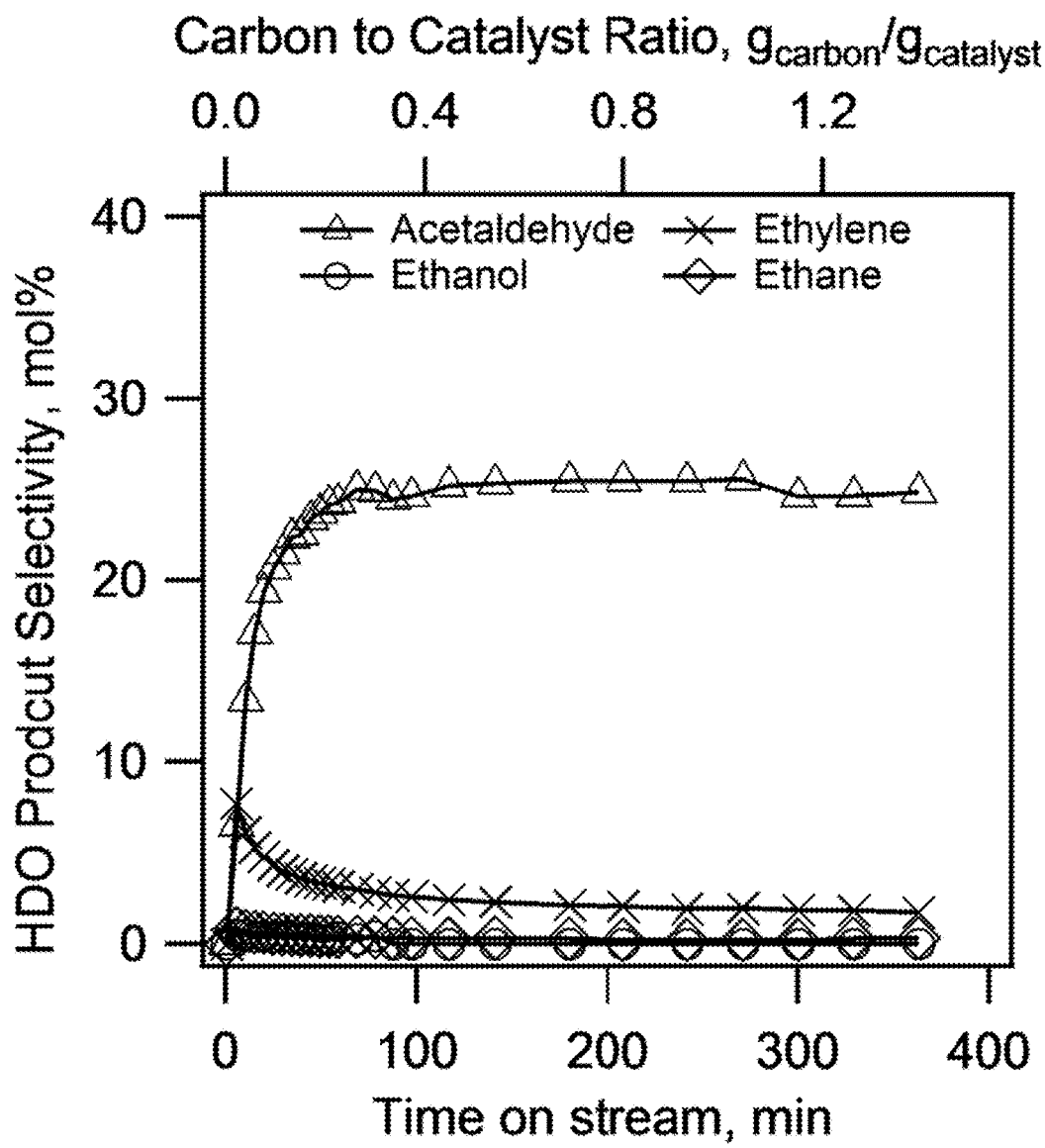
Figure 5C:
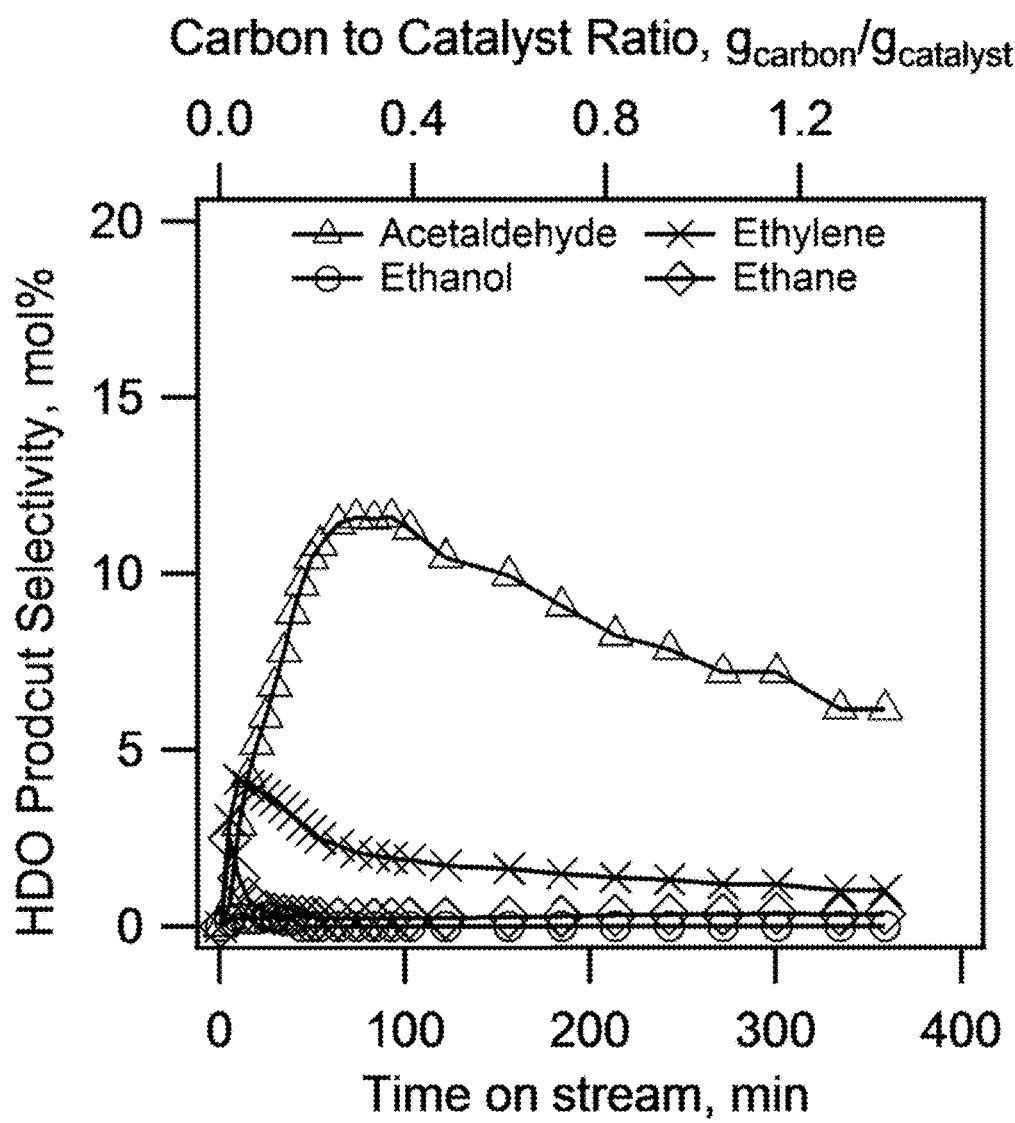
Figure 6A:
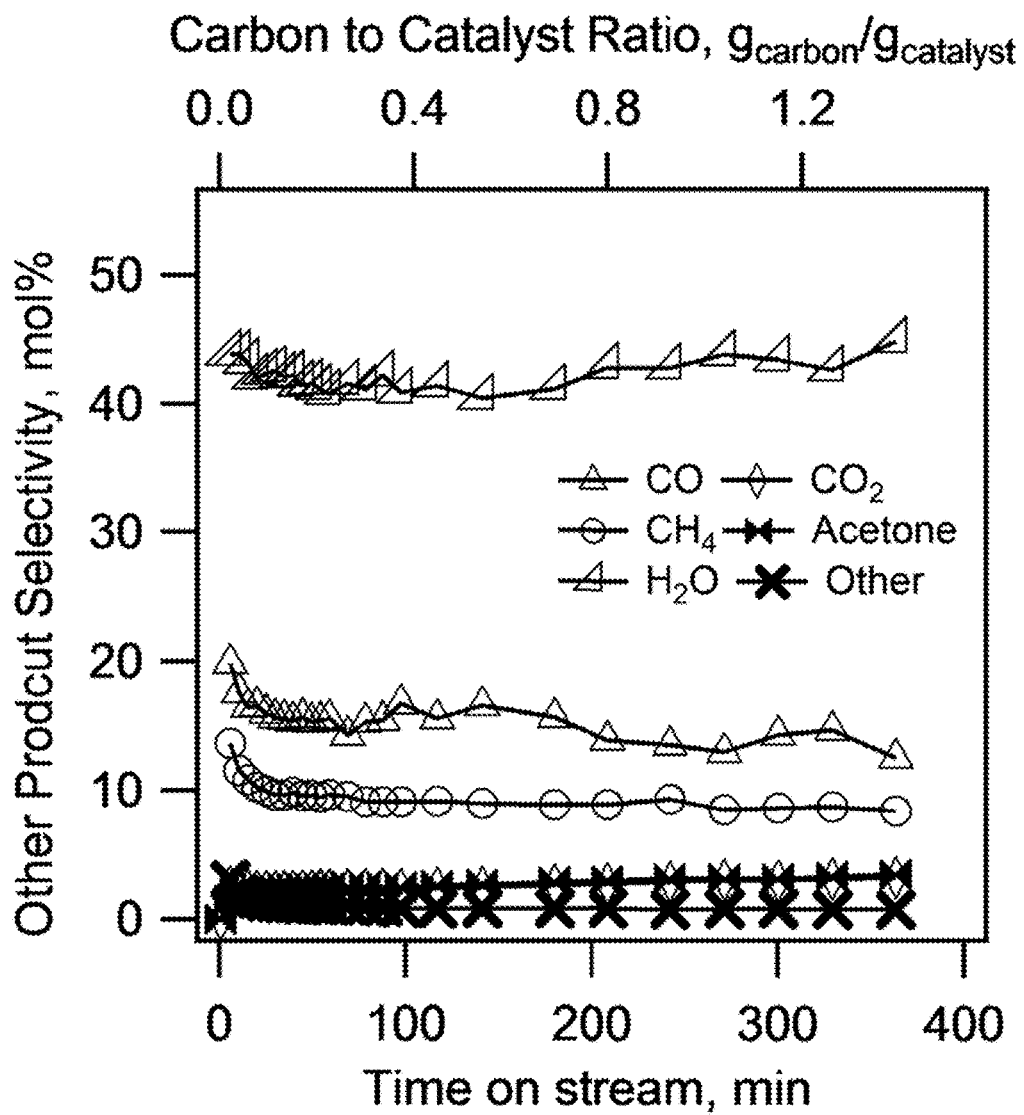
FIGS. 6A and 6B illustrate experimental results for the deoxygenation of acetic acid with hydrogen over a fixed-bed of a metal carbide ($Mo_2C$), according to some embodiments of the present disclosure: Molar product selectivity for CO, $CO_2$, $CH_4$, acetone, $H_2O$ and 'other' during acetic acid experiments at 350° C.

Model compound deoxygenation experiments were performed using either a representative carbohydrate-derived carboxylic acid, acetic acid, or a model lignin pyrolysis monomer, guaiacol, co-fed with $H_2$ over a fixed-bed of $Mo_2C$ catalyst at a temperature between about 350° C. and about 400° C. For acetic acid experiments with a weight hourly space velocity (WHSV) of about 0.6 $h^{-1}$ (see FIGS. 5A, 5B, and 5C), $Mo_2C$ exhibited a fairly rapid deactivation during the first 100 minutes time on stream (TOS), accompanied with a decrease in the extent of deoxygenation as observed by the shift in product selectivity at 350° C. from ethylene to acetaldehyde. This change in product selectivity occurred primarily during the first 100 minutes TOS, corresponding to a carbon-to-catalyst mass ratio of about 0.4. This ratio is a measure of how much carbon the catalyst has been exposed to over the course of the experiment and allows for comparison across model compound and biomass pyrolysis vapor experiments. Following this initial rapid deactivation, the $Mo_2C$ catalyst exhibited a slow, steady decrease in activity, but no further changes in selectivity were observed. For TOS greater than about 100 minutes at 350° C., acetaldehyde was the primary product and was formed with greater than 25 mol % selectivity, while ethylene and ethane were minor products, constituting about 5% of the total products. Products from other reaction pathways such as gasification, decarbonylation, decarboxylation, and ketonization were also observed to a lesser degree as indicated by the presence of carbon monoxide, carbon dioxide, methane and acetone (see FIG. 6A). It should be noted that limited C=C hydrogenation was observed, with the concentration of ethylene being about 8 times higher than that for ethane at 240 minutes TOS.

Figure 6B:
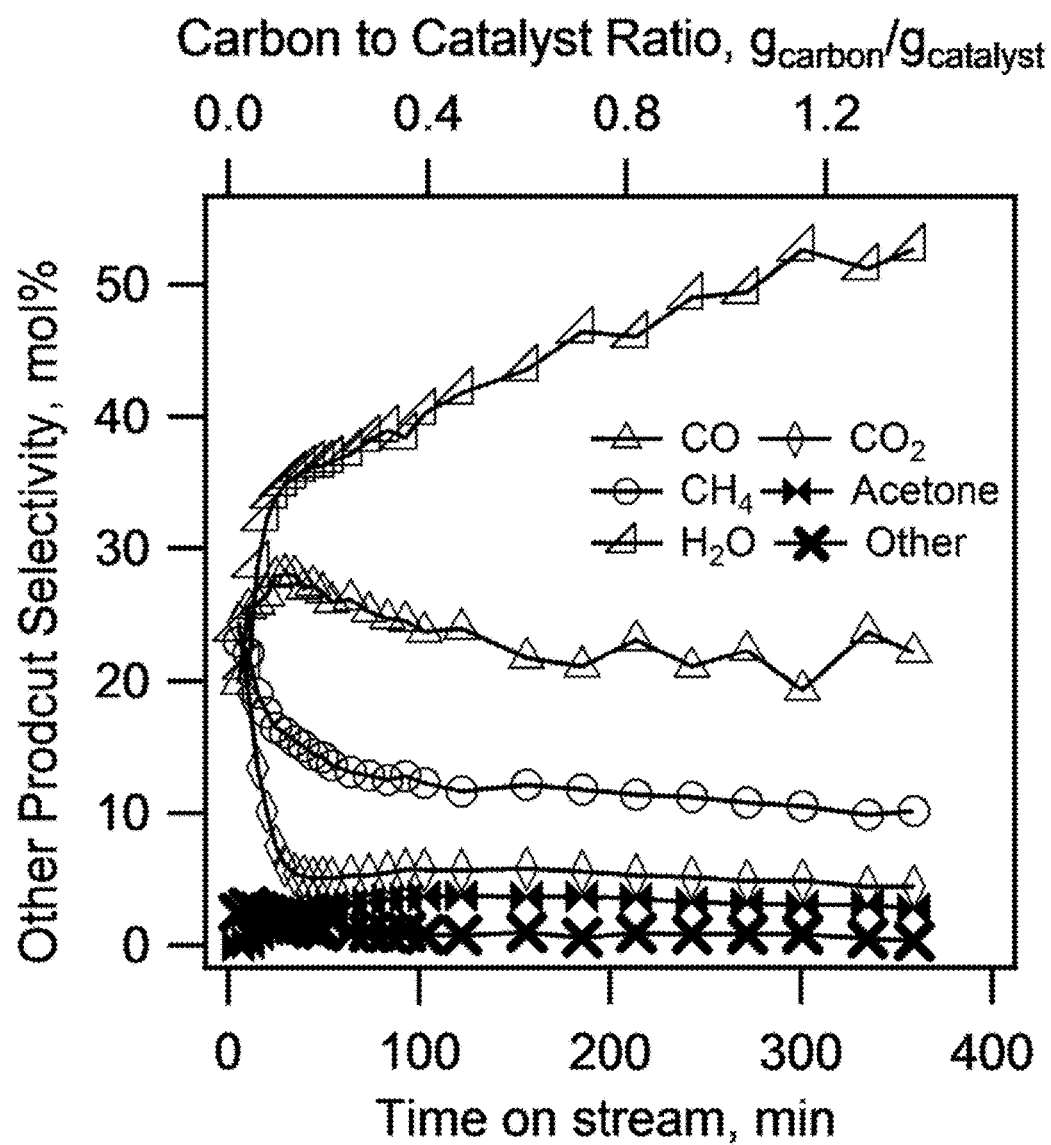

At 400° C., the acetaldehyde selectivity remained below about 12 mol % throughout the duration of the experiment (see FIG. 5C), while the selectivity to carbon monoxide, carbon dioxide, and methane was higher than that observed at 350° C. (see FIG. 6B). These light gases indicate a shift away from hydrogenation-dehydration reactions (C—O cleavage) and towards C—C scission reactions at higher temperature. Accordingly, there was a noticeable decrease in the hydrogen consumption at 400° C. compared to 350° C. (see FIG. 5A). While some acetone was observed via ketonization at 350° C. and 400° C., coupling products accounted for less than 5 mol % of the product composition.

Figure 7A:
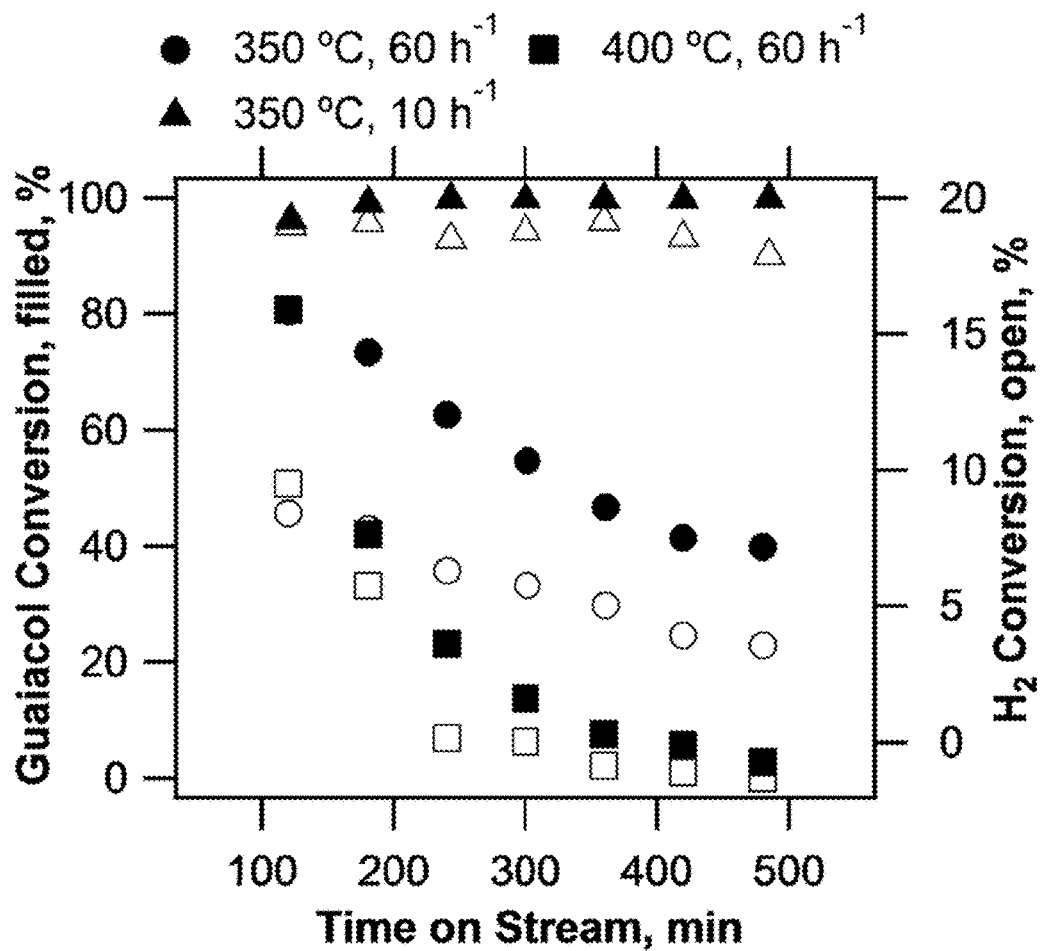
FIGS. 7A, 7B, and 7C illustrate experimental results for the deoxygenation of guaiacol with hydrogen over a fixed-bed of a metal carbide ($Mo_2C$), according to some embodiments of the present disclosure.
Figure 7B:
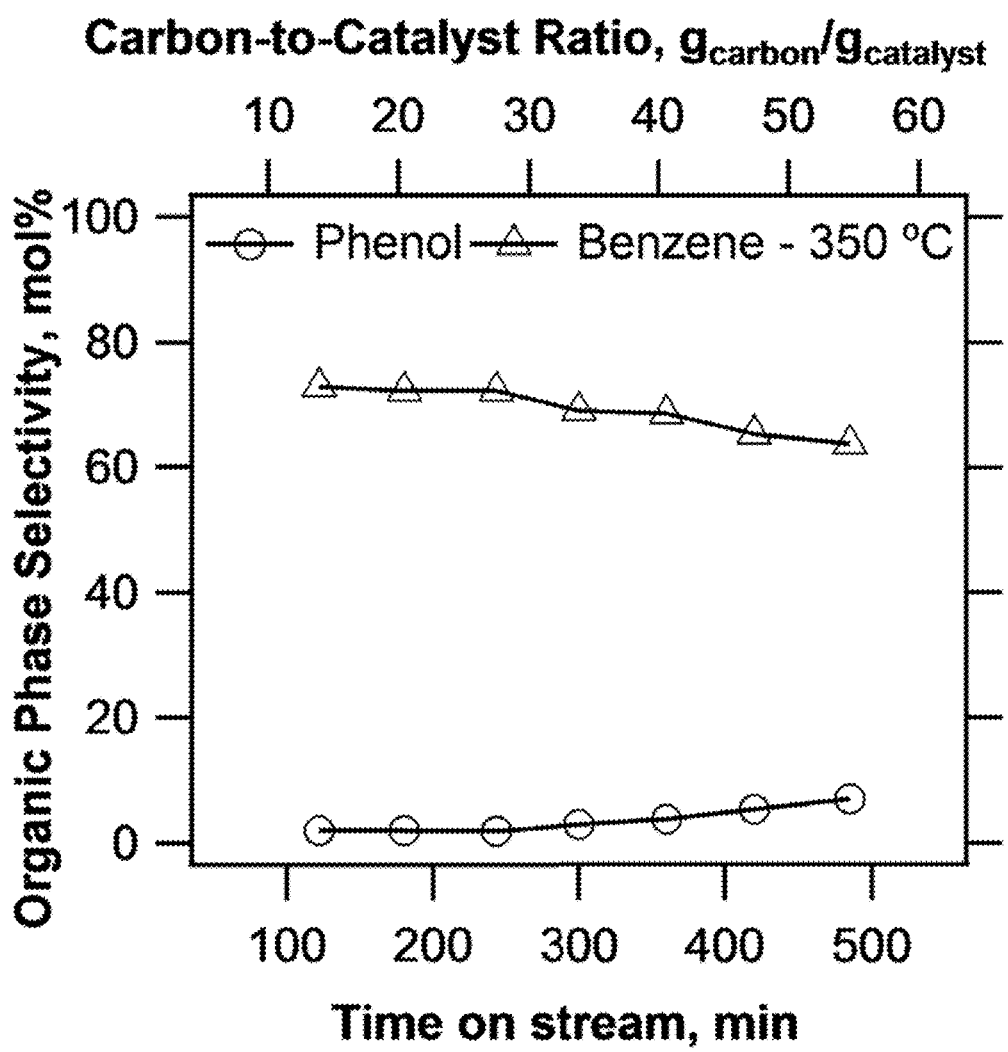
Figure 7C:
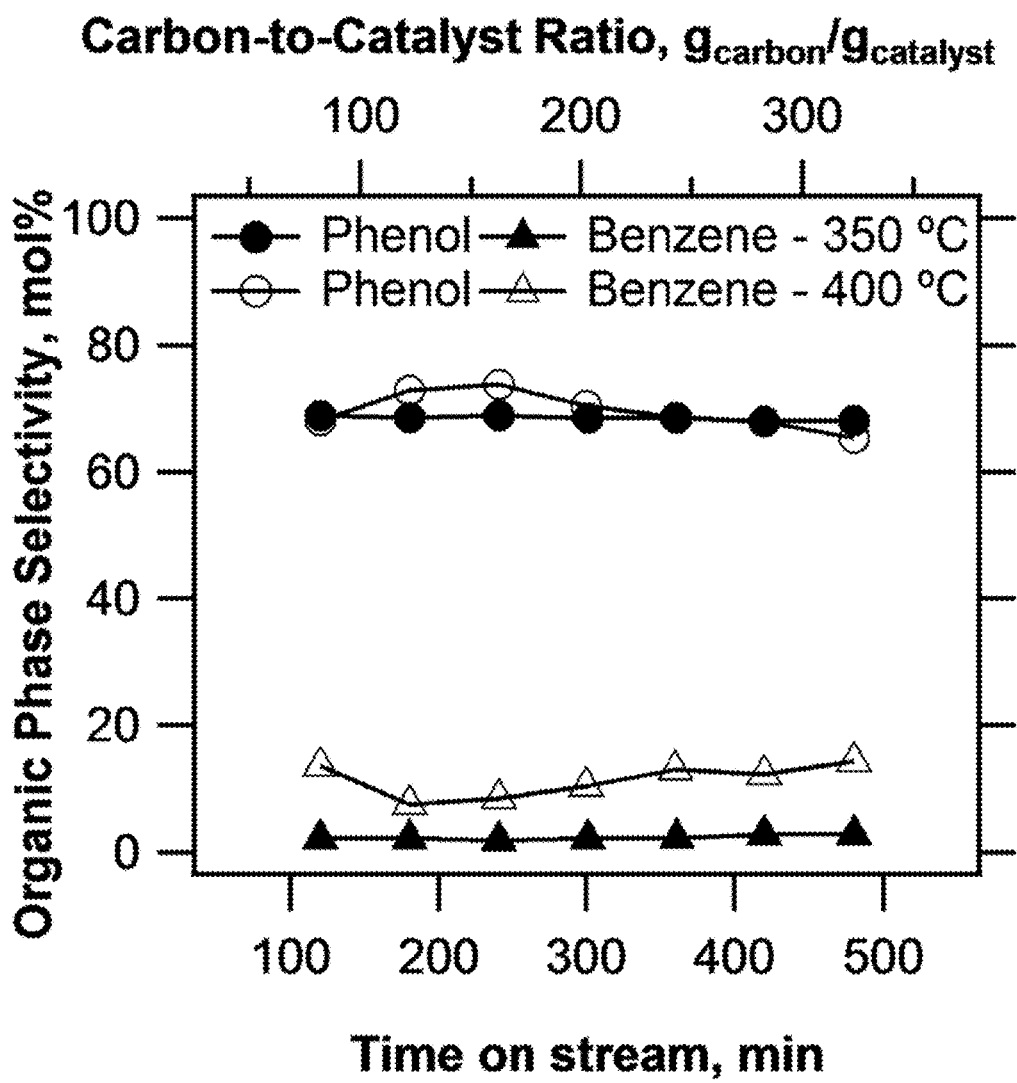
Figure 8A:
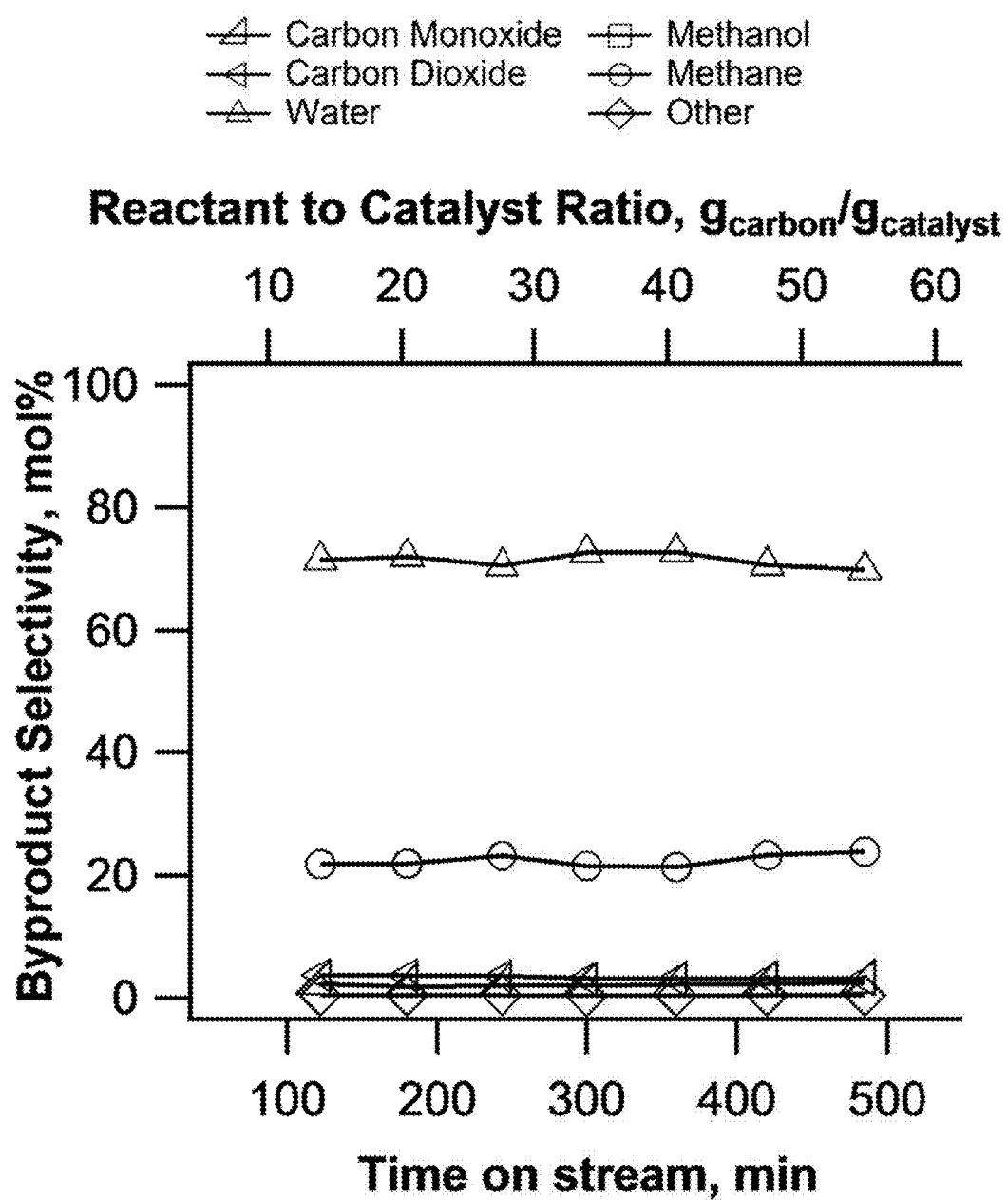
FIGS. 8A through 8F illustrate experimental results for the deoxygenation of guaiacol with hydrogen over a fixed-bed of a metal carbide ($Mo_2C$), according to some embodiments of the present disclosure.
Figure 8B:
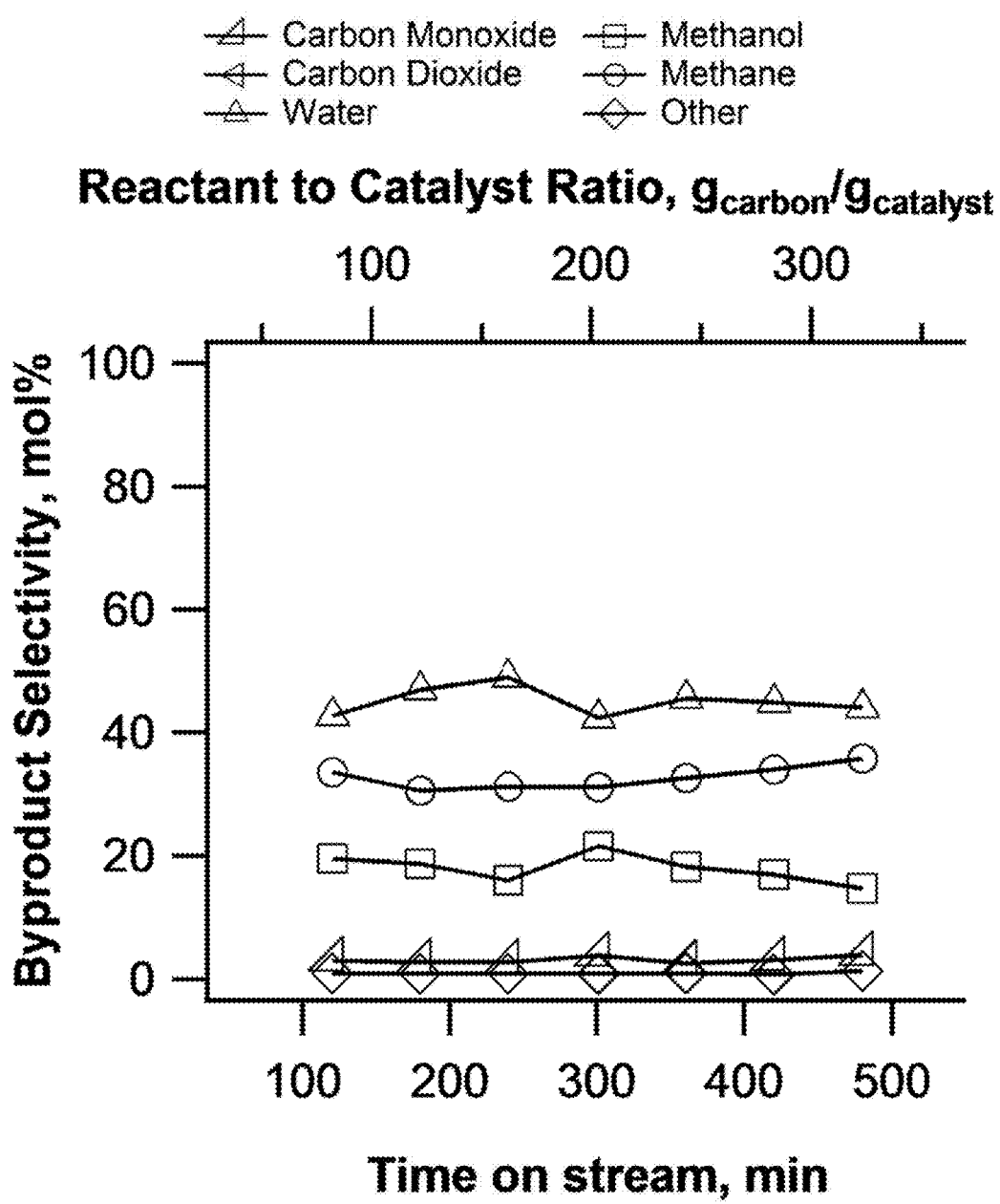
Figure 8C:
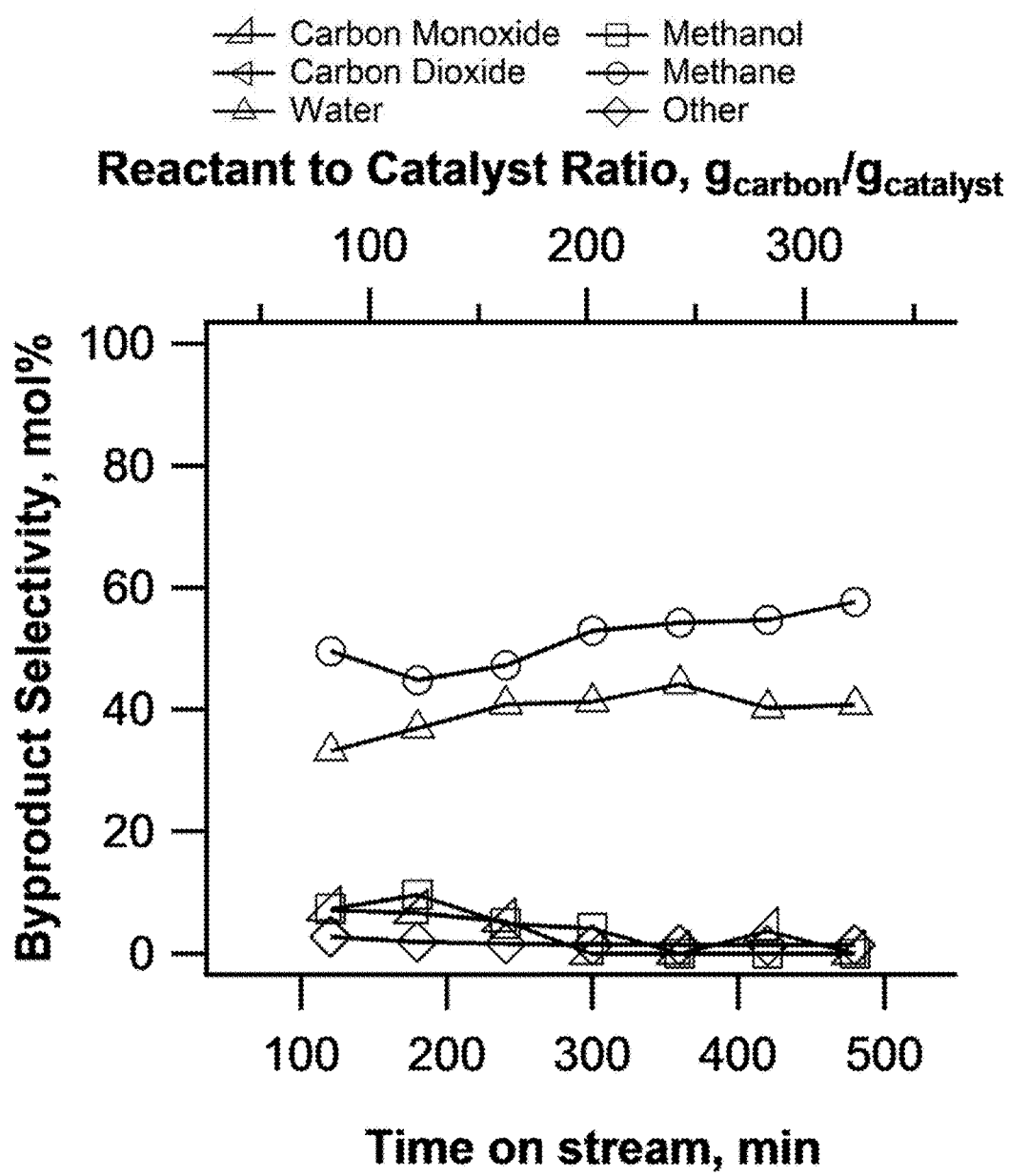
Figure 8D:
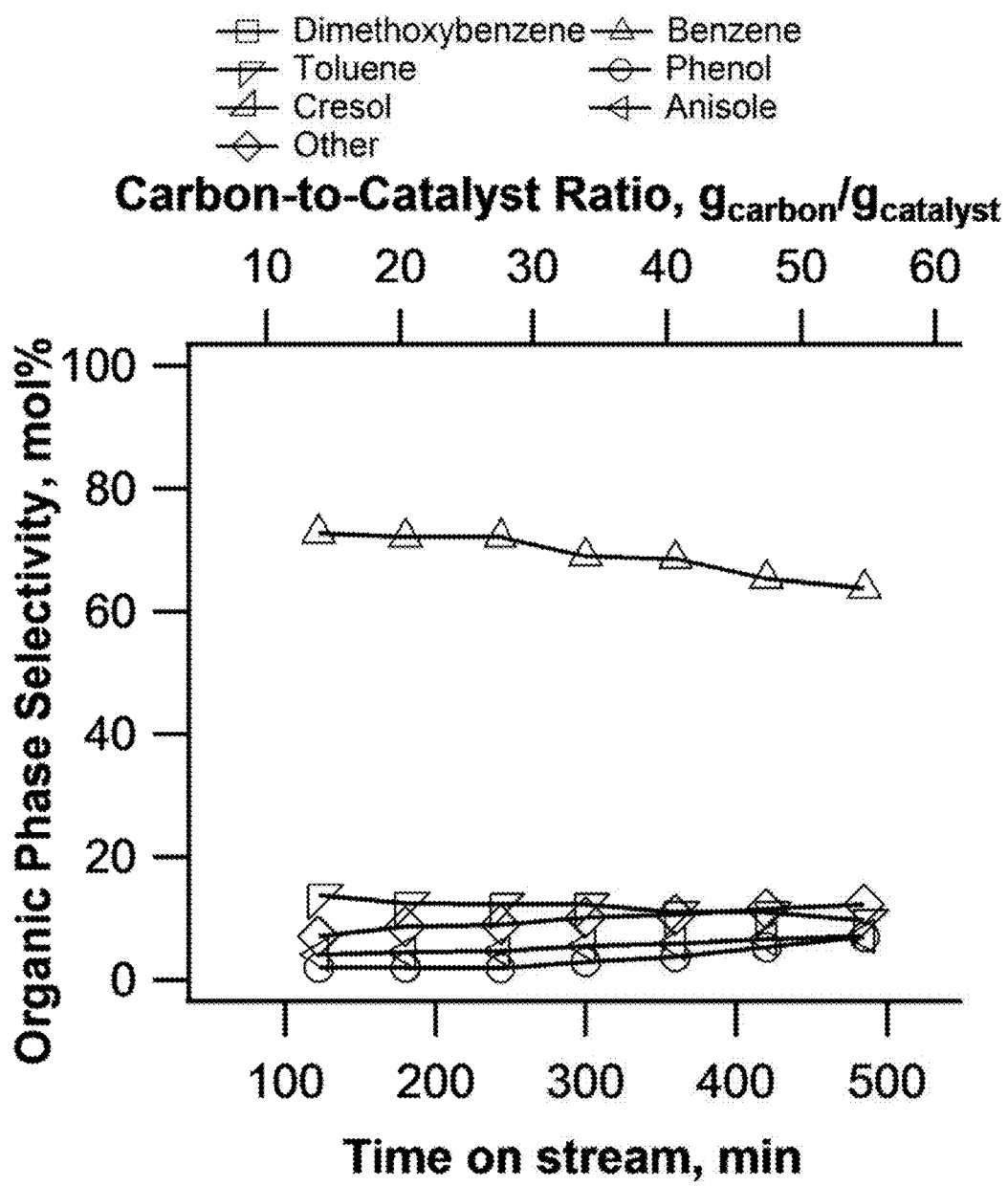
Figure 8E:
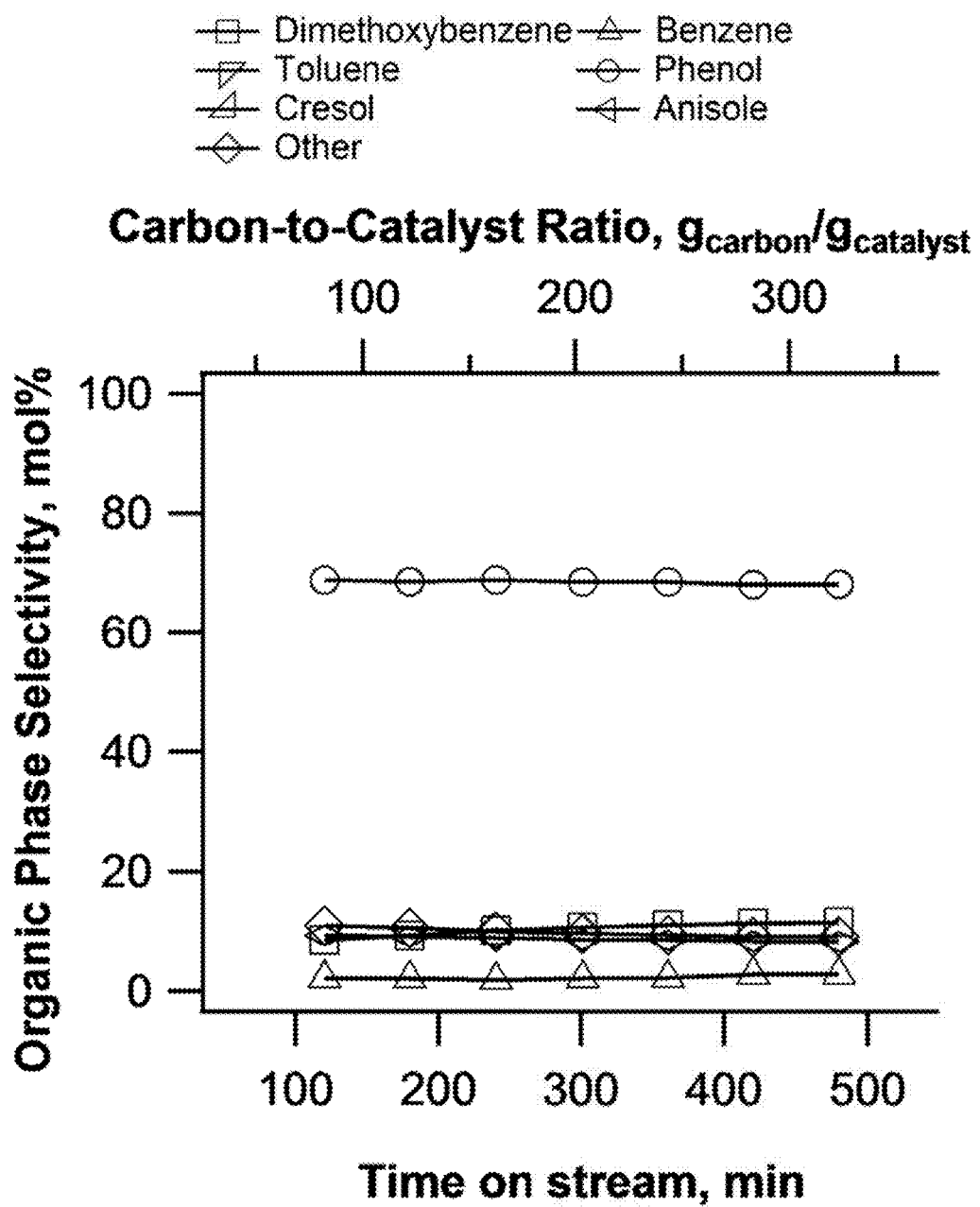
Figure 8F:
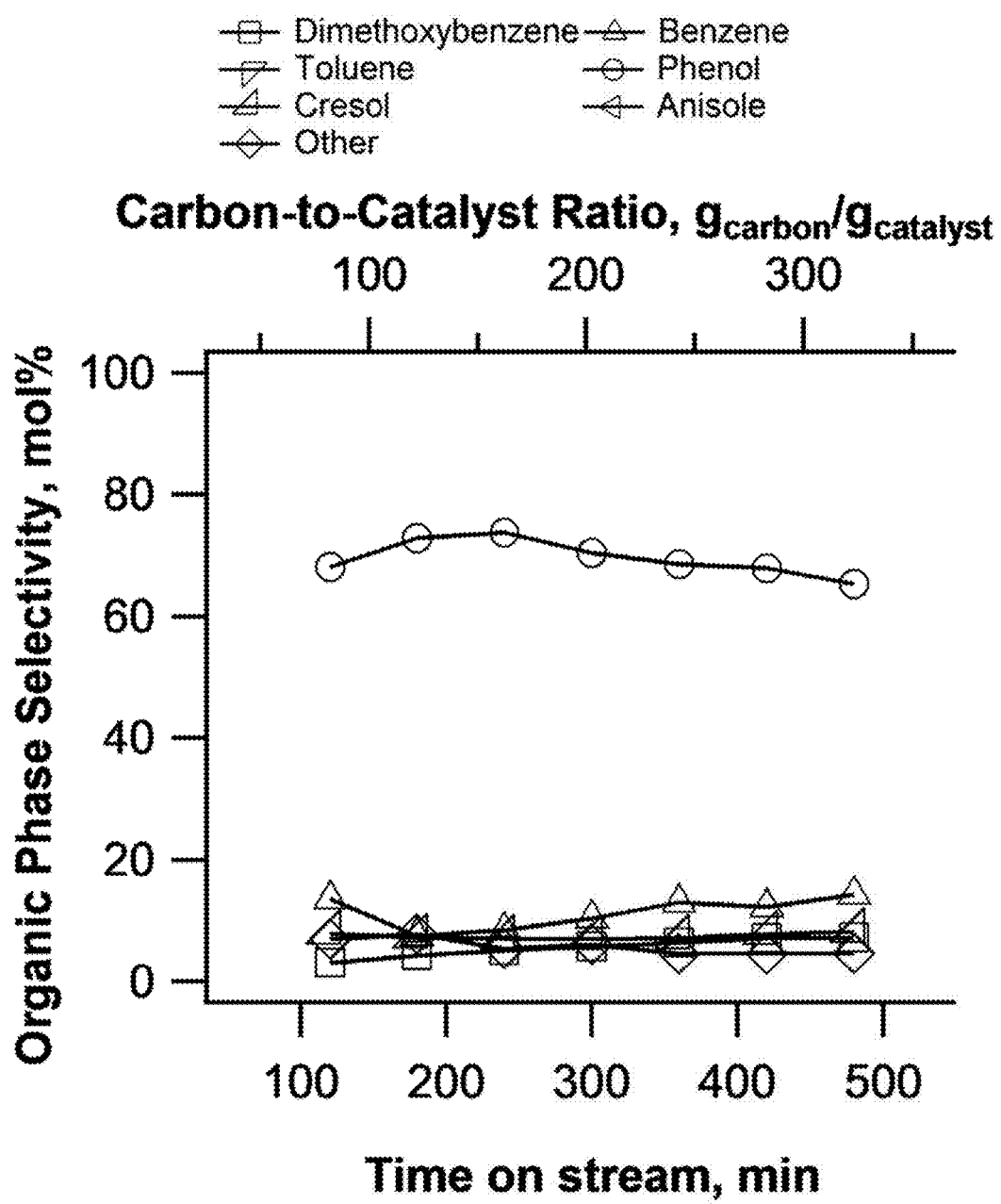

For guaiacol deoxygenation, catalyst performance was compared as a function of WHSV in addition to temperature (see FIGS. 7A, 7B, and 7C). At 350° C. and low WHSV (10 $h^{-1}$), $Mo_2C$ achieved near complete deoxygenation of the guaiacol feed. The dominant products were benzene and toluene, which constituted about 70% and 10% of the organic phase product composition, respectively (see FIG. 7B and FIGS. 8A-8F). The organic phase refers to reaction products with a carbon number ≥6 and excludes by-products such as methane, methanol, carbon monoxide, carbon dioxide, and water. A complete description of the organic phase and by-product selectivities are given in FIGS. 8A-8F. Similar to the acetic acid experiments, limited hydrogenation was observed, with ring-saturated products accounting for less than 1 mol % of the product composition. These results indicate that $Mo_2C$ is capable of C—O bond activation without first hydrogenating the aromatic ring, suggesting that these catalysts may be particularly effective for deoxygenation in low hydrogen partial pressure environments.

At 350° C. and $10h^{-1}$, $Mo_2C$ exhibited minimal deactivation during 8 h TOS; however, at 60 $h^{-1}$, appreciable deactivation was observed (see FIG. 7A). The catalyst appeared to deactivate at a higher rate at 400° C. than at 350° C. The higher conversion and enhanced stability observed at 350° C. suggest that it is a preferable reaction temperature for ex-situ CFP using $Mo_2C$; however, in practice, operating at higher temperature may be necessary to ensure all components of biomass pyrolysis remain in the vapor phase. It should be noted that the carbon-to-catalyst mass ratios during the guaiacol deoxygenation experiments were much higher than during the acetic acid experiments due to the higher WHSV (dictated by the need to collect liquid samples for analysis). Thus, the transient behaviour of the catalyst at low carbon-to-catalyst ratios (less than 1) cannot be determined for the guaiacol experiments. However, the activity of $Mo_2C$ appeared to be much more stable under guaiacol feed than under acetic acid feed, as evidenced by the minimal deactivation observed at 350° C. and 10 $h^{-1}$, up to a carbon-to-catalyst ratio of about 60.

At high WHSV (60 $h^{-1}$), the extent of deoxygenation decreased, as indicated by phenol being the dominant organic phase product at about 70 mol % (see FIG. 7C). These results suggest that aromatic oxygenates from lignin and pine pyrolysis vapors should be deoxygenated to phenols or aromatic hydrocarbons. Transmethylation products, such as 1,2-dimethoxybenzene, isomers of cresol, and toluene, were also observed and are likely formed over acidic sites on the carbide surface (see FIGS. 8A-8F). Beyond these minor products, there was little evidence of coupling reactions with guaiacol.

When compared on a carbon-to-catalyst mass ratio basis, $Mo_2C$ appeared to deactivate faster in the presence of acetic acid as compared to guaiacol, suggesting that some carbohydrate-derived intermediates may play a greater role in catalyst deactivation than lignin-derived intermediates. With the exception of the rapid deactivation and decrease in extent of deoxygenation observed for acetic acid at early TOS, product selectivities as a function of TOS at 350° C. were essentially constant for acetic acid and guaiacol experiments even though the $Mo_2C$ catalyst was still slowly deactivating. This invariant product selectivity suggests that long-term deactivation results from a decreased number of active sites rather than a change in active site structure/ functionality. The initial rapid deactivation observed during acetic acid deoxygenation could be due to carbon deposition or surface oxidation.

The conversion of pine pyrolysis vapors over $Mo_2C$ was explored using a tandem micropyrolyzer-fixed-bed reactor with online GC analysis (py-GCMS/FID) and a molecular beam mass spectrometer (MBMS). In these experiments, sequential "pulses" of the pine feed were pyrolyzed at 500° C. in the first reactor and the vapors were fed over the fixed catalyst bed in the second down-stream reactor. In the py-GCMS/FID experiments, the complex oxygenated vapors were converted to $C_2$-$C_7$ paraffins and alkylated single-ring aromatic molecules with little or no organic oxygenate by-products over $Mo_2C$ in the presence of co-fed $H_2$ at 0.1 MPa (see FIG. 9). $Mo_2C$ exhibited a higher hydrocarbon yield at 350° C. (30%) than at 400° C. (21%), consistent with the acetic acid deoxygenation results that showed a shift towards C—C cleavage at higher temperatures, thus producing more light gases (i.e., CO, $CO_2$, $CH_4$). This result was recorded from an average of three biomass pulses with a cumulative biomass-to-catalyst ratio of about 0.3 and carbon-to-catalyst mass ratio of about 0.15 (carbon in the feed). As with the model compounds, $Mo_2C$ efficiently deoxygenated the pine, lignin and cellulose pyrolysis vapors. The phenolic pyrolysis products from lignin were converted completely into aromatic molecules similar to the results from guaiacol deoxygenation at a low WHSV, with no evidence of ring opening. The carbohydrate products from pine and cellulose, however, were converted into paraffins, with no evidence of olefin formation.

Figure 9:
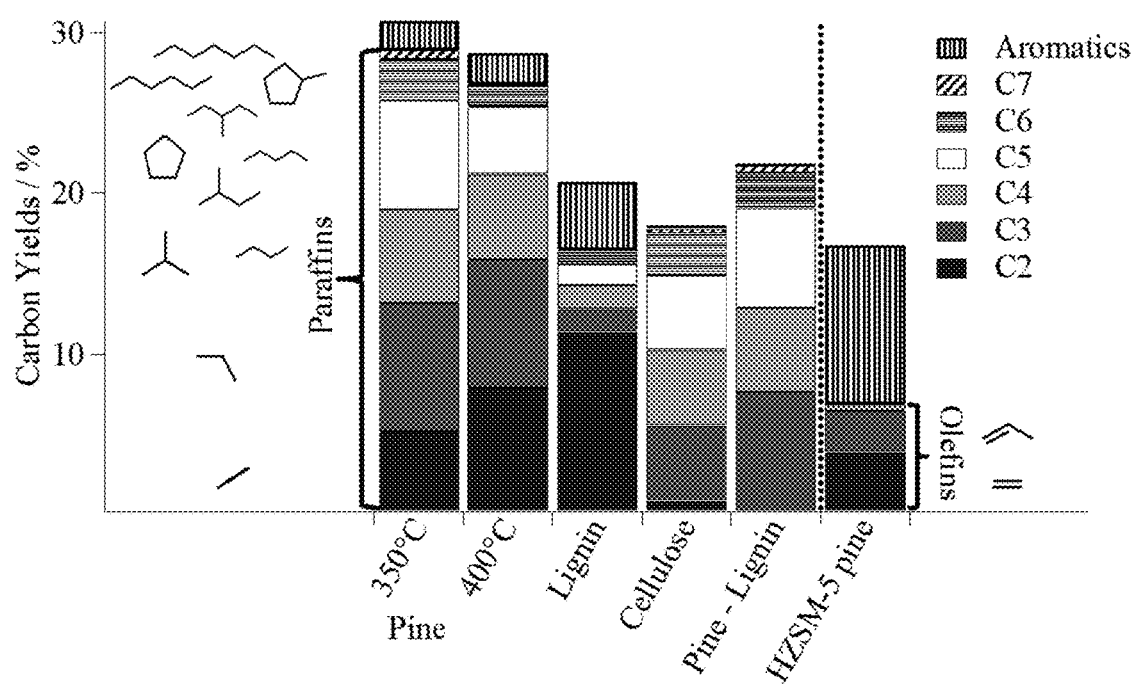
FIG. 9 illustrates experimental results for the deoxygenation of pine pyrolysis vapors with hydrogen over a fixed-bed of a metal carbide ($Mo_2C$), according to some embodiments of the present disclosure: Product yield in the py-GCMS/FID system from the conversion of pyrolysis vapors from pine at 350° C. and 400° C., lignin and cellulose at 350° C. over $Mo_2C$ and pine over HZSM-5 (a zeolite) at 500° C. The C2-C7 products refer to paraffins and naphthenes from upgrading with $Mo_2C$ or olefins from HZSM-5. The data labelled 'Pine-Lignin' is calculated by subtracting the pine yield from the lignin yield at 350° C. over $Mo_2C$. The aromatics from $Mo_2C$ consist of benzene and alkyl benzenes compared to the benzenes, naphthalenes and anthracenes from HZSM-5. Yields are calculated as weight percent of feed.

For comparison, the product distribution from the conversion of pine pyrolysis vapors over a common zeolite catalyst, HZSM-5, is also presented in FIG. 9. This reaction was performed at 500° C. in the absence of $H_2$. Compared to HZSM-5, $Mo_2C$ demonstrated a greater carbon yield with fewer aromatics, and the non-aromatic selectivity favored $C_2$-$C_6$ paraffins over $C_2$-$C_3$ olefins. It is worth noting, however, that carbon yields from the HZSM-5 experiment under these conditions are significantly lower than those obtained using a larger-scale fluidized bed reactor. This difference may be due to the high char yields (~40%) obtained with the py-GCMS/FID experiment. In addition, the $C_{5+}$ hydrocarbon yields from HZSM-5 were similar to those from $Mo_2C$ (9.8% for HZSM-5 at 500° C., and 11.8% and 7.5% for $Mo_2C$ at 350° C. and 400° C., respectively).

For HZSM-5, the aromatic and olefin products arise from extensive coupling, dehydration, and decarbonylation chemistry. Similar products are observed with methanol, where the "carbon pool" chemistry occurs within the microporous structure of the zeolite, though the mechanisms for biomass may be different. It is of interest to compare the products that originate from pine pyrolysis vapors and the individual biopolymers over $Mo_2C$, where coupling appears to be reduced and microporous confinement is diminished. The carbon yields at 350° C. and 400° C. from whole pine are compared with those at 350° C. using lignin and cellulose as isolated biopolymers (FIG. 9). Upgrading of cellulose pyrolysis vapors produced exclusively paraffins, while the upgrading of lignin pyrolysis vapors produced predominantly single-ring aromatic compounds (e.g., benzene and toluene) and paraffins that were likely derived from the propyl linkages. From these experiments with the individual biopolymers, the cellulose contribution to the whole pine product distribution was determined (designated "Pine-Lignin" in FIG. 9). The data suggest that all of the aromatics in the pine product suite arose from lignin. The full lignin product distribution was scaled so that the amount of aromatics in the lignin equalled the amount in the pine distribution (resulting in a multiplication factor of 0.43) and then subtracted from the pine products. By subtracting the lignin-derived aromatics and paraffins from the products of whole pine, a product distribution similar to that of the isolated cellulose experiment remains. This analysis further highlights that there is some independence between the products from lignin and cellulose, supporting the experiments with the individual biopolymers that the majority of the paraffins come from the cellulose portion. The limited coupling observed in the acetic acid and guaiacol model compound experiments is consistent with the independence of the different biopolymers as coupling would provide a mechanism for interaction during conversion.

Figure 10:
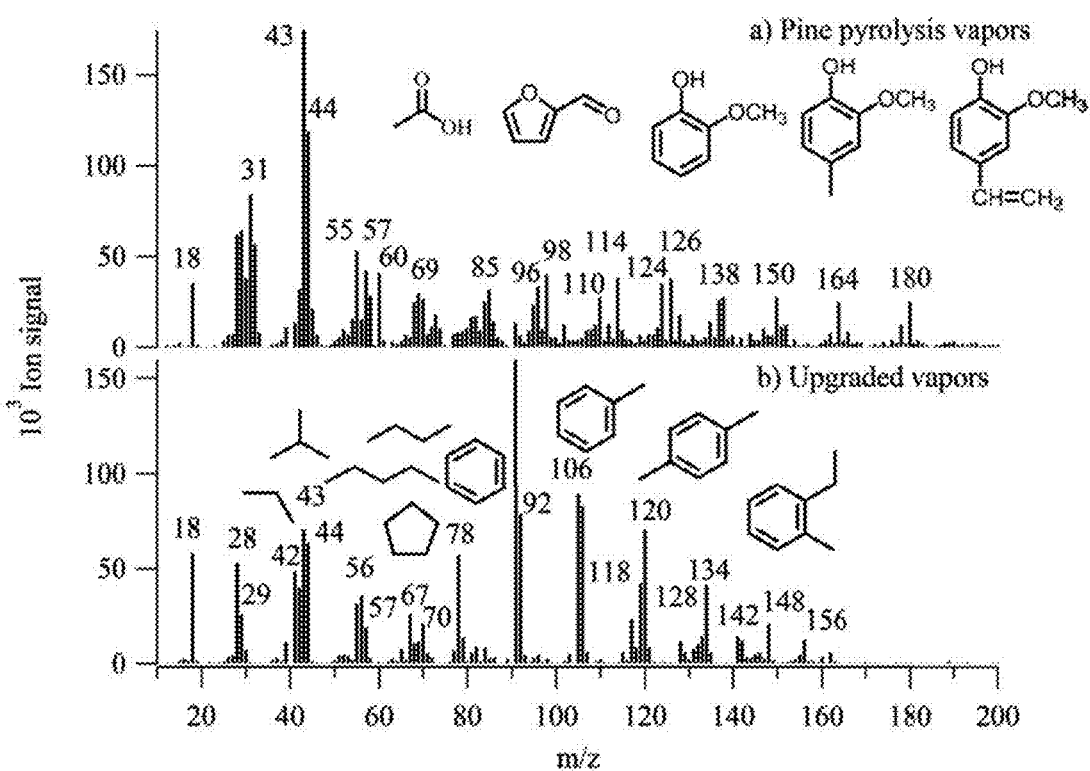
FIG. 10 illustrates experimental results for the deoxygenation of pine pyrolysis vapors with hydrogen over a fixed-bed of a metal carbide ($Mo_2C$), according to some embodiments of the present disclosure: molecular beam mass spectra (MBMS) of the products from the pyrolysis of pine at 500° C. (Panel a) and the conversion of those products over fresh $Mo_2C$ held at 400° C. (Panel b). (Biomass-to-catalyst ratio of 0.1 and carbon-to-catalyst ratio of 0.05.)

During the py-GCMS/FID experiments, some compounds may not be observed due to losses in the columns and the liquid nitrogen trap. The py-MBMS, which allows for direct sampling of products, was used to explore losses and compliment the py-GCMS/FID experiments. The py-MBMS results also demonstrated that paraffins and aromatic compounds are the major products from upgrading pine pyrolysis vapors over $Mo_2C$. FIG. 10 presents the change to the mass spectrum composition of pine pyrolysis vapors when passed over the $Mo_2C$ catalyst at 400° C. The oxygenated molecules in the pyrolysis vapor were converted into paraffins and primarily single-ring aromatic molecules. For example, the m/z 60 and 124 peaks for acetic acid and guaiacol respectively, observed in FIG. 10 Panel a are not observed in the upgraded mass spectrum in FIG. 10 Panel b. The peaks in the top spectrum with m/z less than 72 arise from paraffins. Notable exceptions include m/z values of 18, 28 and 44, which correspond to water, carbon monoxide and carbon dioxide, respectively. Benzene and mono- to hexa-methyl benzene are observed with peaks at m/z of 78, 91 and 92, 106, 120, 134 and 148. There are also small peaks for naphthalene (m/z=128), methylnaphthalene (m/z=142) and dimethylnaphthalene (m/z=156). These two-ring aromatic molecules were not observed with the py-GCMS/FID because the MBMS is more sensitive to aromatic hydrocarbons. Although $Mo_2C$ proved to be effective at oxygen removal under the conditions presented above, it demonstrates little activity for ring hydrogenation, as evidenced by the high selectivity to aromatic products when lignin is used as a feed (see FIG. 9). This result may be due to an excess of acidic sites relative to hydrogenation sites (i.e., titration ratio of 8:1 acidic:H-adsorption sites) as well as thermodynamic limitations on the conversion of aromatics to cycloalkanes at temperature above 300° C.

The py-GCMS/FID and py-MBMS methods were also used to evaluate deactivation over the $Mo_2C$ catalyst. In the py-GCMS/FID and py-MBMS experiments, sequential pulses of the pine feed were pyrolyzed and the vapors were fed over the fixed catalyst bed to explore deactivation as a function of the weight of biomass pyrolyzed per weight of catalyst (i.e., the biomass-to-catalyst ratio). This ratio was also converted to a carbon-to-catalyst ratio so that results could be compared to the model compound studies. The biomass-to-catalyst ratio in both py-GCMS/FID and py-MBMS experiments increased by 0.1 per biomass pulse, but the absolute weights of biomass and catalyst were different as discussed in supplemental information. Signals for aromatic products are presented in FIG. 11 for these two experiments at 400° C. as a function of the biomass-to-catalyst (carbon-to-catalyst) ratio. For the py-GCMS/FID experiment, the aromatics signal remains constant within the experimental error, and the GCMS/FID chromatograms essentially remain unchanged throughout the experiment.

Figure 12:
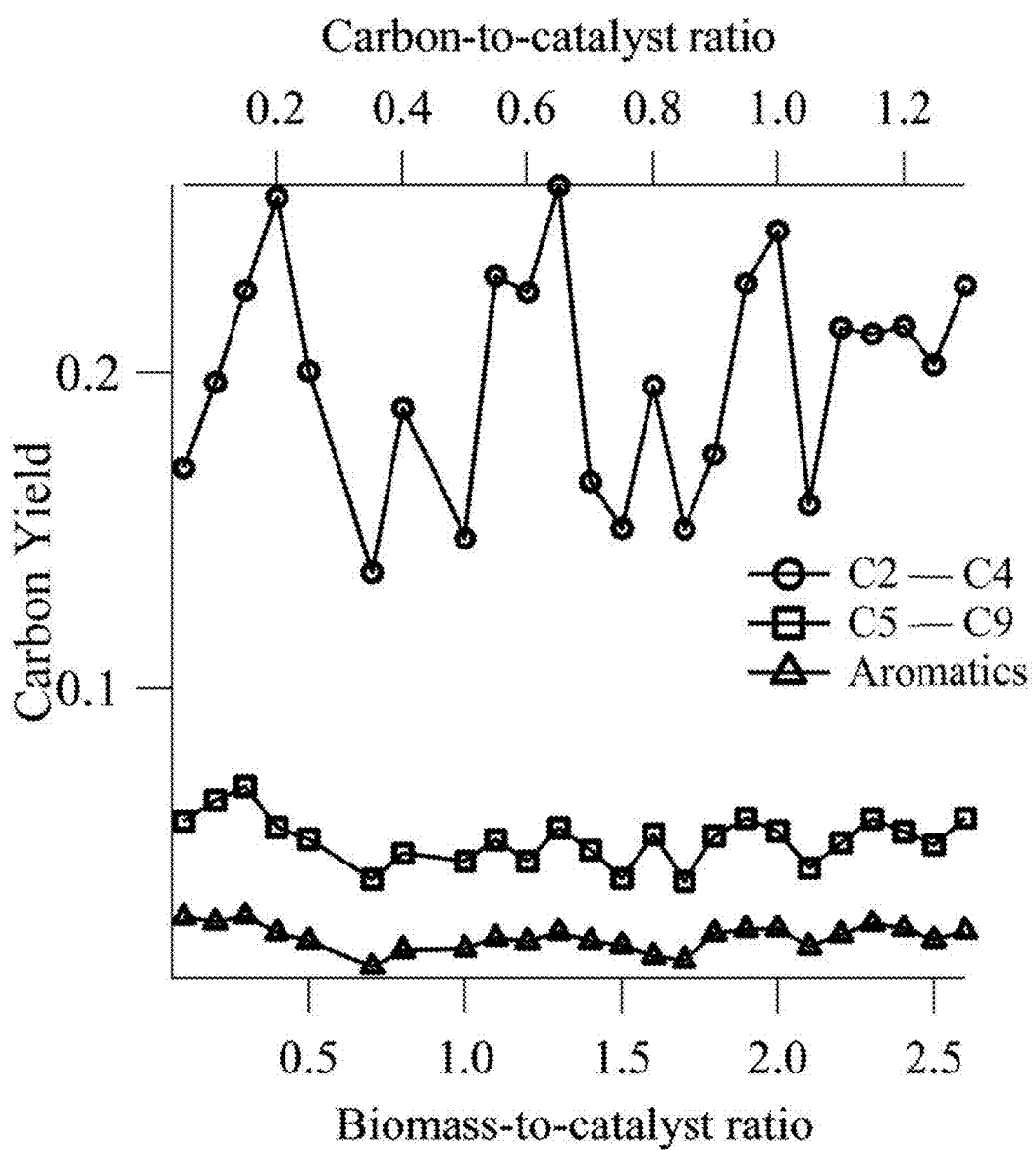
FIG. 12 illustrates experimental results for the deoxygenation of pine pyrolysis vapors with hydrogen over a fixed-bed of a metal carbide ($Mo_2C$), according to some embodiments of the present disclosure: products from conversion of pine pyrolysis vapors over $Mo_2C$ catalyst using py-GCMS/FID. Pyrolysis performed at 500° C. and catalytic upgrading at 400° C.

Similarly, the yields of the paraffin products do not change throughout the course of the experiment (see FIG. 12).

Figure 11:
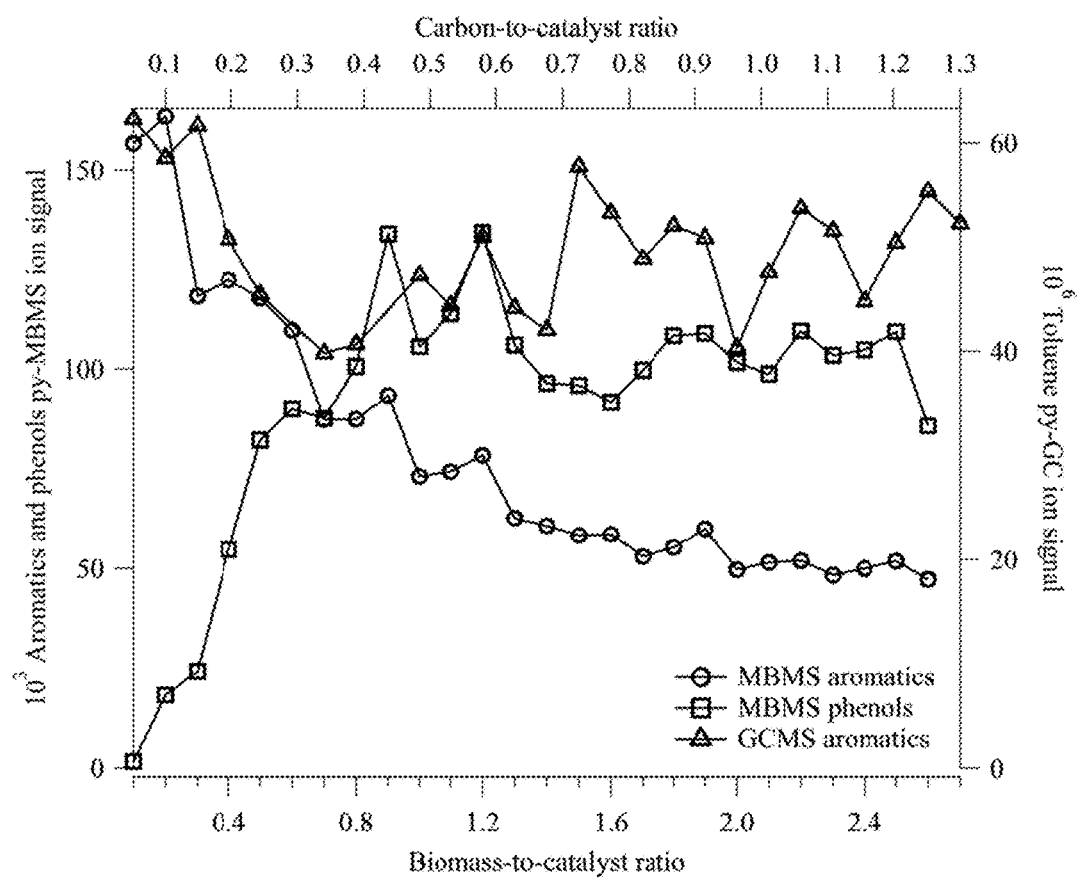
FIG. 11 illustrates experimental results for the deoxygenation of pine pyrolysis vapors with hydrogen over a fixed-bed of a metal carbide ($Mo_2C$), according to some embodiments of the present disclosure: ion signals for aromatics (benzene+toluene) and phenols from the MBMS experiment and the FID signal for aromatics (benzene+toluene) from the py-GCMS/FID experiment. The signals are plotted as function of the biomass-to-catalyst ratio and carbon-to-catalyst ratio.

In contrast, the aromatics signal from the MBMS experiment decreased and the phenols signal increased with increasing biomass pulses (see FIG. 11). Concurrently, the mass spectra changed from that in FIG. 10 Panel b to one that begins to resemble that in FIG. 10 Panel a, indicating that as the catalyst deactivated with the addition of pine vapors, the product distribution shifted from fully deoxygenated aromatics to include partially deoxygenated phenols, consistent with the shift observed in the guaiacol deoxygenation experiments at higher carbon-to-catalyst ratios. Interestingly, the rapid decrease in the extent of deoxygenation was observed at similar carbon-to-catalyst mass ratios (less than about 0.4) as for the acetic acid experiments.

Experiments conducted on the py-MBMS with cellulose and lignin also show that $Mo_2C$ deactivated faster when fed cellulose vapors than when fed lignin vapors. The cellulose pyrolysis products started to break through at a biomass-to-catalyst ratio of 0.3 or carbon-to-catalyst ratio of 0.13 (cellulose has 44% carbon) compared to ratios of 1.2 and 0.8 respectively for lignin pyrolysis products (lignin has 64% carbon). These results are consistent with the model compound studies, in which the activity of $Mo_2C$ was stable up to much higher carbon-to-catalyst ratios under guaiacol (lignin-derived) feed than under acetic acid (carbohydrate-derived) feed. These results suggest that cellulose- and carbohydrate-derived intermediates may be the predominant cause of the rapid deactivation and rapid decrease in extent of deoxygenation observed at low biomass-to-catalyst (carbon-to-catalyst) ratios.

The catalyst deactivated to a greater extent during the py-MBMS experiment where there were 2 minutes pauses between biomass pulses than during the py-GCMS/FID experiment where the pauses were 30 minutes. During these pauses, the carrier gas (50% $H_2$) continued to flow over the catalyst at 400° C. This 30 minutes re-reduction apparently reactivated the catalyst between pine additions in the py-GCMS/FID experiment, but 2 minutes was not long enough to achieve the same effect in the py-MBMS experiments. It is proposed that this re-activation was a result of (1) the desorption of reversibly-bound carbonaceous species (these species may need to react with $H_2$ prior to readily desorbing, and the temporary decrease in pyrolysis vapor partial pressure and resulting increase in $H_2$ partial pressure facilitates this reaction) and/or (2) the reduction of $Mo_2C$ sites that have been oxidized during the reaction. Further research is needed to determine the exact cause of deactivation during ex-situ CFP.

The catalytic performance of $Mo_2C$ for ex-situ CFP was evaluated using model compounds (acetic acid and guaiacol) and pine pyrolysis vapors. At 350 and 400° C. in the presence of co-fed $H_2$, $Mo_2C$ exhibited high hydrocarbon yields and near complete deoxygenation of pine pyrolysis vapors. The dominant products were $C_2$-$C_7$ paraffins and alkylated single-ring aromatics. Consistent with model compound studies, the $Mo_2C$ catalyst deactivated with increasing biomass-to-catalyst ratios, exhibiting a decrease in the overall extent of deoxygenation. Overall, these findings highlight $Mo_2C$ as a promising catalyst for ex-situ CFP.

Figure 13:
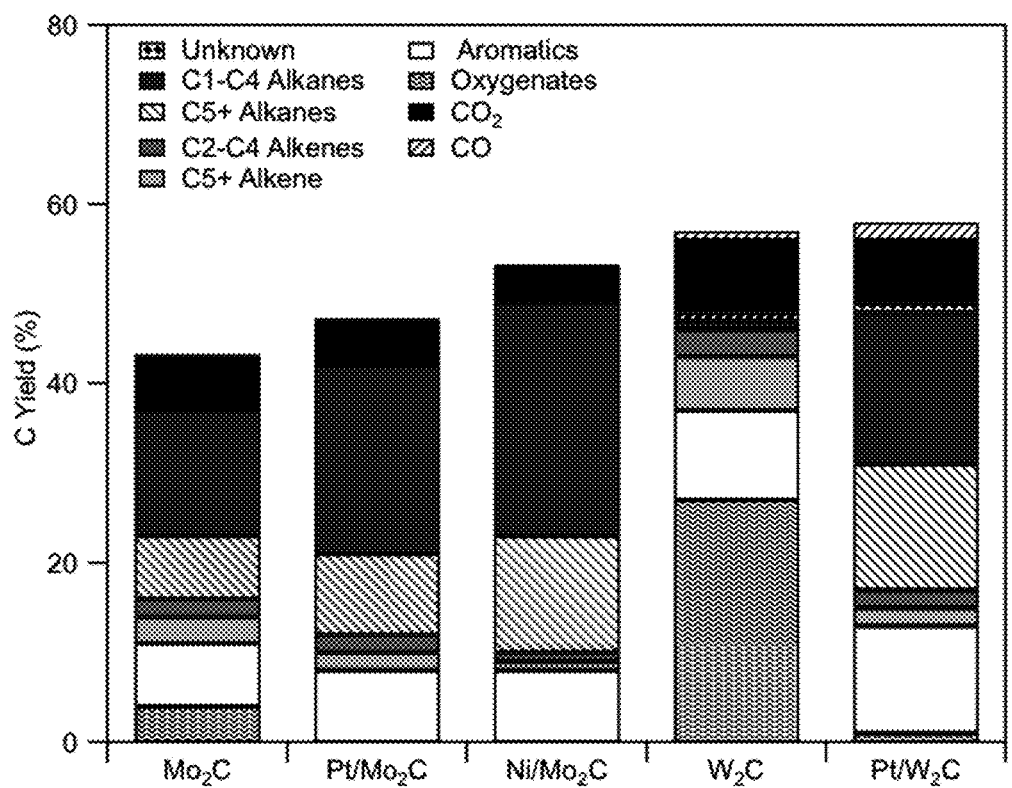
FIG. 13 illustrates experimental results for the deoxygenation of pine pyrolysis vapors with hydrogen over a fixed-bed of metal carbides and metal-modified metal carbides, according to some embodiments of the present disclosure: Carbon yields for all products observed in a py-GCMS/FID system from the conversion of pyrolysis vapors at 400° C. over metal carbide and metal carbide supported transition metal catalysts.

FIG. 13 illustrates the experimental results for the deoxygenation of pine pyrolysis vapors with hydrogen over a fixed-bed of metal carbide and metal-modified metal carbide, according to some embodiments of the present disclosure. The catalysts compared in FIG. 13 include $Mo_2C$, $Mo_2C$ modified with platinum (Pt/$Mo_2C$), $Mo_2C$ modified with nickel (Ni/$Mo_2C$), tungsten carbide ($W_2C$), and platinum-modified tungsten carbide (Pt/$W_2C$). Characterization data for each of these five solid catalysts are summarized in Table 1 below.

TABLE 1

H-activating site (H* values), acid site values, and acid:H* site ratios for parent and metal-modified carbides

| Catalyst | H* sites (µmol/g) | Acid Sites (µmol/g) | Acid:H* site ratio |
|---|---|---|---|
| $Mo_2C$ | 57.2 | 615 | 11 |
| Pt/$Mo_2C$ | 127 | 600 | 4.7 |
| Ni/$Mo_2C$ | 132 | 605 | 4.6 |
| $W_2C$ | 8 | 312 | 39 |
| Pt/$W_2C$ | 31 | 300 | 10 |

Table 1 presents the hydrogen-activating (H* sites) determined by $H_2$ chemisorption, acid site densities determined by $NH_3$-TPD (acid sites), and the acid:H* site ratio. The parent β-$Mo_2C$ material had an acid site density of 615 $\mu mol/g_{cat}$ that is typically observed based on particle size, extent of passivation, and the re-activation procedure (e.g., 450° C. versus 400° C.). In all cases, deposition of the late-transition metal onto the surface of the β-$Mo_2C$ resulted in a negligible change in the acid-site densities of the M/$Mo_2C$ catalysts, with a ±2% maximum deviation from the parent β-$Mo_2C$ value, as shown in Table 1. Conversely, the addition of late transition metals to β-$Mo_2C$ significantly affected the abundance of H*-sites (Table 1). The H*-site densities of Ni/$Mo_2C$ (132 µmol $\mu mol_{H*}/g_{cat}$) and Pt/$Mo_2C$ (127 $\mu mol_{H*}/g_{cat}$) were more than 2-fold greater than the parent β-$Mo_2C$ material (57.2 $\mu mol_{H*}/g_{cat}$). $H_2$-chemisorption of the parent and Pt-modified $W_2C$ shows a nearly 4-fold increase in the H* site density on the Pt modified catalyst, while $NH_3$-TPD data reveal a nearly equivalent number of acid sites. These data suggest that modification of $W_2C$ with Pt has little impact on the acid-site density of the resultant catalyst, while significantly increasing the concentration of H* sites. Each catalyst was evaluated for the upgrading of pine pyrolysis vapors in a microscale reactor system under ex situ CFP conditions (400° C., 0.05 MPa $H_2$). The pyrolysis was performed at 500° C. with the vapors subsequently passed over the catalysts for upgrading.

The $W_2C$ deoxygenation catalyst achieved a very high liquid-range carbon yield of 43%. However, the significant amount of primary vapors contained in the deoxygentation reactor's product illustrates a low deoxygenation performance for $W_2C$ when compared to other catalysts shown in FIG. 13 and summarized in Table 1. For both molybdenum carbide and tungsten carbide, the addition of Pt increased the yield of liquid-range hydrocarbons. The impact was greater for Pt/$W_2C$, for which the production of oxygenates was dramatically reduced. For $Mo_2C$, Ni modification enhanced the alkane yields more than Pt modification. For all the carbides, the formation of alkanes was correlated with the H* site density summarized in Table 1. $W_2C$, which had the lowest number of H* sites, exhibited only 1% carbon yield of alkanes, while Ni/$Mo_2C$ with the highest H* site density gave the highest alkane yield (39%). Thus, in some embodiments of the present disclosure, a solid catalyst for deoxygenating (e.g. upgrading) pyrolysis vapors may include a metal carbide having a H* density greater than zero µmol/g, greater than 8 µmol/g, between about 1 µmol/g and about 300 µmol/g, or between about 8 µmol/g and about 127 µmol/g. In some embodiments of the present disclosure, the metal carbide may contain additional metals, including transition metals such as platinum, palladium, ruthenium, rhodium, copper, silver, cobalt, iron, rhenium, zinc, gold, and/or nickel.

Figure 14:
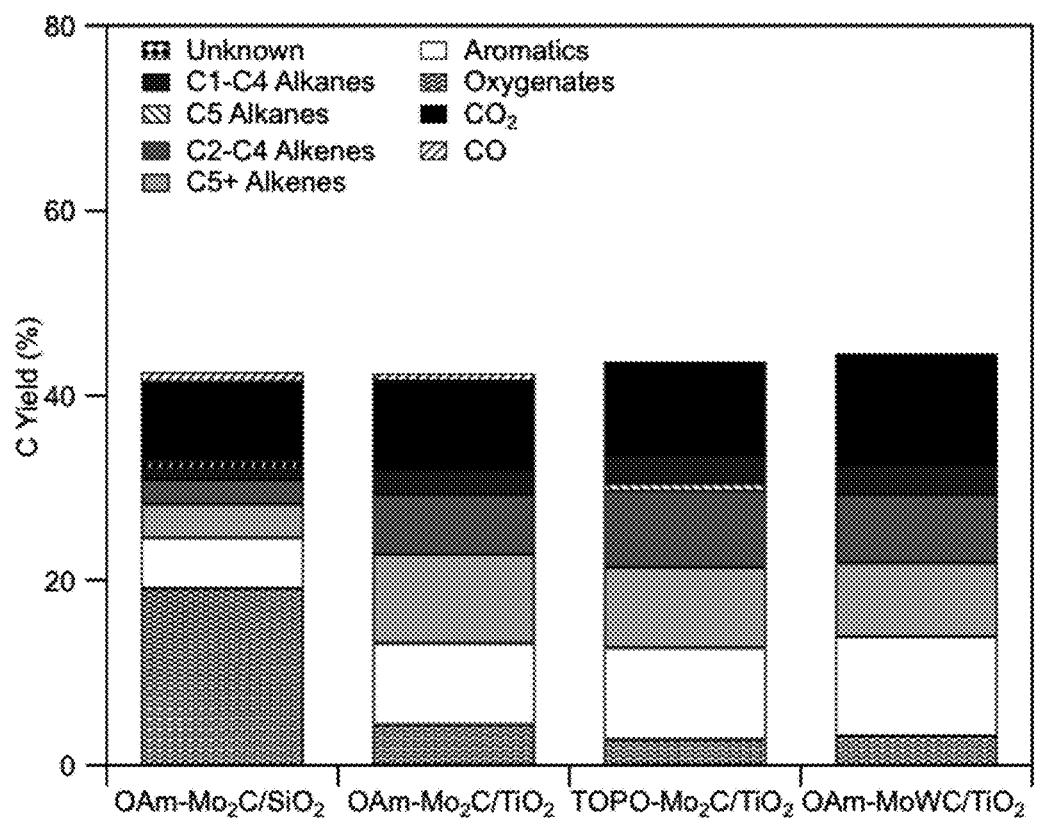
FIG. 14 illustrates the experimental results for the deoxygenation of pine pyrolysis vapors with hydrogen over a fixed-bed of metal carbide nanoparticles on oxide supports, according to some embodiments of the present disclosure: Carbon yields for all products observed in a py-GCMS/FID system from the conversion of pyrolysis vapors at 400° C. over nanoparticle metal carbides and nanoparticle mixed-metal carbides. 'OAm' refers to oleylamine and 'TOPO' refers to trioctylphosphine oxide.

FIG. 14 illustrates experimental results obtained from the deoxygenation of pine pyrolysis vapors with hydrogen over a fixed-bed of metal carbide nanoparticles on oxide supports, according to some embodiments of the present disclosure. Pyrolysis was performed at 500° C. and the vapors were subsequently contacted with nanoparticle metal carbides and nanoparticle mixed-metal carbides positioned in the fixed-bed reactor operated at 400° C. and 0.05 MPa $H_2$. FIG. 14 illustrates that nanoparticle carbide (NP) catalysts exhibited carbon yields comparable to the bulk metal carbide catalysts. NP catalysts supported on $SiO_2$ produced higher yields of oxygenates than catalysts supported on $TiO_2$. However, the oxygenates were partially upgraded in both cases and did not contain primary pyrolysis vapors. The oxygenates included straight chain and cycloketones, furan and alkyl furans, simple phenol and alkylated phenols. The $SiO_2$-based catalysts produced the highest quantities of carbonyls.

Figure 15A:
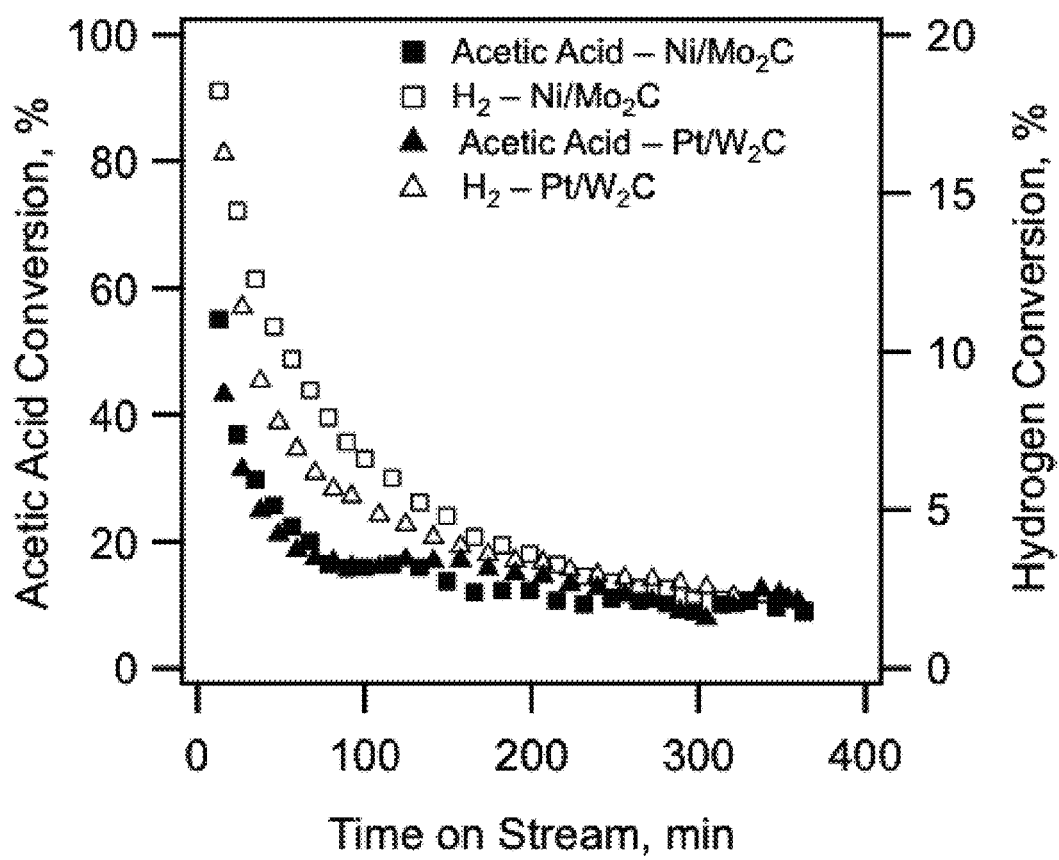
FIGS. 15A, 15B, and 15C illustrate experimental results obtained from the deoxygenation of acetic acid with hydrogen over a fixed-bed of a metal carbide supported transition metal catalysts according to some embodiments of the present disclosure.
Figure 15B:
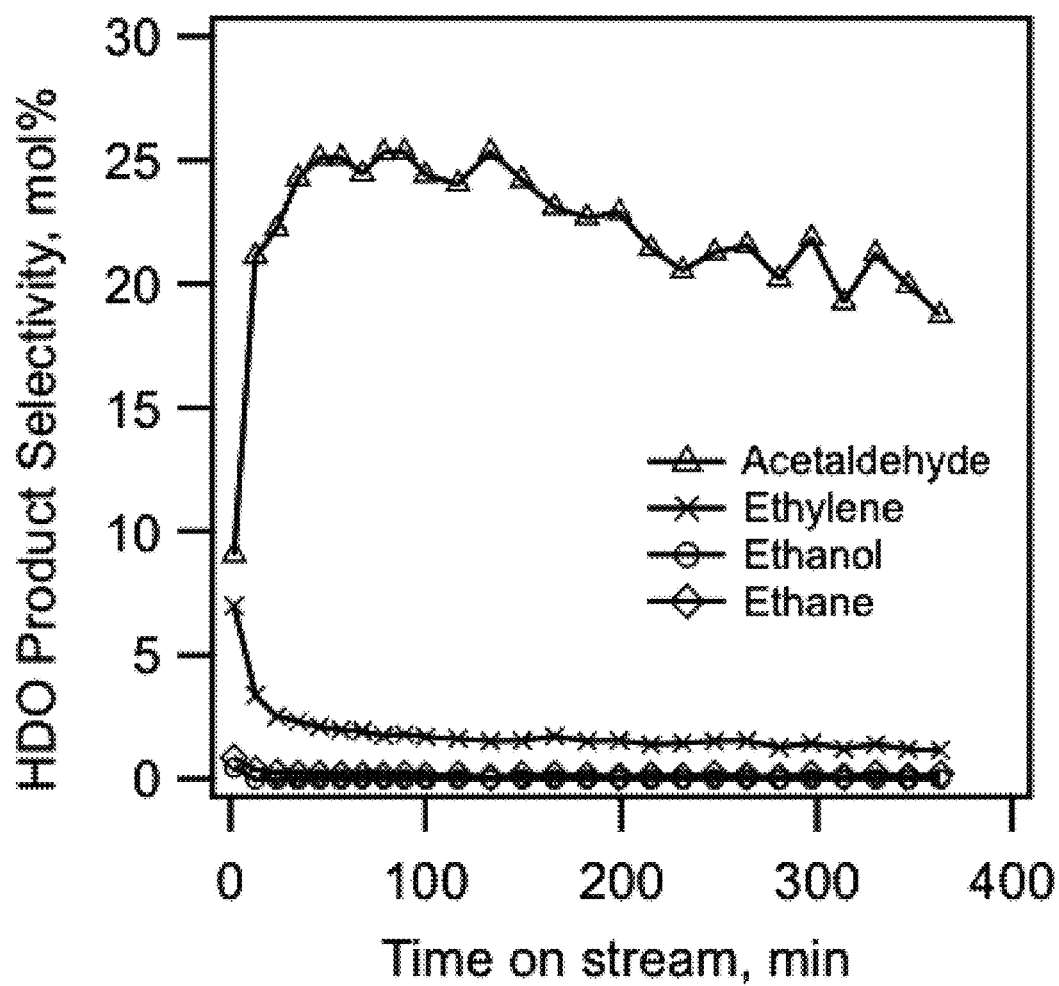
Figure 15C:
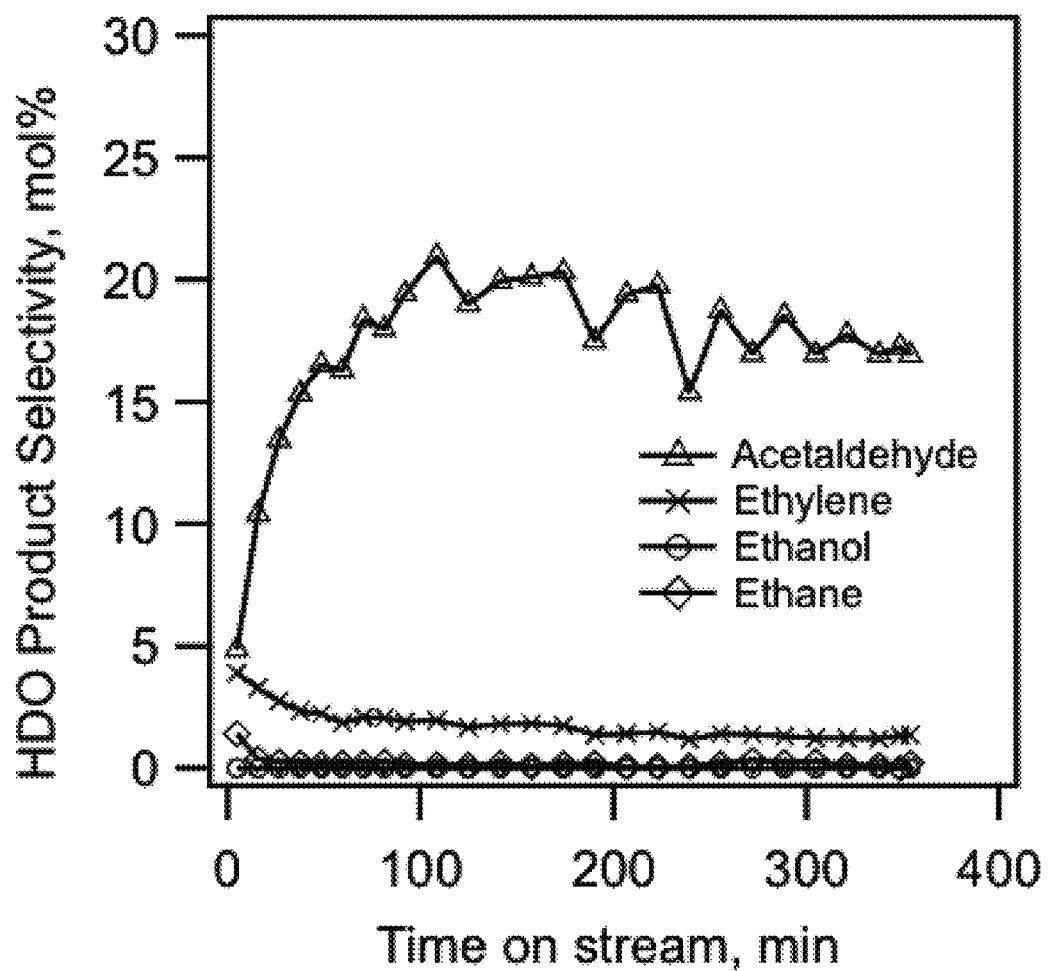

FIGS. 15A, 15B, and 15C illustrate experimental results obtained from the deoxygenation of acetic acid over a bed of a metal carbide supported transition metal catalysts according to some embodiments of the present disclosure. FIG. 15A illustrates acetic acid and $H_2$ conversion at 350° C., 0.2 MPa and WHSV 0.5 $h^{-1}$, with product selectivities for deoxygenation products over Ni/$Mo_2C$ (FIG. 15B) and over Pt/$W_2C$ (FIG. 15C) as a function of time on stream (TOS) for acetic acid deoxygenation. Steady-state isothermal experiments were performed in a U-shaped quartz tube at approximately 0.2 MPa. For each experiment, the catalyst (50 mg) was mixed with quartz chips (200-400 mg, 30-40 mesh) and loosely packed into the reactor with quartz wool. Prior to reaction catalysts were pretreated in 4% $H_2$/He for 2 h (5° C./min heating rate). The reactor was purged with He (UHP) at 54 mL/min for 30-45 min before being heated to 350° C. at 10° C./min in 2.5% $H_2$ (UHP, 1.3 mL/min). Once at 350° C., acetic acid vapor was then delivered in a stream of He via an inline bubbler. The composition of the reactant vapor stream was 97.2 mol % He, 2.4 mol % $H_2$, and 0.4 mol % acetic acid. The reactor was held at 350° C. for 6 h while GC data was collected, then allowed to cool to room temperature to gather baseline data. The $H_2$/acetic acid molar ratio of 6 was chosen to achieve twice the stoichiometric amount of $H_2$ required for complete saturation and deoxygenation of acetic acid to ethane. The WHSV of acetic acid was ca. 0.6 $h^{-1}$. Based on these results, Ni/$Mo_2C$ exhibited a higher selectivity to hydrodeoxygenation products (desired products) than Pt/$Mo_2C$.

Figure 16A:
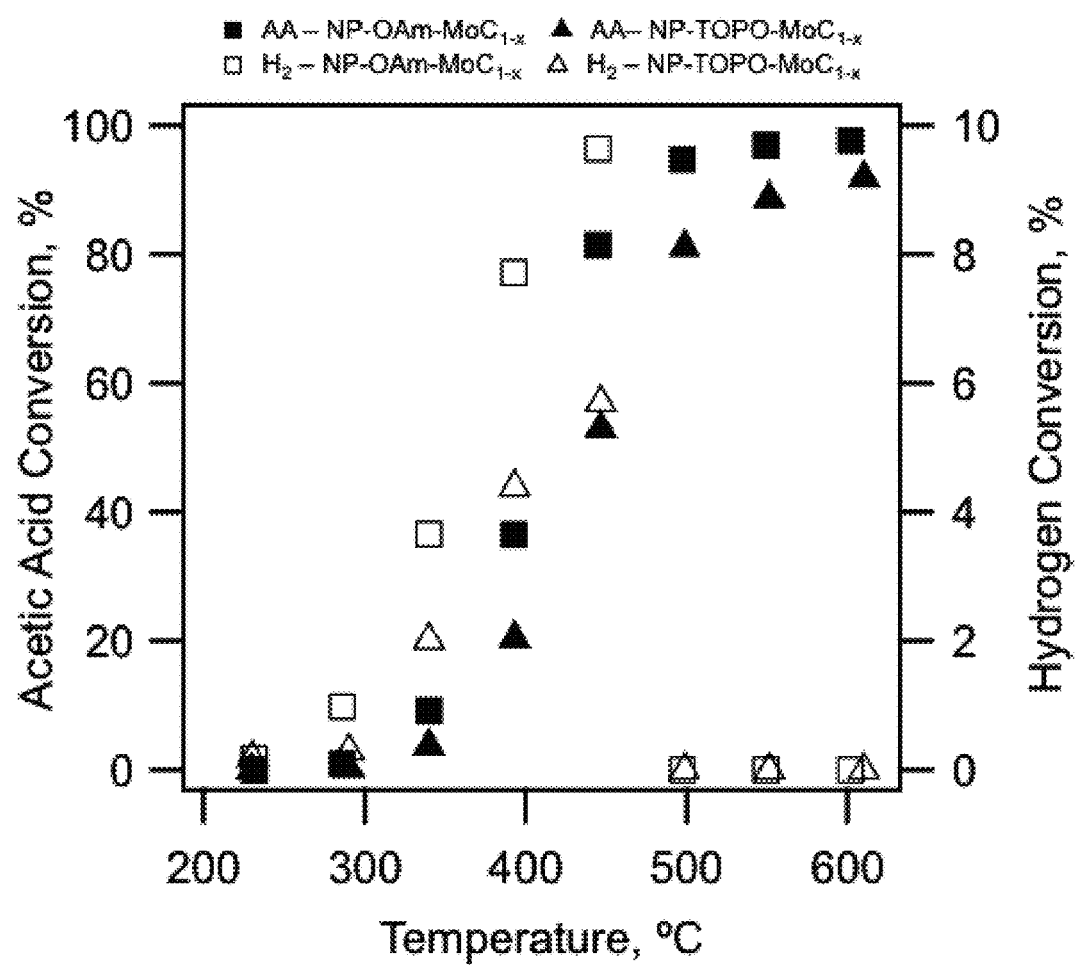
FIGS. 16A, 16B, 16C, and 16D illustrate experimental results obtained from the temperature programmed reaction of acetic acid with hydrogen over a fixed-bed of a metal carbide nanoparticles supported on $SiO_2$ according to some embodiments of the present disclosure.
Figure 16B:
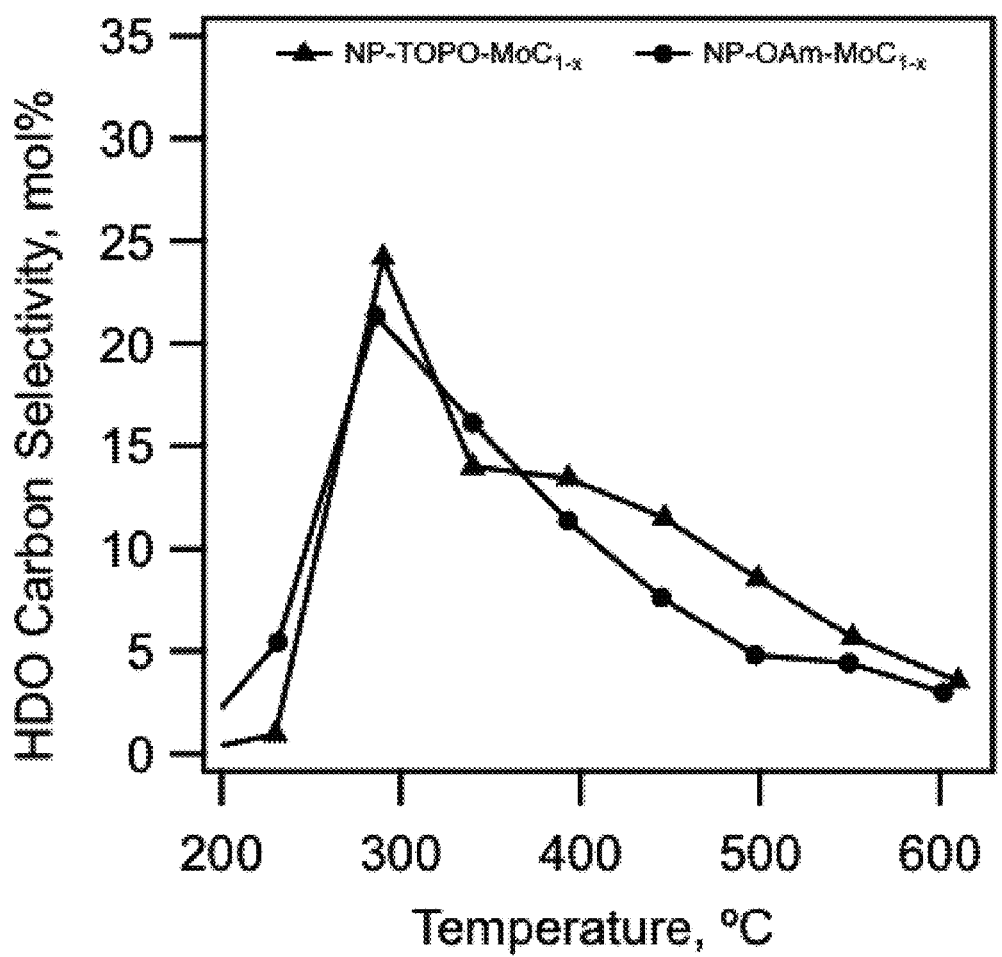
Figure 16C:
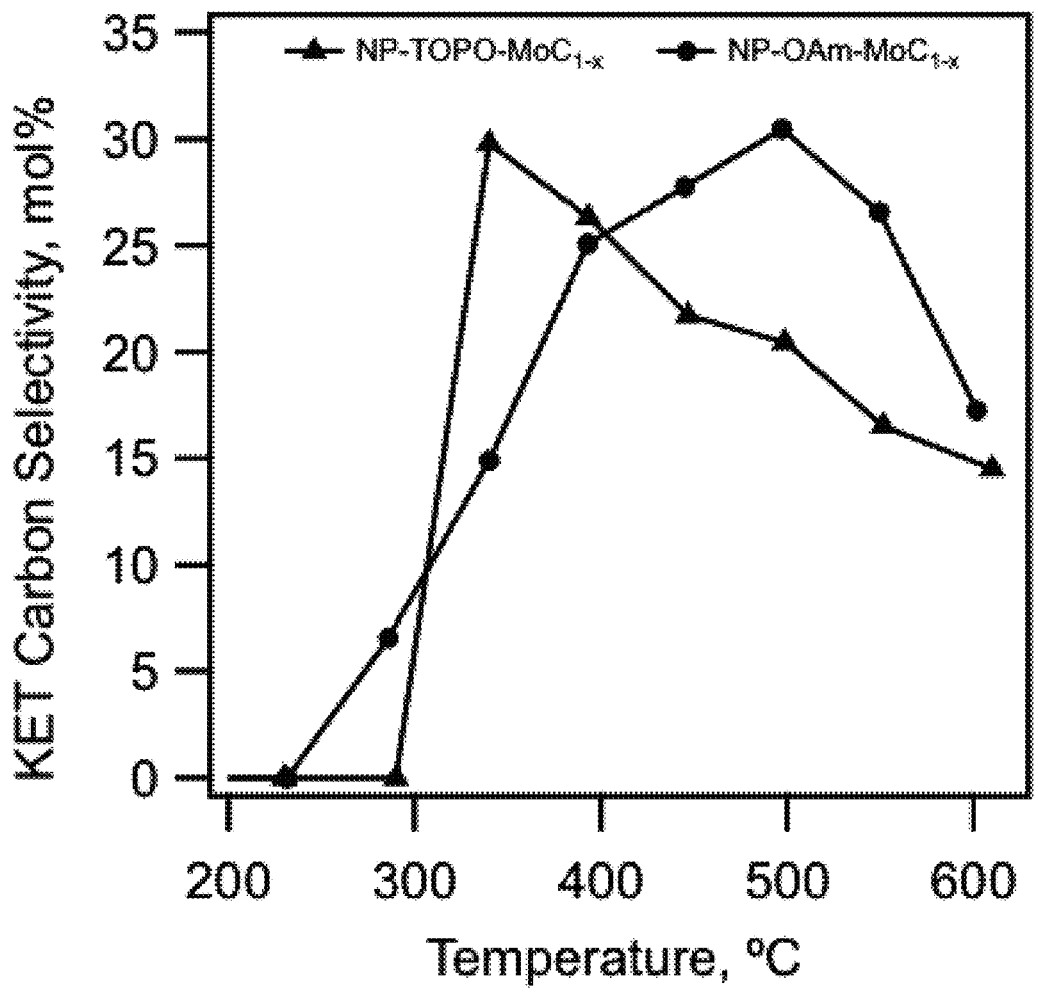
Figure 16D:
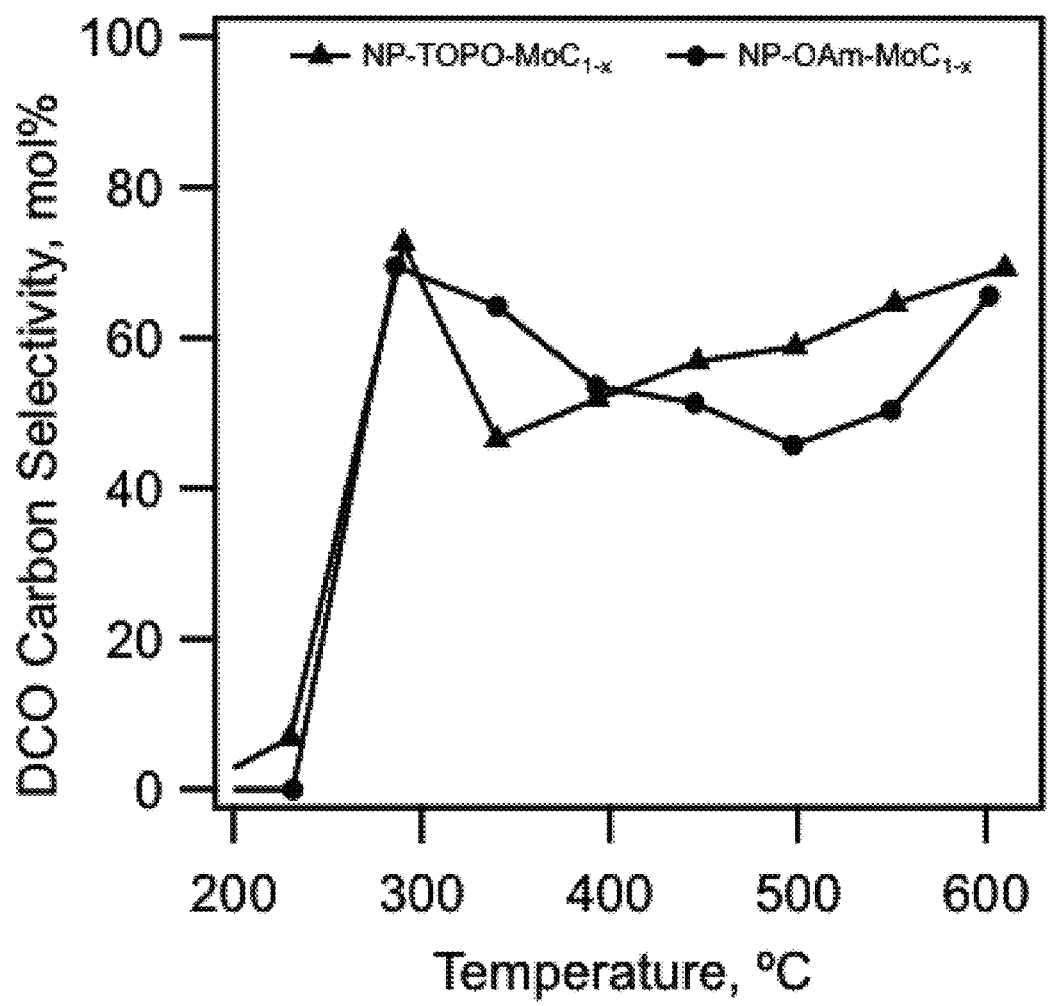

FIG. 16A through 16D illustrate experimental results obtained from temperature programmed reaction of acetic acid with hydrogen over a fixed-bed of a metal carbide nanoparticles supported on $SiO_2$ according to some embodiments of the present disclosure. FIG. 16A illustrates acetic acid and $H_2$ conversion, with FIG. 16B illustrating carbon selectivities for HDO products (ethane, ethylene, ethanol, acetaldehyde). FIG. 16C illustrates KET carbon selectivities (acetone) and FIG. 16D illustrates DCO carbon selectivities ($CO$, $CO_2$, $CH_4$). Experiments were performed in a flow reactor system equipped with a bubbler for introduction of acetic acid vapors. He and $H_2$ were introduced into the system through MKS mass flow controllers. Approximately 50 mg of catalyst was loaded into a quartz "U-tube" reactor, supported on quartz wool. Prior to acetic acid exposure, the catalyst was reduced in 4% $H_2$/He for 2 hours at 450° C. (5° C. $min^{-1}$ heating rate). Following reduction, the catalyst was cooled to RT and the $H_2$ concentration was adjusted to 2.5%. The temperature was then ramped from ambient temperature to 600° C. at 10° C. $min^{-1}$. The reaction mixture consisted of 0.4% acetic acid, 2.4% $H_2$, and 97.2% He. The $H_2$/acetic acid molar ratio of about 6 was chosen to achieve approximately 2 times the stoichiometric amount of $H_2$ required for complete saturation and deoxygenation of acetic acid to ethane. The nanoparticle catalysts demonstrated similar, if not higher, selectivity to deoxygenated products as compared to the bulk metal carbide catalysts (FIGS. 5 and 6).

Figure 17:
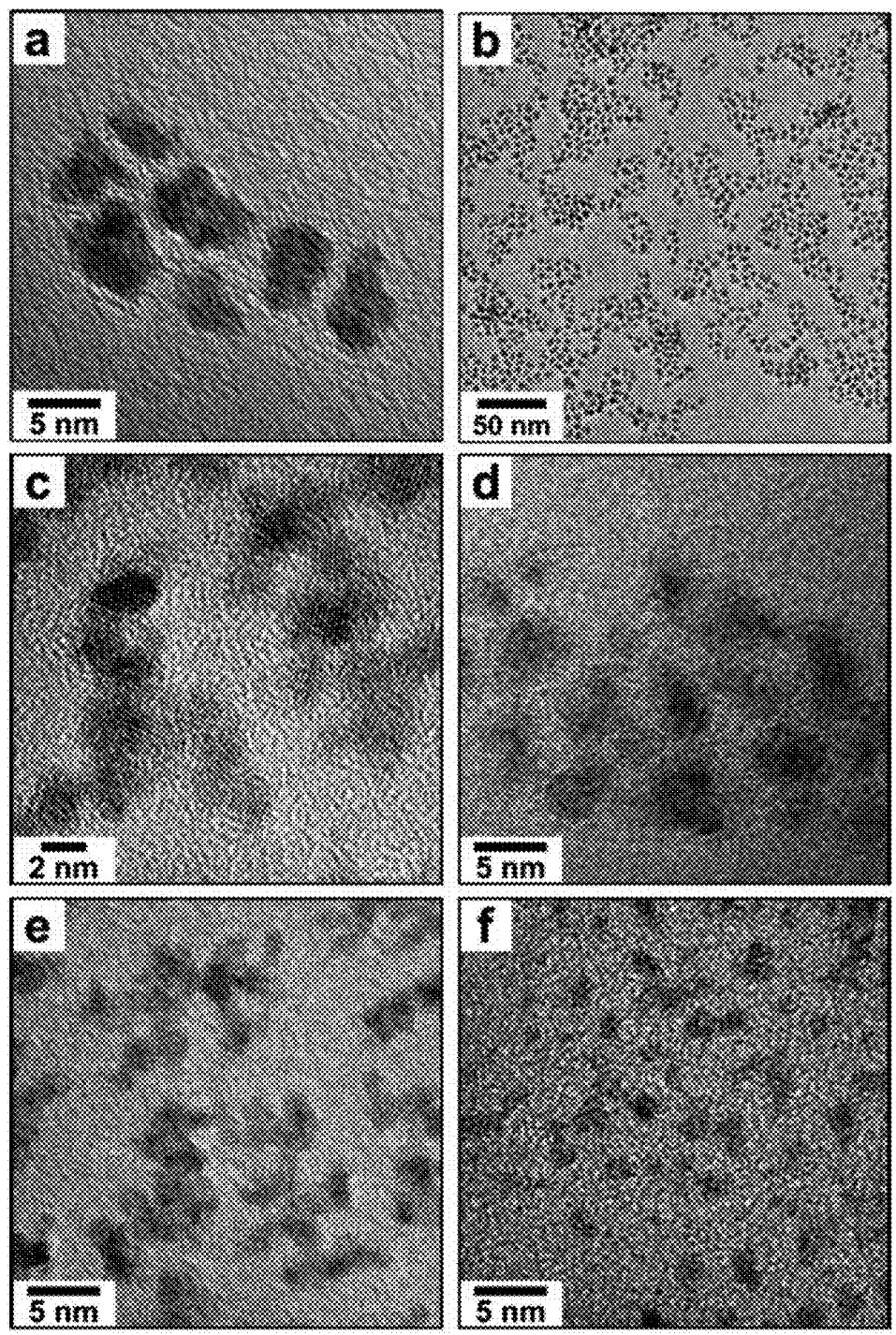
FIG. 17 illustrates TEM images of various examples of solid molybdenum carbide, tungsten carbide, and mixed-metal tungsten-molybdenum carbide nanocrystals, according to some embodiments of the present disclosure.

FIG. 17 illustrates TEM images of various $MoC_{1-x}$ nanoparticles made according to some embodiments of the present disclosure. Referring to each panel of FIG. 17, Panel (a) shows $MoC_{1-x}$ nanoparticles produced using $Mo(PPh_3)_2(CO)_4$ as a starting material and trioctylphosphine oxide as the NP surface-capping ligand, Panel (b) shows $MoC_{1-x}$ nanoparticles made from $Mo(CO)_6$ with trioctylphosphine oxide as the NP surface-capping ligand, Panel (c) shows $MoC_{1-x}$ nanoparticles made using $Mo(CO)_6$ with oleylamine as the NP surface-capping ligand, Panel (d) shows $MoC_{1-x}$ nanoparticles made from $Mo(CO)_6$ with trioctylphosphine oxide as the NP surface-capping ligand, Panel (e) shows $W_xC$ nanoparticles made from $W(CO)_6$ with oleylamine as the NP surface-capping ligand, and Panel (f) shows $Mo_xW_xC_z$ nanoparticles made from $W(CO)_6$ and $Mo(CO)_6$ with oleylamine as the NP surface-capping ligand. These images highlight the crystallinity, the morphology (quasi-spherical to dendritic), and the size (isolated sub-10 nm particles) of the metal carbide nanoparticles produced by some of the methods described herein.

Figure 18:
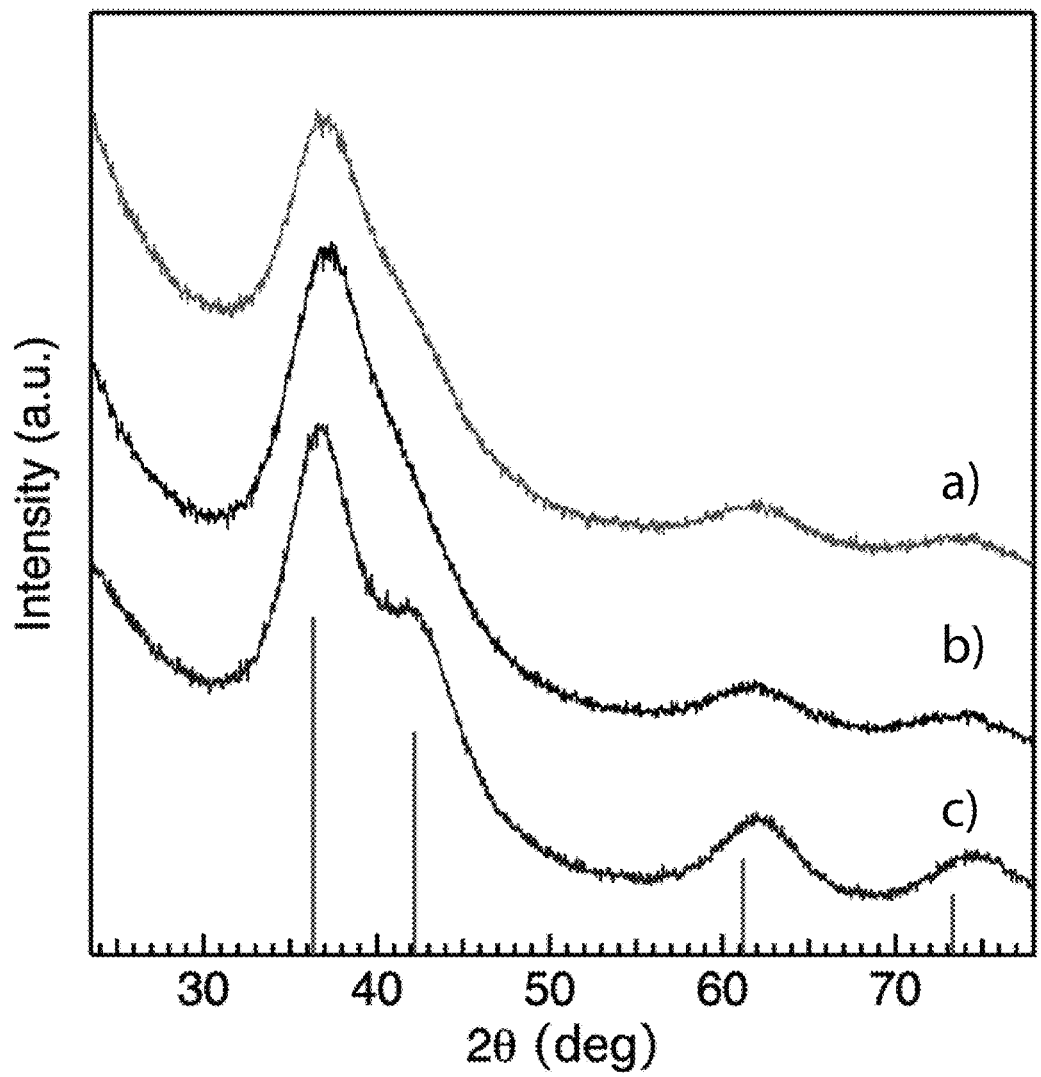
FIG. 18 illustrates XRD patterns of nanoparticle (NP)-$MoC_{1-x}$ prepared from (trace a) $Mo(CO)_6$ with trioctylphosphine oxide, (trace b) $Mo(PPh_3)_2(CO)_4$ with trioctylphosphine oxide, and (trace c) $Mo(CO)_6$ with oleylamine and vertical reference lines for ICDD card 03-065-8092.
Figure 19:
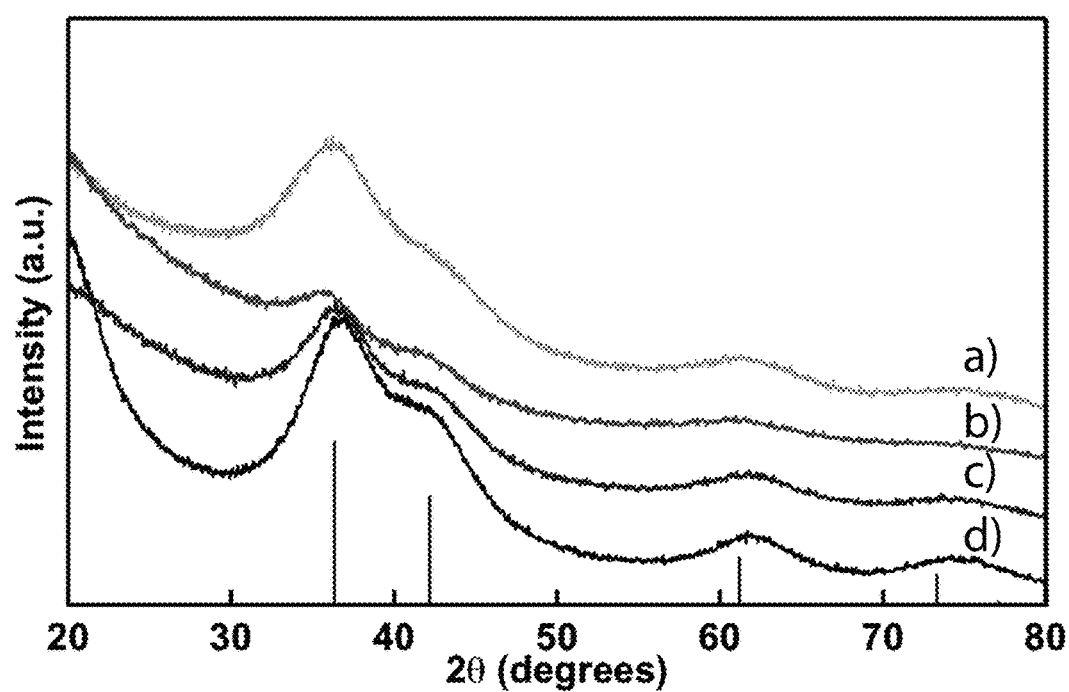
FIG. 19 illustrates XRD patterns of mixed-metal carbide patterns of (trace a) NP-OAm-$W_xC$, (trace b) core-shell-NP-OAm-$Mo_{1.6}W_{0.4}C$, (trace c) alloy-NP-OAm-$Mo_{1.6}W_{0.4}C$, and (trace d) NP-OAm-$MoC_{1-x}$ and vertical reference lines for ICDD card 03-065-8092.

FIG. 18 illustrates XRD patterns of NP-$MoC_{1-z}$ prepared from (trace a) $Mo(CO)_6$ with trioctylphosphine oxide, (trace b) $Mo(PPh_3)_2(CO)_4$ with trioctylphosphine oxide, and (trace c) $Mo(CO)_6$ with oleylamine and vertical reference lines for ICDD card 03-065-8092. Preparations with and without phosphorus yield XRD patterns that indicates crystalline $MoC_{1-x}$ as indicated by the agreement with the reference card. FIG. 19 illustrates XRD patterns of mixed-metal carbide patterns of (trace a) NP-Oam-WX, (trace b) core-shell-NP-OAm-$Mo_{1.6}W_{0.4}C$, (trace c) alloy-NP-OAm-$Mo_{1.6}W_{0.4}C$, and (trace d) NP-OAm-$MoC_{1-x}$ and vertical reference lines for ICDD card 03-065-8092. XRD pattern indicate crystalline $MoC_{1-x}$ and $W_xC$ adopt the face-centered cubic (fcc) structure indicated by the agreement with the reference card. This enables identification of the prepared nanocatalysts by their characteristic fcc structure exemplified by these XRD patterns within the window of 20-80 degrees.

Figure 20:
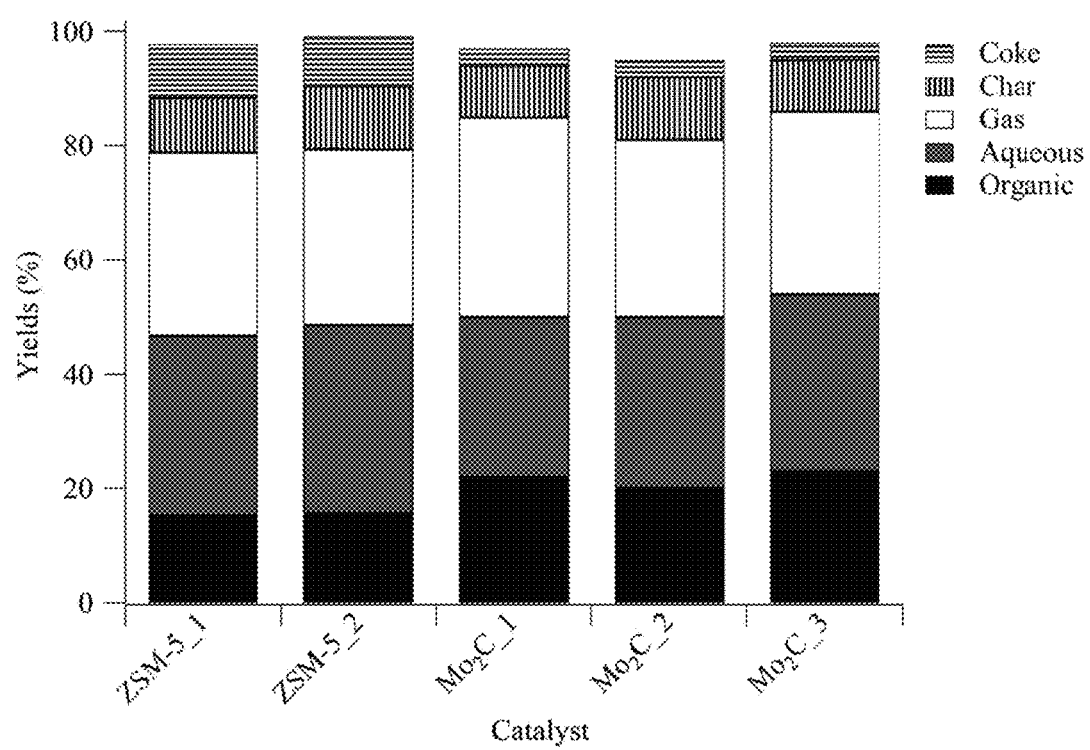
FIG. 20 compares product yields using a metal carbide in a fixed bed reactor, according to some embodiments of the present disclosure, to a zeolite used in a fluidized bed reactor.

FIG. 20 compares product yields using a metal carbide in a fixed bed reactor, according to some embodiments of the present disclosure, to a zeolite used in a fluidized bed reactor. The yields for liquids, solids and gases from two experiments with ZSM-5 utilized in a fluidized bed reactor is compared to three experiments utilizing $Mo_2C$ in a fixed bed reactor. The biomass vapors were upgraded at 500° C. for ZSM-5 and 400° C. with co-fed $H_2$ for $Mo_2C$. The mass yields of gaseous and aqueous streams were similar for all experiments, while the yields of organic liquids were 3-8% percentage points higher for the $Mo_2C$. Coke on ZSM-5 (~9%) was significantly higher than on $Mo_2C$ (<1.7%), and the finding suggests that instead of carbon build up on catalyst, $Mo_2C$ produced more liquid organic products.

Figure 21:
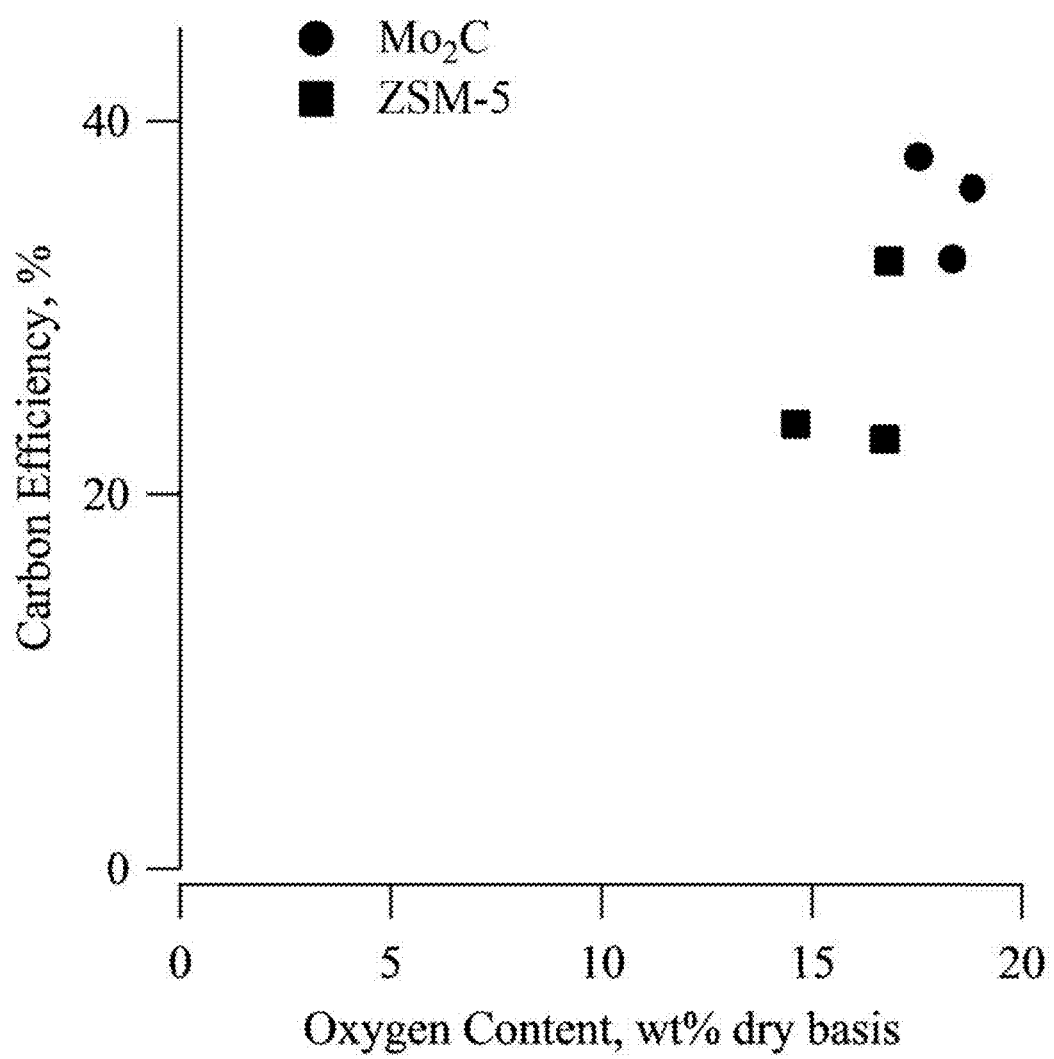
FIG. 21 illustrates plots oil carbon yield versus oxygen content, comparing a metal carbide results, according to some embodiments of the present disclosure, to a zeolite.

FIG. 21 plots oil carbon yield versus oil oxygen content, comparing the ex situ CFP of pine results of $Mo_2C$ catalyst, according to some embodiments of the present disclosure, to ZSM-5 catalyst. The biomass vapors were upgraded at 500° C. for ZSM-5 and 400° C. with co-fed $H_2$ for $Mo_2C$. The organic liquid carbon yields jump from 24-26% for ZSM-5 to 33-38% for Mo$_2$C, while the oxygen content of the oil remained about the same (15-17% for ZSM-5 and 18-19% for Mo$_2$C). These results clearly show a significant (~50%) improvement in yields of organic liquid from CFP with Mo$_2$C compared to ZSM-5.

Figure 22:
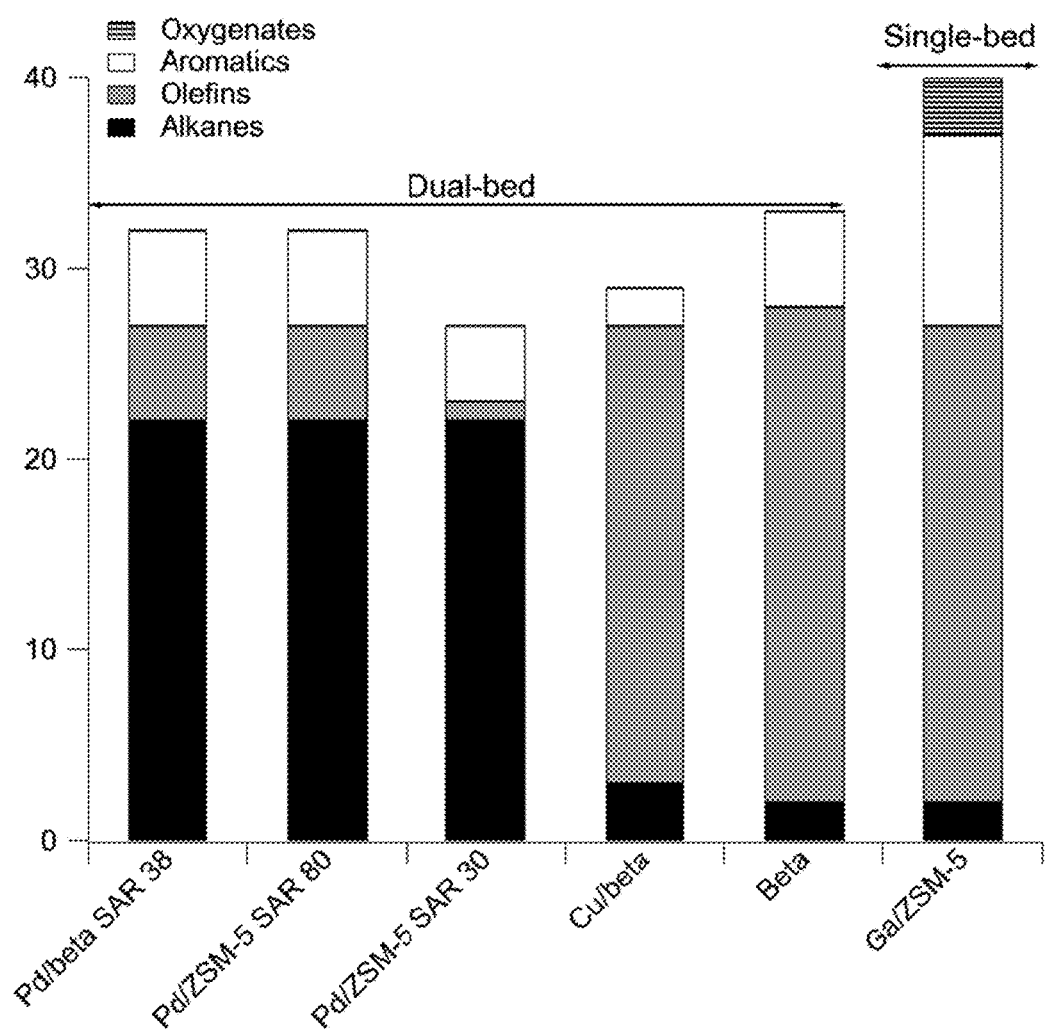
FIG. 22 illustrates experimental results for the catalytic fast pyrolysis of pine pyrolysis vapors, comparing the performance of upgrading the vapors over a two fixed-beds, the first for upgrading the vapors and the second for alkylating, to a single fixed-bed system for accomplishing both steps.

FIG. 22 illustrates experimental results for the catalytic fast pyrolysis of pine pyrolysis vapors, comparing the performance of upgrading the vapors over two fixed-bed reactors in series, the first for upgrading (e.g. deoxygenating) the vapors and the second for alkylating the deoxygenated compounds, to a single fixed-bed reactor system for accomplishing both steps. For the "dual" bed experiments, the first fixed-bed utilized solid Ga/ZSM-5 catalyst at 500° C. with co-fed H$_2$ to deoxygenate the pyrolysis vapors. The second fixed-bed reactor utilized the solid catalyst indicated on the x-axis of FIG. 22 (e.g. various forms of zeolite catalysts) to alkylate the deoxygenated compounds produced in the first fixed-bed reactor. The products from the first fixed-bed were processed in the second fixed-bed reactor at a temperature of about 250° C. The largest product observed from the single-bed experiments contained 10 carbons (C10) and the largest compound from the dual-bed experiments contained 18 carbons (C18) as shown in Table 2 below. FIG. 2 also show hydrogenation of alkanes from Pd based catalysts. FIG. 22 demonstrates the feasibility and advantages of a dual-bed reactor (e.g. two fixed-bed reactors in series) system for the upgrading of pyrolysis vapors, e.g. deoxygenation and alkylation, versus completing both steps in a single reactor.

Experimental Methods and Materials

Mo$_2$C Synthesis:

The Mo$_2$C was synthesized using a temperature-programmed reaction procedure. Briefly, 5 g of ammonium paramolybdate (AM, (NH$_4$)$_6$Mo$_7$O$_{24}$.4H$_2$O, Alfa-Aesar) were sieved to 125-300 μm and loaded into a quartz tube reactor on top of a quartz wool plug. The AM was reduced and carburized in 15% CH$_4$/H$_2$ flowing at 1200 mL min$^{-1}$. The sample temperature was increased from room temperature (RT) to 200° C. at 10° C. min$^{-1}$, followed by heating from 200 to 590° C. at 1° C. min$^{-1}$. The sample remained at 590° C. for 2 hours before passively cooling to room temperature. The resulting material was passivated with 1% O$_2$/He for 12 hours and then stored in an Ar-filled glovebox until use. Prior to model compound deoxygenation and vapor upgrading experiments, the Mo$_2$C catalyst was pretreated in flowing H$_2$ at 400° C.

MoC$_{1-x}$ Nanoparticle Synthesis.

In a three-neck round-round bottom flask fitted with a condenser and two septa, oleylamine (1.3 mL, 4 mmol) and ODE (11.5 mL) were combined. The reaction mixture was rapidly heated to 100° C. under vacuum and held at temperature for 1 h before the heat source was removed and the mixture allowed to cool to ambient temperature. A portion of Mo(CO)$_6$ was then added to the reaction mixture under flow N$_2$ and a needle was affixed to one of the septa for 5 minutes to purge any O$_2$ introduced during the addition of Mo(CO)$_6$. After removing the purge needle, the reaction mixture was heated rapidly to 300° C. and held at temperature for 1 h before the heat source was removed and the mixture allowed to cool to ambient temperature. Approximately 1 mL of

TABLE 2

Products observed from upgrading pine vapors over Ga/HZSM-5 to produce olefins and aromatic hydrocarbons. The upgraded products were passed over a second bed reactor with co-fed H$_2$ to couple and hydrogenate the products.

| Catalyst | Catalyst bed | Structure | Carbon number for largest blendstock |
|---|---|---|---|
| Ga/HZSM-5 | Single | naphthalene | C10 |
| Ga/HZSM-5 + Pd/β-zeolite SAR38 | Dual | dimethylnaphthalene | C12 |
| Ga/HZSM-5 + Pd/ZSM-5 SAR80 | Dual | tetramethylanthracene | C18 |
| Ga/HZSM-5 + Pd/ZSM-5 SAR30 | Dual | dimethylbiphenyl | C14 |
| Ga/HZSM-5 + Cu/β-zeolite | Dual | dimethylnaphthalene | C12 |
| Ga/HZM-5 + β-zeolite | Dual | dimethylanthracene | C16 |

CHCl$_3$ was used to assist in the transfer of the cooled reaction mixture in equal parts to three centrifuge tubes. A 35 mL portion of acetone was added to each centrifuge tube to flocculate the particles, which were then separated by centrifugation at 8000 RPM for 10 min. The acetone was decanted from each tube with care not to disturb the dark oil containing the NP-MoC$_{1-x}$ particles. Each centrifuge tube was treated with an additional ca. 40 mL aliquot of acetone and centrifuged at 8000 RPM for an additional 10 min. Finally, the acetone was decanted, and the particles were redispersed in CHCl$_3$ prior to supporting.

Synthesis of oxide supported MoC$_{1-x}$ nanoparticles. The recovered nanoparticles were redispersed in ca. 20 mL of chloroform and added slowly to a stirring suspension of oxide support (e.g. TiO$_2$ or SiO$_2$) support in chloroform (ca. 1 g support/mL CHCl$_3$), in order to yield a catalyst with approximately 5 wt % MoC$_{1-x}$ loading. The mixture was sonicated for ca. 5 minutes, and stirred overnight. The resulting supported catalyst was separated by centrifugation at 8000 RPM for 5 minutes and stored under an Ar atmosphere.

NP-TOPO-MoC$_{1-x}$ Synthesis.

Prepared analogously to NP-MoC$_{1-x}$ except trioctylphosphine oxide (1.16 g, 3.0 mmol) was used in place of oleylamine.

NP-W$_x$C Synthesis.

NP-W$_x$C was prepared analogously to NP-MoC$_{1-x}$ except W(CO)$_6$ (0.352 g, 1.00 mmol) was used in place of Mo(CO)$_6$.

Alloy-NP-Mo$_{1.6}$W$_{0.4}$C Synthesis.

A 3-neck round-bottom flask was fitted with a condenser and two septa was charged with a portion of Mo(CO)$_6$ (0.264 g, 1.0 mmol) and three brief evacuation/N$_2$ refill cycles were conducted. Quantities of previously dried oleylamine (1.3 mL, 4.0 mmol, OAm) and 1-octadecene (11.5 mL) were injected and an additional three evacuation/N$_2$ cycles were conducted. The apparatus was then refilled with N$_2$ and heated rapidly to 250° C. and maintained at this temperature for 15 min. before the heat source was removed and the reaction mixture allowed to cool to ambient temperature naturally. A portion of W(CO)$_6$ (0.088, 0.25 mmol) was then added to the reaction flask, which was then fitted with a N$_2$ purge needle for 2 min. The purge needle was then removed and the reaction mixture heated rapidly to 300° C. under N$_2$. The mixture was held at 300° C. for 1 h prior to removing the heat source and cooling to room temperature naturally. The particles were separated and washed analogously to the NP-MoC$_{1-x}$ particles described above.

Core-shell-NP-Mo$_{1.6}$W$_{0.4}$C Synthesis.

Core-shell-NP-Mo1.6C was prepared analogously to alloy-NP-Mo$_{1.6}$W$_{0.4}$C except an initial heating temperature of 300° C. was used instead of 250° C.

py-GCMS/FID:

The ex-situ CFP of biomass pyrolysis vapors were initially conducted in a tandem micropyrolyzer-fixed-bed reactor (py-GCMS) system to identify and quantify upgraded products. The tandem reactor (Rx-3050TR, Frontier Laboratories, Japan) is equipped with an autosampler (AS-1020E) and a microjet cryo-trap (MJT-1030Ex). The reactor has two vertical heating zones in series: one for pyrolysis and one for upgrading of the pyrolysis vapors. Helium was used as the carrier gas in the pyrolysis zone at a flow rate of 57 mL min$^{-1}$, with 57 mL min$^{-1}$ of H$_2$ added prior to the upgrading zone. The temperature of the pyrolysis zone was maintained at 500° C. during the reaction upgrading zones at 350 or 400° C. Stainless steel cups containing ~0.5 mg of pine (52% carbon, 41% oxygen, 6% hydrogen and <1% nitrogen), lignin, or cellulose were dropped in the pyrolysis zone using the autosampler. The pyrolysis vapors were then passed over a fixed bed of about 15 mg (5 mg Mo$_2$C catalyst+10 mg sand), supported on a plug of quartz wool. In a typical experiment, three-four cups of about 0.5 mg of biomass were introduced and sequentially pyrolyzed over the same catalytic bed. The upgraded vapors passed through the microjet cryo-trap that was housed inside the GC oven and maintained at −196° C. Most of the product vapors were adsorbed, before being rapidly desorbed into the capillary column of the GC (7890B, Agilent Technologies, USA) interfaced with the MS (5977A, Agilent Technologies, USA). These trapped vapors were separated along a capillary column (Ultra Alloy-5, Frontier Laboratories, Japan) with a 5% diphenyl and 95% dimethylpolysiloxane stationary phase. The GC oven was set to hold at 40° C. for 4.5 minutes and then ramped to 300° C. at 20° C. min$^{-1}$. The trapped vapors were identified and quantified using the MS and the flame ionization detector (FID). Some non-condensable light gases escaped the trap, but were separated by a GasPro column and quantified by a thermal conductivity detector (TCD). The GC analysis took about 31 minutes before the next pine cup was introduced to the reactor. During this time, H$_2$ and helium continued to flow over the catalyst bed. The results are reported in carbon yield, defined by Equation 1:

$$C_{yield} = \frac{\text{moles of carbon in product}}{\text{moles of carbon in the feed}} \qquad (1)$$

MBMS:

Ex-situ CFP of pine was performed in a horizontal quartz annular reactor coupled to a MBMS. The reactor was mounted in a five-zone furnace where small boats loaded with pine were pyrolyzed in a batch-wise fashion; the pyrolysis vapors were then flowed over a catalytic bed using 50 vol % H$_2$—He carrier gas. More specifically, sample holders containing 50 mg of pine each were loaded into the inner tube of the reactor, which was maintained at 500° C. A total of 50 samples were introduced sequentially every 3 minutes into the pyrolysis chamber. The catalyst consisted of a fixed bed comprising of a mixture of 0.5 g Mo$_2$C plus 0.5 g of sand (inert material). The temperature of the catalytic bed was maintained at 400° C. Prior to sampling by the MBMS, the carrier gas flow was diluted at the end of the reactor with a He stream flowing at 4000 mL min$^{-1}$ to meet the required flow demands of the MBMS sampling orifice. Upon entering the MBMS, this mixed gas stream undergoes adiabatic expansion through a 250 µm orifice leading into a vacuum chamber held at 0.1 Torr, which cools the gas and quenches any secondary reactions. The gas is then skimmed into a molecular beam for ionization with an electron impact ionization source (22.5 eV), producing positive ions that are detected by a quadrupole mass spectrometer. Mass spectra for all compounds with an m/z range between 10 and 450 are collected simultaneously every second. A dilute flow of Ar (40 mL min$^{-1}$) mixed into the He diluent stream serves as an internal standard to correct for any shifts in signal due to flow fluctuations. The reactor was operated at a nominal weight hourly space velocity (WHSV) of 3.6 h$^{-1}$, assuming a 60% yield of pyrolysis vapors from pine pyrolysis is obtained for each boat, and that the pyrolysis event lasts for one minute.

Acetic Acid Deoxygenation:

Acetic acid experiments were performed in a flow reactor system equipped with a bubbler for introduction of acetic acid vapors. He and $H_2$ were introduced into the system through MKS mass flow controllers. Approximately 50 mg of catalyst was loaded into a quartz "U-tube" reactor, supported on quartz wool. Prior to acetic acid exposure, the catalyst was reduced in 4% $H_2$/He for 2 hours at 400° C. (5° C. min$^{-1}$ heating rate). Following reduction, the catalyst was cooled to RT and the $H_2$ concentration was adjusted to 2.5%. The temperature was then increased from RT to the reaction temperature (either 350 or 400° C.) at 10° C. min$^{-1}$. Once at the reaction temperature, He was bubbled through liquid acetic acid at RT. The reaction mixture consisted of 0.4% acetic acid, 2.4% $H_2$, and 97.2% He. The WHSV for acetic acid was calculated by dividing the mass flow rate of acetic acid (about 0.03 g h$^{-1}$) by the mass of $Mo_2C$ loaded in the reactor. The $H_2$/acetic acid molar ratio of about 6 was chosen to achieve approximately 2 times the stoichiometric amount of $H_2$ required for complete saturation and deoxygenation of acetic acid to ethane. All acetic acid experiments were performed at 0.2 MPa. Systematic error was estimated from replicate experiments, giving values of ±3.0% for acetic acid conversion, ±2.6% for $H_2$ conversion and ±2.0% for selectivity values.

The reactor effluent was analyzed with a gas chromatograph (490 Micro GC, Agilent Technologies). Products were identified through retention time comparison with known standards. Quantitative analysis was carried out using thermal conductivity detectors, which had been calibrated with standards of known concentrations. Reactant conversion, $X_i$, was calculated for acetic acid and $H_2$ according to Equation 2:

$$X_i = \frac{\dot{n}_{in,i} - \dot{n}_{out,i}}{\dot{n}_{in,i}} *100\% \quad (2)$$

where $\dot{n}_{in,i}$ and $\dot{n}_{out,i}$ represent inlet and outlet molar flow rates for species i, respectively. Inlet molar flow rates were calculated according to Equation 3:

$$\dot{n}_{in,i} = \frac{\dot{m}_{in,tot} * x_{in,i}}{FW_{in}} \quad (3)$$

where $\dot{m}_{in,tot}$ is the total mass flow rate at the reactor inlet, $x_{in,i}$ is the mole fraction of reactant i and $FW_{in}$ is the formula weight of the inlet stream. Outlet molar flow rates were calculated according to Equation 4:

$$\dot{n}_{out,i} = \frac{\dot{n}_{out,He} * x_{out,i}}{x_{out,He}} \quad (4)$$

where $x_{out,i}$ and $x_{out,He}$ are the mole fractions of species i and He in the outlet, respectively. He was used as an internal standard such that the outlet molar flow rate, $\dot{n}_{out,He}$, was assumed to equal the inlet molar flow rate as defined by Equation 5:

$$\dot{n}_{out,He} \equiv \dot{n}_{in,He} \quad (5)$$

Conversions were calculated for acetic acid and $H_2$. Molar product selectively to products, $S_{1-x}$ was calculated via Equation 6:

$$S_i = \frac{\dot{n}_{out,i}}{\sum \dot{n}_{out,i}} *100 \quad (6)$$

where $\dot{n}_{out,i}$ represents the outlet molar flow rate for individual oxygenate and hydrocarbon products, excluding He and reactants.

Guaiacol Deoxygenation:

Approximately 0.125 g and 0.350 g of catalyst were utilized for experiments performed at WHSV values of 60 h$^{-1}$ and 10 h$^{-1}$, respectively. The catalyst was diluted with 177-250 μm diameter particles of silicon carbide to a volume of 4 mL and added to the isothermal zone of a 20 mL downward-flow tubular fixed-bed reactor. The temperature of the isothermal zone was monitored using a 4-point thermocouple inserted into the catalyst bed. Approximately 2 mL of 150-250 μm diameter crushed quartz was added to each side of the catalyst bed, and the remainder of the reactor was packed with 300-425 μm diameter crushed quartz. To begin an experiment, a gas mixture of $H_2$ (95%) and Ar (5%) was introduced, and the reactor pressure was increased to 0.50 MPa. Next, the isothermal zone was heated to the desired reaction temperature at 5° C. min$^{-1}$. Once the reactor temperature was stable, guaiacol was introduced from an Eldex Optos 1LMP HPLC pump to achieve the desired WHSV value, which was calculated based on the mass flow rate of guaiacol and the total catalyst mass in the reactor. A 12:1 molar ratio of $H_2$ to guaiacol was maintained for the duration of the reaction period, which is twice the stoichiometric requirement for complete hydrogenation to cyclohexane, water, and methane.

Condensable products from the reaction were collected in a vessel controlled at 110° C. These products were analyzed using an Agilent Technologies 7890A gas chromatograph equipped with a flame ionization detector and mass spectrometer. Uncondensed products in the gas phase were analyzed online using a separate Agilent Technologies 7890B gas chromatograph. Products were identified through retention time comparison with known standards and confirmed using mass spectrometry. Quantitative analysis was performed using flame ionization and thermal conductivity detectors, which had been calibrated with standards of known concentrations. In the event that a standard was unavailable, response factors were extrapolated from similar compounds. Argon was used as an internal standard for the gas phase analysis and all values were adjusted to account for changes in total molar flow rate. Due to phase separation during the experiment performed at a WHSV of 10 h$^{-1}$, acetone was used to homogenize the condensed samples prior to analysis, and the water content of the condensed samples was determined using Karl Fischer titration. For all experiments, mass and carbon balance closure was within ±5%.

Guaiacol and H2 conversion (Xj) were calculated according to Equation 7:

$$X_j = \frac{\dot{n}_{in,j} - \dot{n}_{out,j}}{\dot{n}_{in,j}} *100 \quad (7)$$

where $\dot{n}_{in,j}$ and $\dot{n}_{out,j}$ represent inlet and outlet molar flow rates of guaiacol or $H_2$. The molar product selectivity ($S_j$) was calculated separately for the organic phase products ($\geq$C6) and by-products (<C6), and the selectivity for each category totals 100%. These calculations were performed using Equation 8:

$$S_j = \frac{\dot{n}_{out,j}}{\sum \dot{n}_{out,j}} * 100 \quad (8)$$

where $\dot{n}_{out,j}$ represents the molar flow rate of organic phase product or by-product j and $\Sigma\dot{n}_{out,j}$ is the total molar flow rate of either the organic phase products or the by-products.

EXAMPLES

Example 1

A method comprising: contacting an oxygenated compound and hydrogen ($H_2$) with a solid catalyst, wherein: the solid catalyst comprises a metal carbide, and the contacting converts at least a portion of the oxygenated compound to a deoxygenated compound.

Example 2

The method of Example 1, wherein the metal carbide comprises a first transition metal.

Example 3

The method of Example 2, wherein the first transition metal comprises at least one of chromium, molybdenum, or tungsten.

Example 4

The method of Example 3, wherein the metal carbide comprises at least one of $Mo_2C$ or $W_2C$.

Example 5

The method of Example 1, wherein the metal carbide is in the form of a nanoparticle.

Example 6

The method of Example 5, wherein the nanoparticle has a length dimension between about 1 nm and about 50 nm.

Example 7

The method of Example 6, wherein the length dimension is between about 2 nm and about 7 nm.

Example 8

The method of Example 1, wherein the metal carbide is substantially in a crystalline phase.

Example 9

The method of Example 8, wherein the crystalline phase is face centered cubic.

Example 10

The method of Example 1, wherein: the solid catalyst further comprises a solid support, and the metal carbide is positioned on the solid support.

Example 11

The method of Example 10, wherein the solid support comprises an oxide.

Example 12

The method of Example 11, wherein the oxide comprises at least one of silica or titania.

Example 13

The method of Example 10, wherein the metal carbide is present on the solid catalyst at a concentration between about 5 wt % and about 50 wt %.

Example 14

The method of Example 1, wherein: the solid catalyst further comprises a second transition metal, and the second transition metal is positioned on the metal carbide.

Example 15

The method of Example 14, wherein the second transition metal comprises at least one of nickel, palladium, platinum, copper, or ruthenium.

Example 16

The method of Example 14, wherein the second transition metal is present on the solid catalyst at a ratio of the first transition metal to the second transition metal between about 20:1 and about 50:1.

Example 17

The method of Example 1, wherein the solid catalyst further comprises a hydrogen-activating site having a concentration between about 8 µmol/g and about 132 µmol/g.

Example 18

The method of Example 17, wherein the solid catalyst further comprises an acid site having a concentration between about 300 µmol/g and about 615 µmol/g.

Example 19

The method of Example 18, wherein a ratio of the acid site to the hydrogen-activating site is between about 39:1 and about 4.6:1.

Example 20

The method of Example 1, wherein the contacting is conducted at a pressure between about 0 psig and about 150 psig.

Example 21

The method of Example 1, wherein the contacting is performed in a first fixed-bed reactor.

Example 22

The method of Example 21, wherein the contacting is performed at a weight hourly space velocity between about 0.01 h$^{-1}$ and about 20 h$^{-1}$.

Example 23

The method of Example 1, wherein the contacting is conducted at a first temperature between about 250° C. and about 500° C.

Example 24

The method of Example 1, wherein the oxygenated compound comprises a pyrolysis decomposition product.

Example 25

The method of Example 24, wherein the pyrolysis decomposition product comprises at least one of acetic acid, propionic acid, guaiacol, phenol, syringol, an alkylated phenol, cyclobutanone, cyclopentanone, cyclohexanone, acetone, acetaldehyde, a furan, an alkylated furan, stearic acid, furfural, or anisole.

Example 26

The method of Example 21, wherein the oxygenated compound is directed to the first fixed-bed reactor while in a first vapor phase.

Example 27

The method of Example 1, wherein, during the contacting, the H$_2$ may be present at a partial pressure between about 0.1 bar and about 10 bar.

Example 28

The method of Example 1, wherein the portion converted is up to 100% on a molar basis of the oxygenated compound.

Example 29

The method of Example 28, wherein the portion converted is up to 90% on the molar basis of the oxygenated compound.

Example 30

The method of Example 1, wherein the deoxygenated compound has a carbon number between 2 carbon atoms and 20 carbon atoms inclusively.

Example 31

The method of Example 1, wherein the deoxygenated compound comprises at least one of a paraffin, an olefin, or an aromatic.

Example 32

The method of Example 31, wherein the paraffin comprises at least one of a straight-chained compound or a branched compound.

Example 33

The method of Example 1, wherein the deoxygenated compound comprises at least one of propane, butane, pentane, hexane, heptane, octane, cyclopentane, cyclohexane, cyclohexene, benzene, toluene, xylene, a trimethylbenzene, a tetramethylbenzene, naphthalene, or a methylnaphthalene.

Example 34

The method of Example 1, wherein the deoxygenated compound is in a second vapor phase.

Example 35

The method of Example 1, further comprising, prior to the contacting: thermally decomposing a carbon-containing feedstock to produce at least the oxygenated compound.

Example 36

The method of Example 35, wherein the thermally decomposing is performed at a second temperature between about 400° C. and about 600° C.

Example 37

The method of Example 35, wherein the thermally decomposing is performed in at least one of a fluidized-bed reactor or an entrained-flow reactor.

Example 38

The method of Example 35, wherein the carbon-containing feedstock comprises at least one of a wood, a grass, or an agricultural byproduct.

Example 39

The method of Example 38, wherein the agricultural byproduct comprises at least one of corn stover, wheat straw, or bagasse.

Example 40

The method of Example 1, further comprising, after the contacting: alkylating a first portion of the deoxygenated compound by reacting the first portion of the deoxygenated compound with a second portion of the deoxygenated compound to form an alkylated compound.

Example 41

The method of Example 1, wherein the alkylating further includes reacting a supplemental compound with at least one of the first portion of the deoxygenated compound or the second portion of the deoxygenated compound.

Example 42

The method of Example 41, wherein the alkylating is performed in a second fixed-bed reactor.

Example 43

The method of Example 41, wherein the supplemental compound comprises at least one of butane, 1-butene, cis-2-butene, trans-2-butene, isobutane, or isobutene.

Example 44

The method of Example 43, wherein the supplemental compound is derived from a non-biomass source.

Example 45

The method of Example 44, wherein the alkylating further comprises alkylating at least a portion of the supplemental compound.

Example 46

A composition comprising a solid metal carbide comprising at least one of chromium, molybdenum, or tungsten.

Example 47

The composition of Example 46, wherein the metal carbide comprises a first transition metal.

Example 48

The composition of Example 47, wherein the first transition metal comprises at least one of chromium, molybdenum, or tungsten.

Example 49

The composition of Example 48, wherein solid metal carbide comprises at least one of $Mo_2C$ or $W_2C$.

Example 50

The composition of Example 46, wherein the solid metal carbide is in the form of a nanoparticle.

Example 51

The composition of Example 50, wherein the nanoparticle has a length dimension between about 1 nm and about 50 nm.

Example 52

The composition of Example 51, wherein the length dimension is between about 2 nm and about 7 nm.

Example 53

The composition of Example 46, wherein the solid metal carbide is substantially in a crystalline phase.

Example 54

The composition of Example 53, wherein the crystalline phase is face centered cubic.

Example 55

The composition of Example 46 further comprising a solid support, wherein the solid metal carbide is positioned on the solid support.

Example 56

The composition of Example 55, wherein the solid support comprises an oxide.

Example 57

The composition of Example 56, wherein the oxide comprises at least one of silica or titania.

Example 58

The composition of Example 55, wherein the solid metal carbide is present on the solid support at a concentration between about 5 wt % and about 50 wt %.

Example 59

The composition of Example 46, further comprising a second transition metal, wherein the second transition metal is positioned on the solid metal carbide.

Example 60

The composition of Example 59, wherein the second transition metal comprises at least one of nickel, palladium, platinum, copper, or ruthenium.

Example 61

The composition of Example 59, wherein the second transition metal is present on the solid metal carbide at a ratio of the first transition metal to the second transition metal between about 20:1 and about 50:1.

Example 62

The composition of Example 46, further comprising a hydrogen-activating site having a concentration between about 8 µmol/g and about 132 µmol/g.

Example 63

The composition of Example 62, further comprising an acid site having a concentration between about 300 µmol/g and about 615 µmol/g.

Example 64

The composition of Example 63, wherein a ratio of the acid site to the hydrogen-activating site is between about 39:1 and about 4.6:1.

Example 65

A method comprising: heating a first mixture comprising a solvent and a metal carbonyl compound, wherein: the heating is performed at a first temperature up to about 400° C., the first mixture is substantially in a liquid phase while at the first temperature, and the heating produces a second mixture comprising metal carbide nanoparticles.

Example 66

The method of Example 65, wherein the first mixture further comprises at least one of a phosphine-containing compound or an alkylamine compound.

Example 67

The method of Example 66, wherein the solvent has a boiling point equal to or greater than the first temperature.

Example 68

The method of Example 66, wherein the solvent comprises at least one alkane or alkene.

Example 69

The method of Example 68, wherein the solvent comprises at least one of squalane, oleylamine, trioctylphosphine, trioctylphosphine oxide, or octadecene.

Example 70

The method of Example 65, wherein the metal carbonyl compound comprises at least one of $Mo(CO)_6$, $Mo(PPh_3)_2(CO)_4$, $Mo(bipyridyl)(CO)_4$, $W(CO)_6$, $W(PPh_3)_2(CO)_4$, or $W(bypyridyl)(CO)_4$.

Example 71

The method of Example 66, wherein the phosphine-containing compound comprises at least one of triphenylphosphine or trioctylphosphine oxide.

Example 72

The method of Example 66, wherein the alkylamine compound comprises at least one of oleylamine, hexadecylamine, or trioctylamine.

Example 73

The method of Example 65, further comprising, after the heating, cooling the second mixture to a second temperature that is between 20° C. and less than the first temperature to form a cooled second mixture.

Example 74

The method of Example 73, further comprising, after the cooling, separating the metal carbide nanoparticles from the cooled second mixture to produce the metal carbide nanoparticles substantially free of at least the solvent.

Example 75

The method of Example 65, wherein the metal carbide nanoparticles have an average particle size between about 1 nm and about 20 nm.

Example 76

The method of Example 65, wherein the first temperature is up to about 300° C.

Example 77

The method of Example 65, wherein the metal carbide nanoparticles comprise at least one of molybdenum carbide or tungsten carbide.

Example 78

The method of Example 70, wherein the metal carbide nanoparticles comprise at least one of molybdenum carbide nanoparticles or tungsten carbide nanoparticles.

Example 79

A method comprising: heating a phosphine-containing compound to form a liquid; and contacting the liquid with a metal carbonyl compound, such that the contacting forms metal carbide nanoparticles.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method comprising:
   contacting an oxygenated compound and hydrogen ($H_2$) with a solid catalyst, wherein:
   the solid catalyst comprises a metal carbide comprising a transition metal and a hydrogen-activating site,
   the hydrogen-activating site has a concentration between 8 µmol/g and 132 µmol/g, and
   the contacting converts at least a portion of the oxygenated compound to a deoxygenated compound.

2. The method of claim 1, wherein the contacting is performed in a first fixed-bed reactor.

3. The method of claim 2, wherein the oxygenated compound is directed to the first fixed-bed reactor while in a first vapor phase.

4. The method of claim 3, wherein the deoxygenated compound is in a second vapor phase.

5. The method of claim 1, wherein the oxygenated compound comprises a pyrolysis decomposition product.

6. The method of claim 1, wherein the deoxygenated compound has a carbon number between 2 carbon atoms and 20 carbon atoms inclusively.

7. The method of claim 1, further comprising, after the contacting:
   alkylating a first portion of the deoxygenated compound by reacting the first portion of the deoxygenated compound with a second portion of the deoxygenated compound to form an alkylated compound.

8. The method of claim 7, wherein the alkylating is performed in a second fixed-bed reactor.

9. A composition comprising:
   a solid metal carbide comprising a first transition metal and a hydrogen-activating site, wherein the hydrogen-activating site has a concentration between 8 μmol/g and 132 μmol/g.

10. The composition of claim 9, wherein the first transition metal comprises at least one of chromium, molybdenum, or tungsten.

11. The composition of claim 9, further comprising a solid support, wherein the solid metal carbide is positioned on the solid support.

12. The composition of claim 11, wherein the solid support comprises an oxide.

13. The composition of claim 9, further comprising a second transition metal, wherein the second transition metal is positioned on the solid metal carbide.

14. The composition of claim 13, wherein the second transition metal comprises at least one of nickel, palladium, platinum, copper, or ruthenium.

15. The composition of claim 13, wherein the second transition metal is present on the solid metal carbide at a ratio of the first transition metal to the second transition metal between 20:1 and 50:1.

16. The composition of claim 9, wherein the solid metal carbide is in the form of a nanoparticle having a length dimension between 1 nm and 50 nm.

17. The composition of claim 9, wherein the solid metal carbide is substantially in a crystalline phase.

18. The composition of claim 17, wherein the crystalline phase is face centered cubic.

19. The composition of claim 9, wherein the solid metal carbide further comprises an acid site having a concentration between 300 μmol/g and 615 μmol/g.

20. The composition of claim 19, wherein a ratio of the acid site to the hydrogen-activating site is between 39:1 and 4.6:1.

21. A method comprising:
   heating a first mixture comprising a solvent and a metal carbonyl compound, wherein:
   the heating is performed at a first temperature up to about 400° C.,
   the first mixture is substantially in a liquid phase while at the first temperature,
   the heating produces a second mixture comprising a metal carbide nanoparticle comprising a transition metal and a hydrogen-activating site, and
   the hydrogen-activating site has a concentration between 8 μmol/g and 132 μmol/g.

22. The method of claim 21, further comprising, after the heating, cooling the second mixture to a second temperature that is less than the first temperature to form a cooled second mixture.

23. The method of claim 22, further comprising, after the cooling, separating the metal carbide nanoparticle from the cooled second mixture to produce the metal carbide nanoparticle substantially free of at least the solvent.

* * * * *